(12) United States Patent
Mittal

(10) Patent No.: US 7,480,500 B1
(45) Date of Patent: Jan. 20, 2009

(54) DIVITAS PROTOCOL PROXY AND METHODS THEREFOR

(75) Inventor: Ajay Mittal, Fremont, CA (US)

(73) Assignee: Divitas Networks, Inc., Mountain View, CA (US)

( * ) Notice: Subject to any disclaimer, the term of this patent is extended or adjusted under 35 U.S.C. 154(b) by 12 days.

(21) Appl. No.: 11/755,704

(22) Filed: May 30, 2007

Related U.S. Application Data

(63) Continuation-in-part of application No. 11/538,042, filed on Oct. 2, 2006, and a continuation-in-part of application No. 11/538,034, filed on Oct. 2, 2006, and a continuation-in-part of application No. 11/538,037, filed on Oct. 2, 2006, and a continuation-in-part of application No. 11/537,980, filed on Oct. 2, 2006, and a continuation-in-part of application No. 11/537,990, filed on Oct. 2, 2006, and a continuation-in-part of application No. 11/537,994, filed on Oct. 2, 2006, and a continuation-in-part of application No. 11/537,985, filed on Oct. 2, 2006.

(60) Provisional application No. 60/804,806, filed on Jun. 14, 2006.

(51) Int. Cl.
*H04Q 7/20* (2006.01)
(52) U.S. Cl. ............... 455/403; 455/414.1; 455/418; 455/426.1; 455/426.2; 455/432.2; 455/432.3
(58) Field of Classification Search ............. 455/414.1, 455/418, 426.1, 426.2, 432.2, 432.3
See application file for complete search history.

(56) References Cited

U.S. PATENT DOCUMENTS

| | | | |
|---|---|---|---|
| 5,260,783 A | 11/1993 | Dixit | |
| 5,440,624 A | 8/1995 | Schoof, II | |
| 5,974,300 A | 10/1999 | LaPorta et al. | |
| 6,010,456 A | 1/2000 | Rhyne | |

(Continued)

FOREIGN PATENT DOCUMENTS

KR 10-1999-0012149 A 2/1999

(Continued)

OTHER PUBLICATIONS

Shoen, John et al., "PCTEL Receives Critical Roaming Patent", Nov. 15, 2006; http://investor.pctel.com/ReleaseDetail.cfm?ReleaseID=218834.

(Continued)

*Primary Examiner*—David Q Nguyen
(74) *Attorney, Agent, or Firm*—IP Strategy Group, P.C.

(57) ABSTRACT

A mobility architectural arrangement for managing telecommunication mobility for a handset is provided. The arrangement includes a DiVitas protocol proxy (DPP), which is configured to manage connectivity between a mobility client of the handset and a mobility server within an enterprise. The DPP includes a client DPP being configured to manage the connectivity for the mobility client of the handset. The client DPP receives a plurality of client connectivity requests from a plurality of application clients. The server DPP is configured to manage the connectivity for the mobility server. The server DPP receives a plurality of server connectivity requests from a plurality of application servers. The client DPP and the server DPP are configured to interact with one another to establish a secure channel.

29 Claims, 44 Drawing Sheets

U.S. PATENT DOCUMENTS

| | | | |
|---|---|---|---|
| 6,073,175 | A | 6/2000 | Tavs et al. |
| 6,259,920 | B1 | 7/2001 | Kusaki et al. |
| 6,288,739 | B1 | 9/2001 | Hales et al. |
| 6,388,584 | B1 | 5/2002 | Dorward et al. |
| 6,412,015 | B1 * | 6/2002 | Navare et al. ............... 709/250 |
| 6,597,787 | B1 | 7/2003 | Lindgren et al. |
| 6,622,175 | B1 * | 9/2003 | Piller ......................... 719/313 |
| 6,650,640 | B1 | 11/2003 | Muller et al. |
| 6,760,303 | B1 | 7/2004 | Brouwer |
| 6,769,123 | B1 | 7/2004 | Chan |
| 6,801,948 | B2 | 10/2004 | Clark et al. |
| 6,822,943 | B1 | 11/2004 | Mantin |
| 6,907,501 | B2 | 6/2005 | Tariq et al. |
| 6,909,702 | B2 | 6/2005 | Leung et al. |
| 6,970,943 | B1 | 11/2005 | Subramanian et al. |
| 6,993,360 | B2 | 1/2006 | Plahte et al. |
| 7,133,669 | B2 | 11/2006 | Nair et al. |
| 2001/0046215 | A1 | 11/2001 | Kim |
| 2002/0067706 | A1 | 6/2002 | Bautz et al. |
| 2002/0076025 | A1 | 6/2002 | Liversidge et al. |
| 2002/0085516 | A1 | 7/2002 | Bridgelall et al. |
| 2002/0131583 | A1 | 9/2002 | Lu |
| 2003/0005112 | A1 | 1/2003 | Krautkremer |
| 2003/0081741 | A1 | 5/2003 | Anne et al. |
| 2003/0087629 | A1 | 5/2003 | Juitt et al. |
| 2003/0119548 | A1 | 6/2003 | Mohammed |
| 2003/0177384 | A1 | 9/2003 | Jones et al. |
| 2004/0001466 | A1 | 1/2004 | Bhatia et al. |
| 2004/0001579 | A1 | 1/2004 | Feinberg et al. |
| 2004/0054787 | A1 | 3/2004 | Kjellberg et al. |
| 2004/0157585 | A1 | 8/2004 | Sashihara |
| 2004/0165530 | A1 | 8/2004 | Bedekar et al. |
| 2004/0218575 | A1 | 11/2004 | Ibe et al. |
| 2004/0260837 | A2 | 12/2004 | Sjollema et al. |
| 2004/0268148 | A1 | 12/2004 | Karjala et al. |
| 2005/0083886 | A1 | 4/2005 | Ikeda |
| 2005/0094618 | A1 | 5/2005 | Colban et al. |
| 2005/0113077 | A1 | 5/2005 | Bushnell et al. |
| 2005/0119001 | A1 | 6/2005 | Watanabe |
| 2005/0138176 | A1 * | 6/2005 | Singh et al. ................. 709/226 |
| 2005/0138528 | A1 | 6/2005 | Ameigeiras et al. |
| 2005/0159157 | A1 | 7/2005 | Bajko |
| 2005/0265284 | A1 | 12/2005 | Hsu et al. |
| 2006/0036747 | A1 | 2/2006 | Galvin, Jr. et al. |
| 2007/0014259 | A1 | 1/2007 | Fajardo et al. |
| 2007/0091848 | A1 | 4/2007 | Karia et al. |
| 2007/0091907 | A1 | 4/2007 | Seshadri et al. |
| 2007/0094374 | A1 | 4/2007 | Karia et al. |
| 2007/0121580 | A1 | 5/2007 | Forte et al. |

FOREIGN PATENT DOCUMENTS

| | | | |
|---|---|---|---|
| KR | 10-2001-0028208 | A | 4/2001 |
| KR | 10-2002-0001980 | A | 1/2002 |
| KR | 10-2006-0031542 | A | 4/2006 |
| WO | WO-03/065682 | A1 | 8/2003 |
| WO | WO-2005/076649 | A1 | 8/2005 |

OTHER PUBLICATIONS

Business Wire, "FirstHand Technologies Granted Patent for Multi-Protocol Data Communication System Supporting Wireless Telephony, Content Delivery", Nov. 28, 2006; http://www.tmcnet.com/usubmit/2006/11/28/2116925.htm.
U.S. Appl. No. 11/538,034, filed Oct. 2, 2006; Inventors: Palakkal, et al.
U.S. Appl. No. 11/538,037, filed Oct. 2, 2006; Inventors: Mittal, et al.
U.S. Appl. No. 11/755,710, filed May 30, 2007; Inventors: Wang.
U.S. Appl. No. 11/755,727, filed May 30, 2007; Inventors: Wang.
U.S. Appl. No. 11/755,702, filed May 30, 2007; Inventors: Prasad.
U.S. Appl. No. 11/537,985, filed Oct. 2, 2006; Inventors: Sharma, et al.
U.S. Appl. No. 11/748,041, filed May 14, 2007; Inventors: Karia.
International Search Report, mailed Aug. 1, 2007, for International Application No. PCT/US 06/38911; Filed on Oct. 3, 2006; Applicant: Lam Research Corporation.
Written Opinion, mailed Aug. 1, 2007, for International Application No. PCT/US 06/38911; Filed on Oct. 3, 2006; Applicant: Lam Research Corporation.
International Search Report, mailed Sep. 24, 2007, for International Application No. PCT/US 06/38870; Filed on Oct. 3, 2006; Applicant: Lam Research Corporation.
Written Opinion, mailed Sep. 24, 2007, for International Application No. PCT/US 06/38870; Filed on Oct. 3, 2006; Applicant: Lam Research Corporation.
International Search Report, mailed Aug. 2, 2007, for International Application No. PCT/US 06/38872; Filed on Oct. 3, 2006; Applicant: Lam Research Corporation.
Written Opinion, mailed Aug. 2, 2007, for International Application No. PCT/US 06/38872; Filed on Oct. 3, 2006; Applicant: Lam Research Corporation.
"International Search Report", Issue in PCT Application No. PCT/US2007/071180; Mailing Date.: Mar. 25, 2008.
"Written Opinion", Issue in PCT Application No. PCT/US2007/071180; Mailing Date.: Mar. 25, 2008.
"International Search Report", Issue in PCT Application No. PCT/US2006/38869; Mailing Date.: Mar. 24, 2008.
"Written Opinion", Issue in PCT Application No. PCT/US2006/38869; Mailing Date.: Mar. 24, 2008.
"Written Opinion", Issue in PCT Application No. PCT/US2007/07181; Mailing Date.: Mar. 26, 2006.
"International Search Report", Issue in PCT Application No. PCT/US2007/071181; Mailing Date.: Mar. 26, 2008.
"International Search Report", Issue in PCT Application No. PCT/US2006/38912; Mailing Date.: Feb. 12, 2008.
"Written Opinion", Issue in PCT Application No. PCT/US2006/38912; Mailing Date.: Feb. 12, 2008.
Reynolds, "Enabling Secure IP Telephony in Enterprise Networks", http://www.asociacion-aecsi.es/doc/Network/Enabling_Secure_IP_Telephony_in_Enterprise_Networks.pdf,(2001).
"International Preliminary Report on Patentability", Issued in PCT Application No. PCT/US2006/38912; Mailing Date: May 29, 2008.
"Written Opinion", Issue in PCT Application No. PCT/US2006/39115; Mailing Date: Jun. 16, 2008.
"International Search Report", Issue in PCT Application No. PCT/US2006/39115; Mailing Date: Jun. 16, 2008.
"International Preliminary Report on Patentability", Issued in PCT Application No. PCT/US2006/38911 Mailing Date: May 29, 2008.
"International Search Report", Issued in PCT Application No. PCT/US2007/071184; Mailing Date: May 19, 2008.
"Written Opinion", Issued in PCT Application No. PCT/US2007/071184; Mailing Date: May 19, 2008.
"Written Opinion", Issued in PCT Application No. PCT/US2007/071186; Mailing Date: May 16, 2008.
"International Search Report", Issued in PCT Application No. PCT/US2007/071186; Mailing Date: May 16, 2008.
"International Preliminary Report on Patentability", Issued in PCT Application No. PCT/US2006/38869; Mailing Date: May 28, 2008.
"International Search Report", Issued in PCT Application No. PCT/US06/39101; Mailing Date: Jul. 17, 2008.
"Written Opinion", Issued in PCT Application No. PCT/US06/39101; Mailing Date: Jul. 17, 2008.
"International Search Report", Issued in PCT Application No.: PCT/US2008/006184; Mailing Date: Sep. 29, 2008.
"Written Opinion", Issued in PCT Application No.: PCT/US2008/006184; Mailing Date: Sep. 29, 2008.
"International Preliminary Report on Patentability", Issued in PCT Application No.: PCT/US07/71180; Mailing Date: Oct. 24, 2008.
"International Preliminary Report on Patentability", Issued in PCT Application No: PCT/US07/71184; Mailing Date: Nov. 4, 2008.
"International Preliminary Report on Patentability", Issued in PCT Application No.: PCT/US07/71186; Mailing Date; Nov. 4, 2008.

* cited by examiner

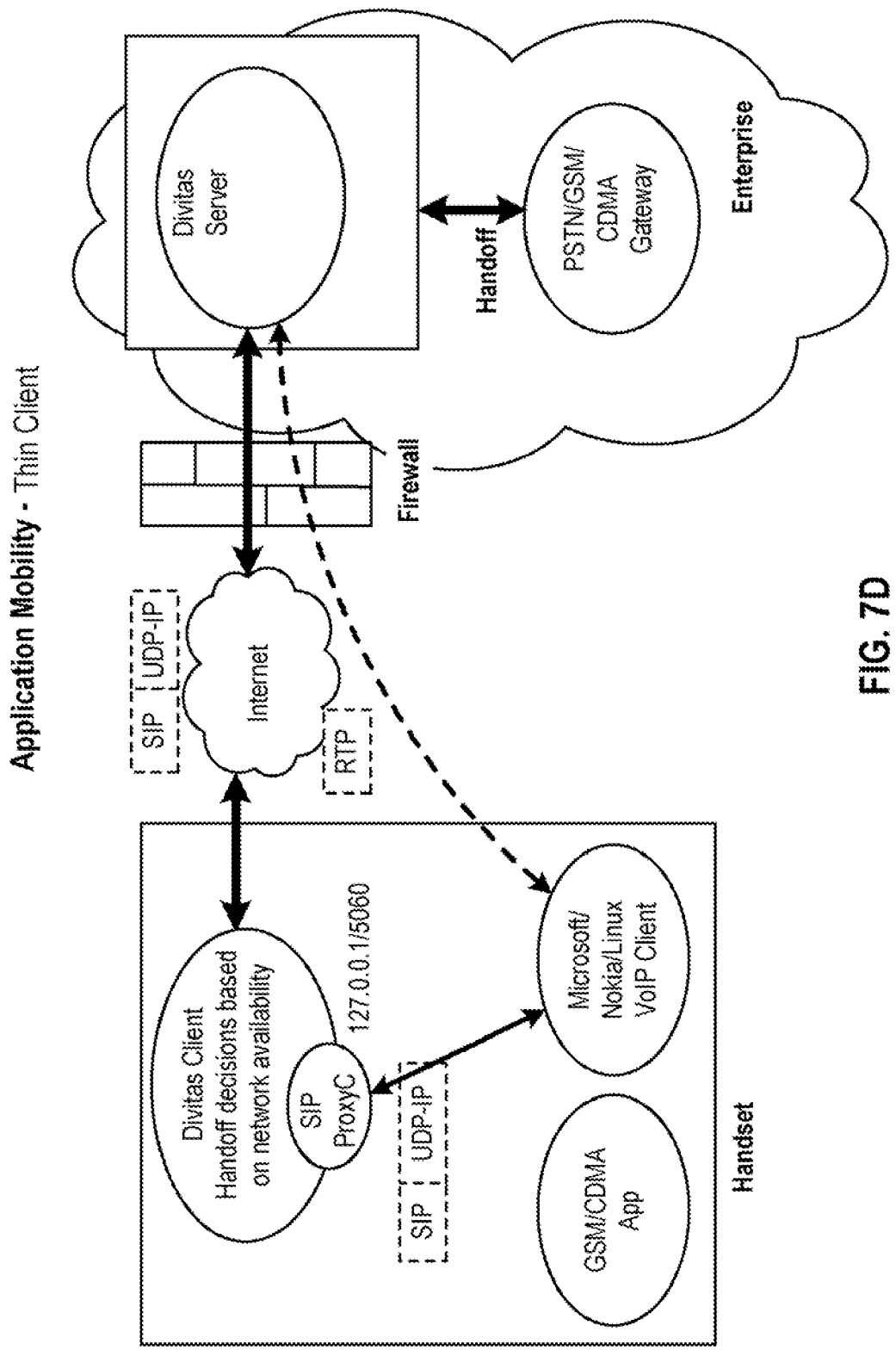

1670

```
NOTIFY sip:3333@172.22.0.102:5060 SIP/2.0
Via SIP/2.0/UDP
172.22.0.32:5064;branch=z9hG4bKe284c61f7795b85e8bfecc606d56d50e
From:<sip:DivitasServer@172.22.0.32:5064>;tag=35005211
To: <sip:3333@172.220.102:5060>
Call-ID: 521595368@172.22.0.32
CSeq: 6 NOTIFY
Contact: <sip:DivitasServer@172.22.0.32:5064>
Content-Type: application/ddp
Content-Length: 288 v=0.0.1
0=server
r=data 2
c=ext 3333
c=pref cell wifi gprs sms wka 5 cka 10 pwd 1200 whys 10 chys 15
c=wifi rssilo 40 rssihi 60 chlo 30 chhi 50
c=qos delaylo 50 delayhi 100 losslo 1 losshi 10 jitterlo 30 jitterhi 50
c=srv intip 536876716 extip – 325180264 msap port 57342
c=end
```

FIG. 16B

DIVITAS PROTOCOL PROXY AND METHODS THEREFOR

PRIORITY CLAIM

This application is related to and claims priority under 35 U.S.C. §119(e) to a commonly assigned provisional patent application entitled "Advanced Mobile Communication Platform Apparatus and Method," by Kalkunte et al., Application Ser. No. 60/804,806 filed on Jun. 14, 2006, which is incorporated by reference herein.

The present invention is a continuation-in-part of and claims priority 35 U.S.C. §120 to the following applications, all of which are incorporated herein by reference:

Commonly assigned application entitled "Enterprise-Managed Wireless Communication," by Karia et al., application Ser. No. 11/538,042 filed on Oct. 2, 2006;

Commonly assigned patent application entitled "Rendezvous Calling Systems and Methods Therefor," by Palakkal et al., application Ser. No. 11/538,034 filed on Oct. 2, 2006;

Commonly assigned application entitled "Call Routing Via Recipient Authentication," by Mittal et al., application Ser. No. 11/538,037 filed on Oct. 2, 2006;

Commonly assigned patent application entitled "Reducing Data Loss During Handoffs In Wireless Communication," by Karia et al., application Ser. No. 11/537,980 filed on Oct. 2, 2006;

Commonly assigned patent application entitled "Classification For Media Stream Packets In A Media Gateway," by Forte et al., application Ser. No. 11/537,990 filed on Oct. 2, 2006;

Commonly assigned patent application entitled "Secured Media Communication Across Enterprise Gateway," by Seshadri et al., application Ser. No. 11/537,994 filed on Oct. 2, 2006; and Commonly assigned patent application entitled "Enhancing User Experience During Handoffs In Wireless Communication," by Sharma et al., application Ser. No. 11/537,985 filed on Oct. 2, 2006.

BACKGROUND

Conventional mobile communication platforms include cellular communications, for example, Global Systems for Mobile (GSM) communications. Other conventional platforms that support limited mobility include WiFi, which is based on IEEE 802.11 standards. Cellular and WiFi are both well known and established wireless communication platforms.

Next generation platforms may be designed to permit mobile users to move between cellular and WiFi networks and include an Unlicensed Mobile Access (UMA) standard that may provide a switch controller for carriers to permit users to transcend between cellular and WiFi networks and vice-versa. However, the UMA standard may have disadvantages including that carriers generally control calls and decide if and when to switch users between networks.

An advanced mobile communication platform may be needed to provide enterprise level communication and control over users and the networks such that enterprises (instead of carriers) may select networks and/or control calls based on enterprise driven criteria rather than carrier driven criteria.

Further, in mobile/wireless communication, generally there have been the following problems: (a) echo; (b) packet delay, packet delay variation (packet jitter), and packet loss which affect quality of service (QoS); (c) hardware or software platform dependency of protocols; and (d) security of enterprise resource access. The problems are described as follows:

(a) Echo

In voice communications such as conventional PSTN, conference phone, cellular mobile phone, and voice over IP, echo cancellation (EC) technology has been widely used to improve quality of service (QoS) for end-users. Generally there are two types of echo canceller. One types of echo canceller is generally called line or network echo canceller (LEC). LEC is generally used to remove electrical echoes caused by reflections of hybrid components on a network where 2-line and/or 4-line conversions take place. Another type of echo canceller is generally called acoustic echo canceller (AEC). AEC is generally used to remove acoustic echoes caused by acoustic sound feedbacks from a speaker to a microphone on a hand-free speaker phone, mobile phone, or conference phone. Compared with LEC, implementing an AEC may be more challenging due to some of the following factors: longer echo tail since the sound speed is much slower than the light (or electron) speed, and accordingly the echo canceller is required to have more processing power and more memory; more dynamic change of the acoustic echo characteristics because of movement of the phone or talker and changes in the environment, and accordingly the echo canceller may be required to track and catch up changes in the echo characteristics more quickly; and multiple echo paths due to multiple reflections from different objects with different distances and/or orientations.

Current acoustic echo cancellation technologies generally have limitations. Acoustic echo cancellation technology may have been invented and used for at least 40 years so far. However, the basic approach to cancelling acoustic echoes may not have been significantly changed. In general, a typical AEC utilizes an adaptive filter to model one or more echo path transfer functions and try to produce a replica of the echoes. The AEC may then subtract this replica from the near-end input signal to form a supposedly final echo-free far-end signal output.

Most of acoustic echo cancellation technology advancements so far are to employ different kinds of filters such as a FIR or IIR filter, single band or multiple bands filter, or time-domain or frequency-domain filter. Further, different algorithms such as LMS, RLS, APA, and so on have been used to improve filter efficiency. Nevertheless, even with all these technology improvements, AEC design and implementation may still be a very challenging task today. Conventional filters may show many limitations on handling the acoustic echoes because of the complexity and the variability nature of the acoustic echoes. One of the limitations may be poor double-talk (both near-end and far-end speakers are talking) performance. Calculations in the conventional filters may result in divergence instead of convergence between the echoes and the replica during a double-talk.

(b) Packet delay, packet delay variation (packet jitter), and packet loss which affect quality of service (QoS)

In voice over IP and video over IP communications, voice and/or video media contents may need to be transferred from the transmitter to the receiver in real-time, while the underlying IP network was originally designed for non real-time date communications. Accordingly, providing and maintaining the quality of service (QoS) to the end-users may become a very challenging task. The packet delay, the packet delay variation (packet jitter) and the packet loss from end-to-end may be considered three important QoS parameters which affect the quality and performance of the voice and video communications over IP network.

Current jitter buffer technologies tend to have limitations. A jitter buffer scheme which may also be called de-jitter buffer scheme is usually employed on the receiver side to compensate or remove the network packet jitter. Basically, the scheme may not play out the packet as soon as the packet is received. Instead, the scheme may queue up the incoming packets and play out the queued packets at even intervals. In effect, the packet queuing may represent inserting a delay before the play-out happens. The inserted delay is usually called play-out delay.

There may be at least two issues on the current jitter buffer designs and implementations. The first issue may pertain to how much the play-out delay needs to be inserted. There may be a tradeoff on the amount of the play-out delay. For a large delay, there may be less packet loss. On the other hand, for a small delay, there may be a better interactive experience. The first issue may have been acceptably resolved by the adaptive jitter buffer scheme. In the adaptive jitter buffer scheme, a receiver may estimate the network packet jitter based on the timestamp of the RTP header of the incoming packets and the receiver local time. The receiver may then insert the minimal delay just enough to compensate the network packet jitter.

The second issue on the jitter buffer design may pertain to when to insert the play-out delay. Ideally, the play-out delay can be inserted at the beginning of each talk spurt. Accordingly, each talk spurt may be played out at even intervals, but only the silence periods between talk spurts are expanded or compressed. For example, if the transmitter employs silence suppression technology, the packets coming in the receiver may ideally have gaps between talk spurts such that a device may be implemented to identify the beginning of the each talk spurt based on the timestamp and the sequence number on the RTP headers of the incoming packets.

However, in reality, inserting delays at talk spurt beginnings can be achieved only in limited situations. Most current silence suppression technologies may have limitations and may perform well only for some clean situations such as single human speaker or low background noise. Current silence suppression technologies may not perform well for some other situations such as multiple human speakers in a conference or high background noise such as during mobile communications. Therefore, many applications may be executed without utilizing or activating silence suppression, in order to preserve better audio quality. As a result, the packets coming into the receiver may be continuous without any pauses. There may be no clue on the timestamp and the sequence number to tell if the packets represent silence or a talk spurt. Having no clue for identifying silence, the current jitter buffer technologies tend to perform poorly. One reason for the poor performance may be that the current jitter buffer schemes generally look at only the RTP header information of the incoming packets, but not the content on the RTP payload.

(c) Hardware or software platform dependency of protocols:

Hardware or software platform dependency may cause interoperability and/or configuration problems. For interactive user sessions in communication which involve multimedia elements such as video, voice, chat, gaming, or virtual reality, there may be a need for a light weight protocol over a communication protocol such as, for example, Session Initiation Protocol (SIP) that can efficiently transport information between a server and a client and can work independently of hardware and software platforms, a control plane protocol in use between the server and the client, and an underlying transport layer or the medium over which the server and the client communicate. There may be a need for a protocol that is fast enough to support critical real time control messages and is flexible enough for large-volume data transfer with minimal delay. However, prior-art protocols such as UMA are generally complex and difficult to establish interoperability.

(d) Security when enterprise resources are accessed from mobile devices

More or more enterprises are allowing their employees to use their cellular/mobile phones for business purposes. With availability of high speed networks such as WiFi, Edge, UMTS, CDMA EVDO, etc. to mobile phones, different vendors have been implementing VoIP (Voice over IP) for the mobile phones. Such implementations may require opening enterprise firewalls to allow VoIP related protocols, such as SIP, RTP, etc. to operate.

In addition to VoIP, other enterprise data centric applications may also be extended to the mobile phones. The applications may include one or more of Presence/Instant Messaging, Intranet web resources, CRM, Support database, etc. If the clients for one or more the above applications on the mobile phones access the enterprise resources directly, enterprise firewalls may need to be opened for multiple protocols, and opening the enterprise firewalls may cause security problems.

SUMMARY

The invention relates, in an embodiment, to a mobility architectural arrangement for managing telecommunication mobility for a handset. The arrangement includes a DiVitas protocol proxy (DPP), which is configured to manage connectivity between a mobility client of the handset and a mobility server within an enterprise. The DPP includes a client DPP being configured to manage the connectivity for the mobility client of the handset. The client DPP receives a plurality of client connectivity requests from a plurality of application clients. The server DPP is configured to manage the connectivity for the mobility server. The server DPP receives a plurality of server connectivity requests from a plurality of application servers. The client DPP and the server DPP is configured to interact with one another to establish a secure channel.

The above summary relates to only one or more of the many embodiments of the invention disclosed herein and is not intended to limit the scope of the invention, which is set forth in the claims herein. These and other features of the present invention will be described in more detail below in the detailed description of the invention and in conjunction with the following figures.

DESCRIPTION OF THE DRAWINGS

The present invention is illustrated by way of example, and not by way of limitation, in the figures of the accompanying drawings and in which like reference numerals refer to similar elements and in which:

FIG. 7D depicts a network architecture in accordance with one or more embodiments of the present invention.

FIG. 10E shows a schematic representation of received packet flow at a packet play-out control when a transmitter-side voice activity detector (VAD) is turned on.

FIG. 16B shows, in an embodiment, a code example of an encapsulated SIP notify message.

TABLE OF CONTENTS

A. Architecture
B. Codec based Acoustic echo cancellation
C. Content-based jitter buffer scheme for voice/video over IP communications
D. Divitas Description Protocol (DDP)
E. Divitas Protocol Proxy (DPP)
H. Conclusion

DETAILED DESCRIPTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The invention may be described with reference to specific apparatus and embodiments. Those skilled in the art will recognize that the description is for illustration and to provide the best mode of practicing the invention. The description should not be construed to limit the scope of the invention. For example, while references are made to certain communication protocols, others are anticipated by the invention. For instance, while WiFi (IEEE 802.11) is described as a protocol for wireless communication, other protocols may be implemented in the invention. References made herein to DiVitas server and mobility server may be equivalent. References made herein to DiVitas client and mobile equipment may be equivalent.

Various embodiments are described herein below, including methods and techniques. It should be kept in mind that the invention might also cover an article of manufacture that includes a computer readable medium on which computer-readable instructions for carrying out embodiments of the invention technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

A. Architecture

Figure 1:
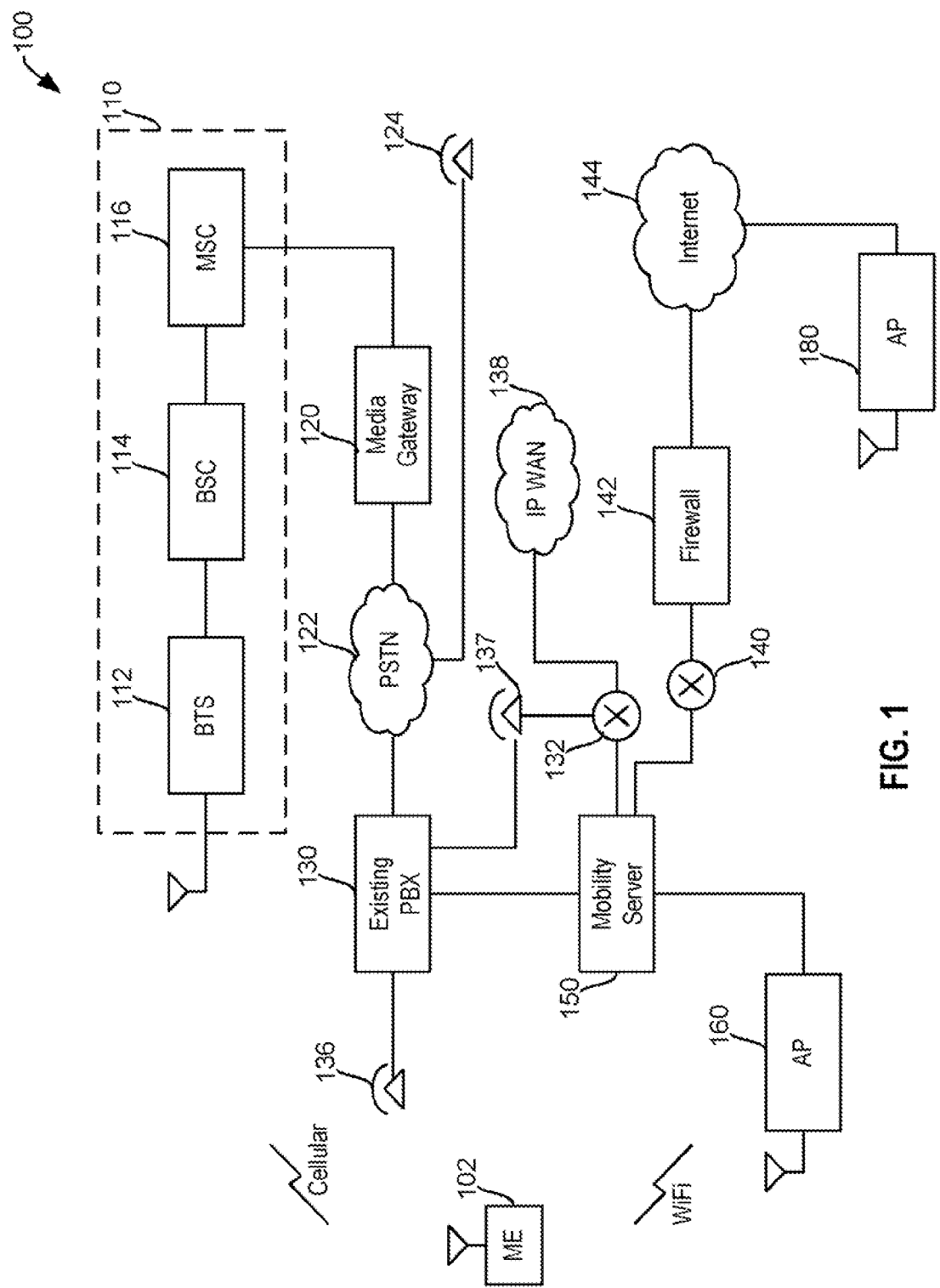
FIG. 1 depicts a system network according to one or more embodiments of the present invention.

FIG. 1 depicts a system network 100 according to an embodiment of the invention. Mobile equipment (ME) 102 is provided that communicates with the network in a number of possible ways. ME 102 can communicate with a cellular network 110 that includes a Base Transceiver Station (BTS) 112, a BTS Switching Center (BSC) 114 and Mobile Switching Center (MSC) 116. The MSC is coupled to a Media Gateway 120 that is coupled to a public switched telephone network (PSTN) 122. Other conventional public and private telephones 124 are also coupled to the PSTN. A PBX 130 is coupled to the PSTN and serves an enterprise for purposes of making and receiving calls, for example, via telephone 136. Mobility server 150 is coupled to the PBX as well as other networks. For example, mobility server 150 is coupled via router 132 to an Internet Protocol Wide Area Network (WAN) 138. The mobility server 150 is also coupled via router 140 and firewall 142 to the Internet 144. The mobility server is also coupled to a local area network (LAN) with wireless access point 160. One access point is depicted while the invention anticipates multiple access points as well. The access point 160 permits a user with ME 102 to wander in the enterprise and stay connected to the PSTN through the mobility server 150 and PBX 130. If the user wanders beyond the boundary of the LAN, the user will be connected to an alternate network (e.g. the cellular network) as described below in detail. Also depicted is an access point 180 that is coupled to the internet for access under certain conditions as described herein.

Figure 2A:
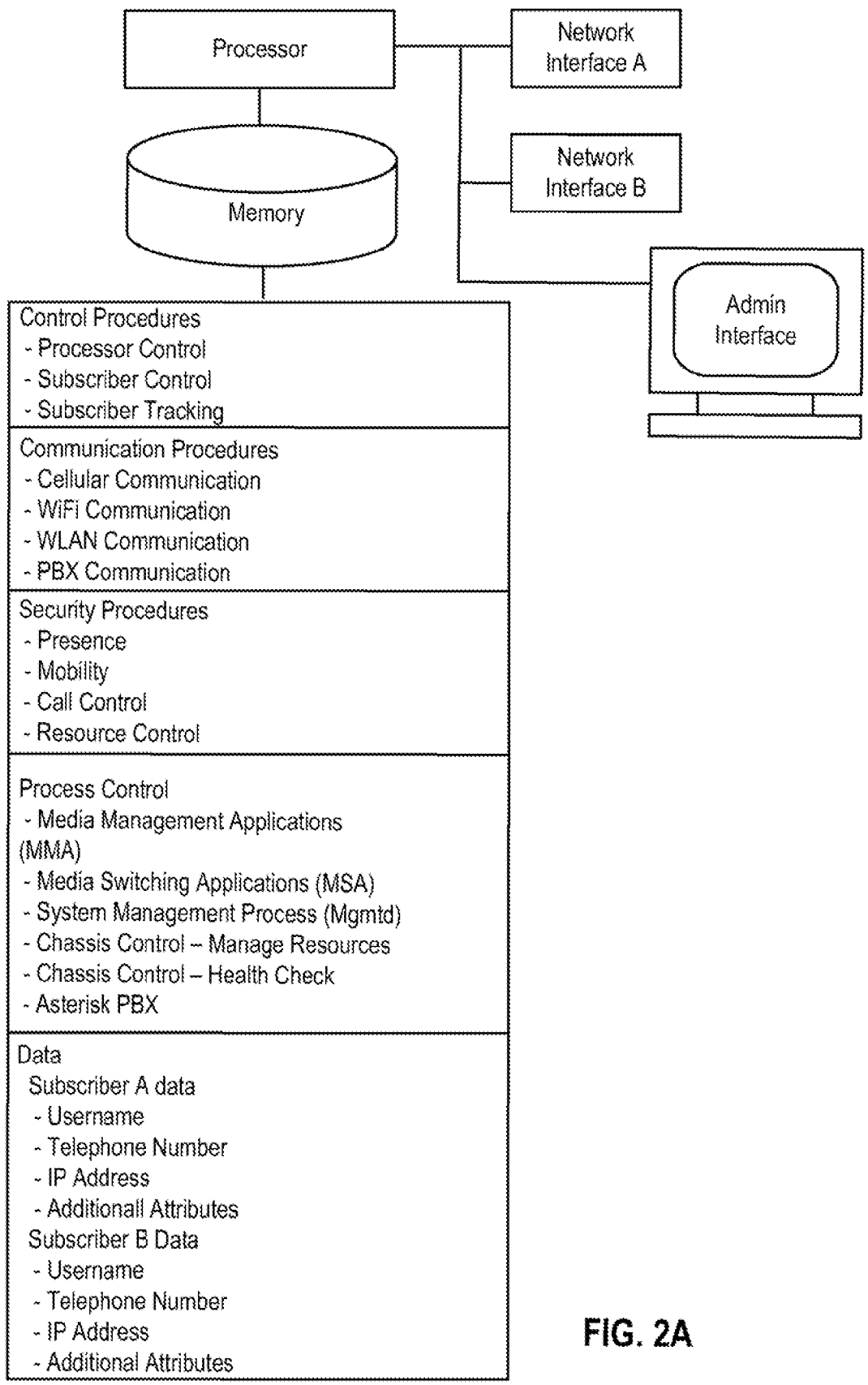
FIGS. 2A-C depict a mobility server according to one or more embodiments of the present invention.
Figure 2B:
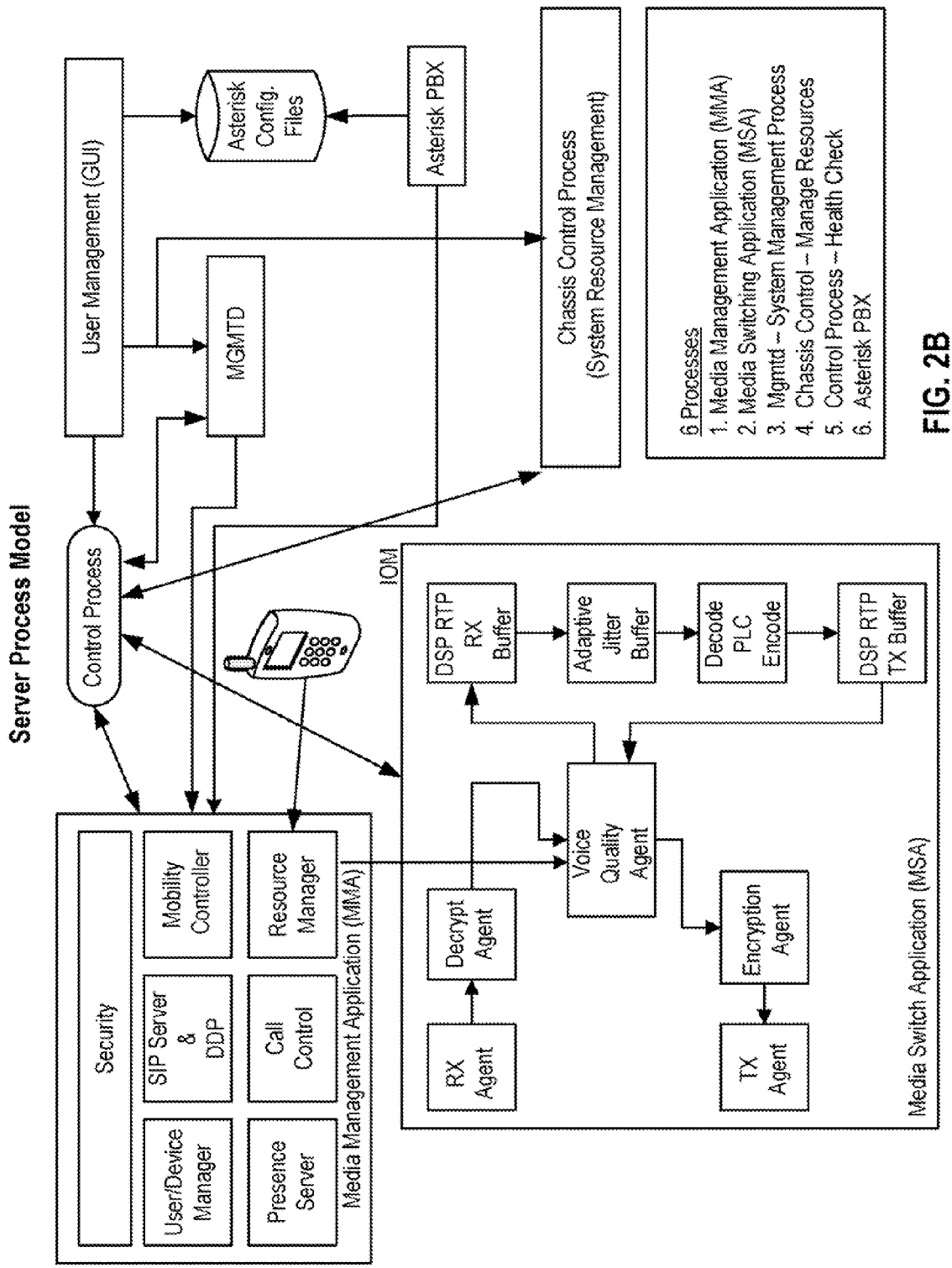
Figure 2C:
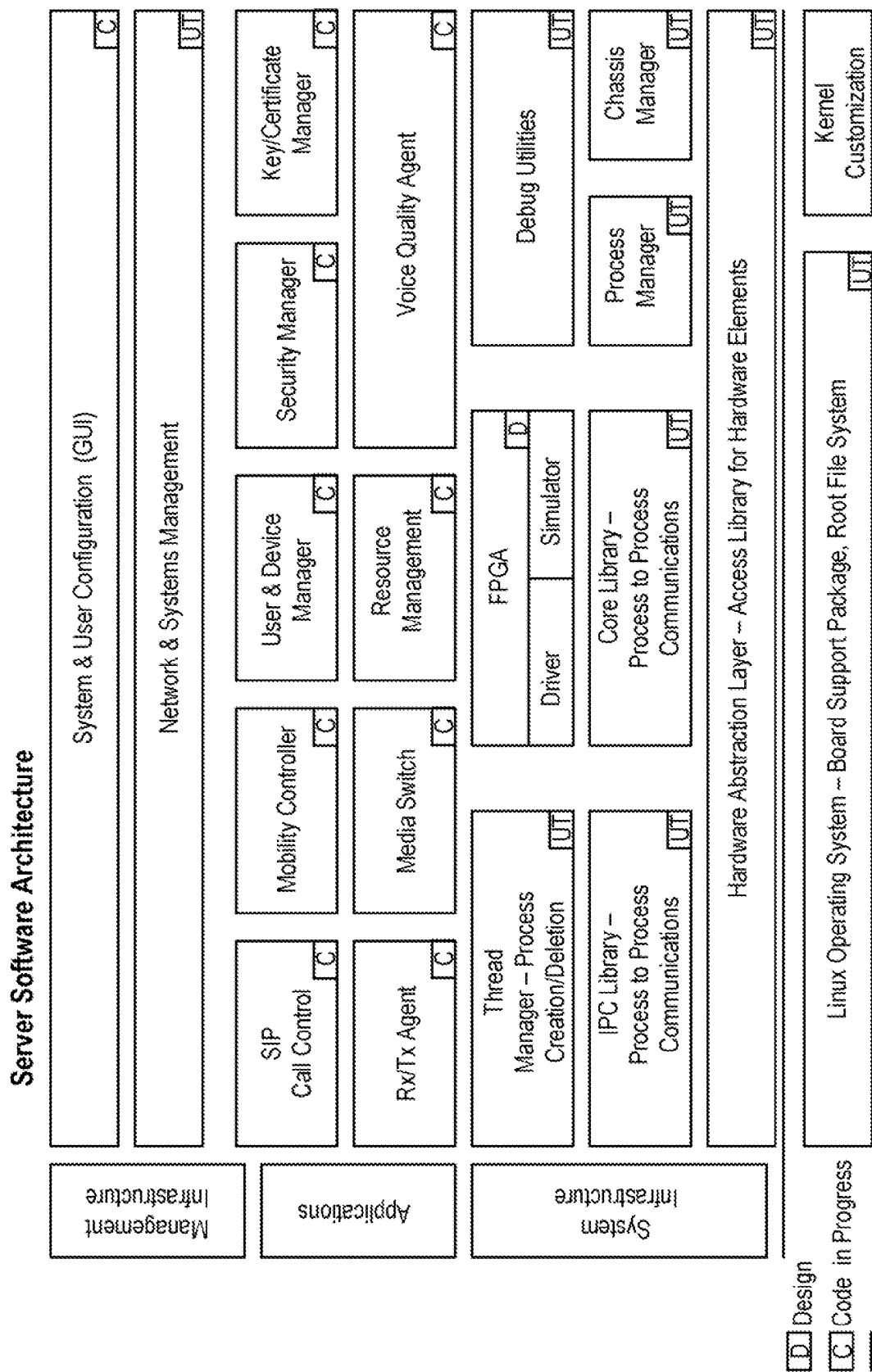

FIGS. 2A-C depict a mobility server according to an embodiment of the invention.

Security Manager—The definition of security when two or more entities are communicating involves the following aspects:
1. Mutual Authentication of the communicating entities.
2. Privacy of the communication channel.
3. Integrity of messages exchanged.
4. Authentication of messages.

In DiVitas mobility solution there are three distinct communicating entities: DiVitas Client, DiVitas Server and external VoIP GW. And there are two distinct types of paths between these entities: SIP signaling path and Media path.

As described in the Architecture Specification[1] the following mechanisms are used to achieve the above mentioned security aspects between client, server and external gateway for signaling and data paths:
1. SIP TLS session between client and server.
2. Client Authentication using SIP Notify after SIP TLS establishment.
3. Authentication of users with server.
4. SIP TLS session between server and external VoIP Gateway.
5. Server authentication with external VoIP Gateway.
6. Secure media path.
7. Derived requirements.

User/Device Manager/Mobility Controller—The device and mobility Manager (hereby referred to as DMM) is a module that handles device configuration and status as well as the mobility aspects while there is an active call on a device. The following sections capture the functional and design specifications of the DMM along with the public interfaces that the DMM supports.

Here is a summary of the roles and responsibilities of the DMM.
1. Device configuration controlled by the enterprise administrator.
2. Report status of the device.
3. Image management for the device.
4. Maintain and implement the mobility logic for handsets with an active call—i.e. handle WiFi to Cell and vice-versa handoff.
5. Handles device initialization and configuration requests from the client.

Control Plane/Call Control—Call control (CC) is the primary control plane module responsible for the following functions:
1. Voice over IP call processing.
2. SIP proxy server and B2BUA.
3. PSTN Call management through PSTN GWs.
4. PBX feature management through Asterisk.
5. Resource and Connection management.

Call control module resides on the DN media switch. The call control module interfaces with the SIP stack and Asterisk (or any other) PBX module to provide the above mentioned functionality.
1. SIP stack (for UA, CCM, and Asterisk etc): SIP stack is mainly used as protocol message decode/encode engine. SIP stack also performs basic protocol specific tasks, like standards based message parsing and validation, retransmissions, proprietary message validation etc. For most of the proxy and B2BUA tasks, SIP stack relies on CC for decision making. Interactions between CC and Asterisk as well as CC and CCM are through standards based SIP messages.
2. Proxy Agent/Configuration Manager (PA/CM): Proxy agent acts as a configuration manager for all the applications. Call control related information is downloaded by PA at the time of provisioning or after the disk DB is read following a system bring up. CC stores the data in RAM for local/faster access. CC also updates PA of any dynamic information (e.g. call going active or down), or on demand information (e.g. SNMP GET).

3. Resource Manager (RM): Resource manager provides logical map of the physical/network resources. These resources include GE port, DSP resources, sockets, UDP/TCP ports, etc. and may not include system resources like memory, buffer pool, timers, queues etc. The resources may not include sockets used for internal IPC communication. CC uses RM for resource CAC, resource reservation and commit. As part of the commit, RM talks to media switch to program hardware to enable media flow.

Media Switch Application (MSA)—The MSA will be designed to run partially on Linux and remaining on TMS320DM64x DSP processor. The application will perform the following functions:

RTP packet processing.
Switching.
Transcoding.
Conferencing.
Adaptive jitter buffer.
Packet loss concealment.
Post processing which includes VAD/CNG and AGC.

The MSA software needs to support encoding/decoding of different speech codecs. The type of algorithm and channel can change during run time i.e. a design to support multi-channel, multi-algorithm is needed. Each codec algorithm needs to be reentrant, and the program as well as data needs to be fully releasable. In order to support various codecs the following needs to taken into account:

a. Since the DSP has limited on chip data memory not all data can be placed on-chip all the time in multi-channel, multi-algorithm application. This requires all data (context and tables) in each algorithm to be re-locatable (between on/off chip memory) during context switching. This requires a need to find out the memory, stack size as well as MIPS requirement for each supported codec.

b. A mechanism to exchange messaging between host and DSP process indicating channel number as well as codec type along with any other features. The channel configuration manager needs to open a channel on DSP indicating type of functionality required. Periodic message indicating the state of DSP needs to be implemented.

The DSP processor allows the external host to access the DSP external memory. The DSP has 16 Kbytes of first level program as well as data memory. The program as well as data memory share the second level memory of 256 kbytes. The 16 Mbytes of external memory (SDRAM) is available. The shared memory between the two processors stores the incoming as well as outgoing RTP data. Since the DSP needs to support N number of channels, this memory will contain N receive as well as transmit buffers of length 320 bytes each (for video these buffers need to be of 1500 bytes). Data structure for messaging between host and DSP as well as information needed on per call basis needs to be defined. The following steps define the DSP functionality:

a. At boot up once the software is downloaded to DSP (the DSP will indicate the same by writing a predetermined value at a fixed memory location to indicate to host that the software is downloaded).

b. Upon successful download of software, the DSP will run an internal timer of 10 msec.

At this time the DSP is polling for channel state to change to process which is set by the host once the packet arrives.

c. A start call or open channel command from the host indicating codec type, data ready as well as call type (initially only voice) is sent for RX as well as TX direction.

d. Based on channel opened the DSP picks up the RTP data from the external buffers and performs the DSP related functionality on those.

e. On the TX side the DSP places encoded data on the external buffers to be picked up by the TX agent.

Figure 3:
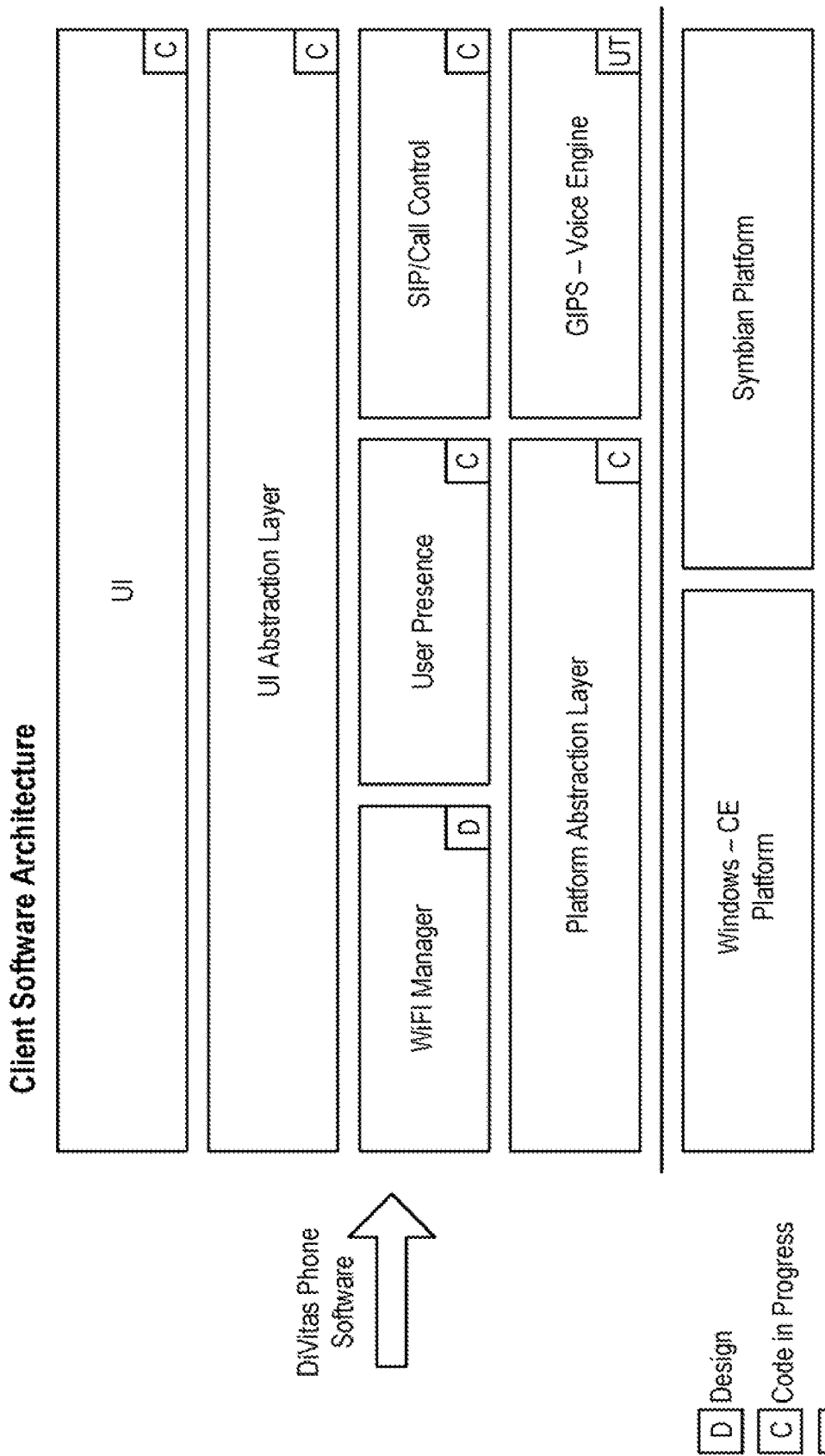
FIG. 3 depicts a mobile equipment client according one or more embodiments of the present invention.

FIG. 3 depicts a mobile equipment client according to an embodiment of the invention.

The client software or handset software runs on the handsets that are compatible with the Divitas Server. Typically these are dual-mode handsets that have the capability to provide telephony connection on the cellular network (CDMA or GSM) as well as IP connection on the LAN network (wired LAN or wireless LAN).

The software can be also be compiled for a desktops/laptops or a PDAs which have a microphone and a speaker to function as a softphone.

User Interface

The client user-interface provides the following functionality:

Setup startup configuration—DNS IP addresses, Divitas server URL, Startup user-state (INVISIBLE/AVAILABLE), security settings Change user state (INVISIBLE/AVAILABLE)

Add enterprise "buddies" and get their presence information (INVISIBLE/AVAILABLE/CALL-IN-PROGRESS)

Display availability status of enterprise "buddies" and connect to them

User Interface to common enterprise telephony features call making
call receiving
call waiting
call forwarding
call transfer
multi-party conferencing
voice-mail notification
missed calls notification
received calls notification
placed calls notification
number lookup and dial by name Manual override to use cellular network instead of WiFi network Display version mismatch Upgrade request/status Disable/inhibit client software—ISP application is used to make/receive cellular calls Call-control and voice Call control for making VoIP calls on LAN interface Voice Engine for making VoIP calls on LAN interface—includes codecs, echo-cancellation, jitter control, error concealment Call handoff from cellular call to VoIP call Call handoff from VoIP call to cellular call 802.11

Determine which IP networks are available and their signal strength and communicate that information to the server AP client Power management of 802.11 miniport—whenever the signal strength of 802.11 is below acceptable threshold, hibernate and poll networks at infrequent intervals to conserver power Package the signal strength and voice-quality info into RTCP packets if the call is in progress, or in keepalives if the call is not in progress to communicate to the server. Whenever the signal strength drops below an acceptable threshold or the voice-quality deteriorates, the server will make a decision to switch the calls from VoIP to cellular network.

Platforms

Since there are a multitude of handset vendors in the market and a lot of them coming up with dual-mode handsets, the software may need to be designed in such a way that most of the code is shared across handsets. Therefore, the code has to be divided into platform dependent part and platform independent part. Most, in fact all of the Divitas core value should be in platform independent part of the software which should be easily portable from one platform to another. The platform dependent part should be only the functional adaptation layers (particularly Telephony, LAN, 802.11, Audio and Display adaptation layers). Whenever the code is ported to a new platform, only these adaptation layers need to be modified or rewritten, while providing a uniform API to the platform independent part.

The client software will run on multiple handset platforms. The most prevalent handset platforms are Windows CE, Symbian and Linux.

In addition to the dual-mode handsets, the client application is designed to work on 802.11 phones, PDAs or laptops/desktops which do not have a cellular telephony interface. On these platforms, a subset of features is available to the user. Basically, the call handoff from VoIP to cellular will not be possible.

Theory of Operations

Startup and Security Operations

On startup, the client application looks for the available resources on the handset. The client application first checks for presence of wired network. If not present, then the client application checks for the presence of an 802.11 network. The wired or wireless medium authentication is done depending on the enterprise security policy. The handset client shall support the security mechanism employed in the enterprise. The most common security mechanism is WPA (WiFi Protected Access). Once the authentication is done successfully, the wireless client gets the IP address for the IP interface using DHCP.

The application gets the Divitas server URL and DNS IP addresses from persistent database and tries to register with a Divitas server.

The client application could be running on a handset which is inside the enterprise network. In that case, the client can reach the Divitas server without any other security blankets. In case the client is in a public network, say a coffee shop or an airport with WiFi internet access, typically the user sets up a VPN connection to the enterprise. The client can reach the Divitas server only after the VPN tunnel is setup.

The client application software authenticates the handset with the server by sending an encrypted certificate (installed by Enterprise IT) to the server. Once the handset is authenticated, the client gets the login/password from the user or stored in the handset, encrypts the login/password and sends the encrypted login/password to the server for user authentication. On successful authentication, the server replies by sending the enterprise phone number. In reply, the client sends the cellular phone number to the server. The server binds the two for all future handoff scenarios.

The signaling and media stream are secured using SIP/TLS for signaling and SRTP for media stream. However, if the user is on a VPN link, then client need not add another level of encryption. Adding another level of encryption to that may result in reduced voice quality. In that case, SIP is used for signaling and RTP/RTCP for media stream.

The above process is repeated whenever the client regains network connectivity with the server.

Steady state operations

The user can choose to be INVISIBLE or AVAILABLE at startup by configuring on the GUI and saving that configuration in the persistent database. The client updates the user's presence information to the server.

The user can also enter frequently called buddies within the enterprise and save that configuration in the persistent database on the handset. The client gets the presence information (in bulk) of these buddies whether they are INVISIBLE, AVAILABLE or CALL-IN-PROGRESS. The server updates the presence information of these buddies to the clients as and when the event occurs.

Whenever a call is not in progress, the client and server exchange keepalives periodically.

The client sends the network status to the server periodically. If the client is on an 802.11 wireless network, the client sends the SSID, signal-strength and bandwidth of the associated access point (AP) to the server. If there is a call in progress, the client sends the SSID as part of in-band RTCP packets. If there is no call in progress, the client sends out-of-band keepalive messages.

Whenever a network session is available from the client to the server, the preferred mode of making and receiving calls to the client is on the network interface. However, the user can choose to override the preferred mode and make the outgoing calls on the cellular network. This selection is not communicated to the server and may not affect the incoming calls. This selection is also not stored in persistent database. The user has to explicitly make the selection every time the user makes an outgoing call.

Whenever a network session is not available from the client to the server, the only way of making and receiving calls is on the cellular interface. The user does not have access to all the enterprise features. The user can make and receive calls using the client software UI however the client software provides only a subset of the service provider features. To use all the features of the cellular service provider network, the user may have to terminate (or inhibit) the client software and use the cellular service providers dialer application. If the service provider application is being used to make and receive calls, then the handoff described below in section 3.4.2 will not be possible.

A user has access to all the enterprise features as long as the client has a session established to the server. The client GUI is used to provide access to these enterprise features to the user.

Voice

SIP signaling is used to establish voice calls between the client and the server. Voice from the audio receiver is encoded into one of the codecs supported by GIPS Voice Engine (VE), encapsulated into RTP packets, encrypted if needed, and sent on the IP interface to the server. Similarly RTP packets received from server is decrypted if needed, decoded using one of the codecs and played out. Speech decoding, jitter control and error concealment are done by GIPS VE on the receive side.

In addition to encryption/decryption, encoding/decoding of speech, GIPS Voice Engine performs error concealment, jitter control, adaptive packet buffering. Acoustic Echo Cancellation and Suppression, Noise Cancellation and Suppression, Automatic Gain Control, Voice Activity Detection, Comfort Noise Generation.

Roaming

A handset client is a mobile device, unlike the portable laptops

Intra-WLAN handoff

When a user is in an 802.11 network having a phone conversation and walks across the building, an AP handoff could occur viz. the handset of the user is now associated with a different AP than the one the handset was previously associated with. The AP handoff could occur without IP address change if the handoff is within the same subnet or to another subnet, in which case the IP address of the handset changes. If the IP address changes, then the client needs to register with the server again. The established calls continue to flow in the meantime using the old flow information until the Voice-Engine (VE) is communicated of the new IP address. Voice-engine ensures that the RTP streams going out of the client will have the new IP address.

When a wireless client authenticates using 802.1X, there are a series of messages sent between the wireless client and the wireless access point (AP) to exchange credentials. This message exchange introduces a delay in the connection process. When a wireless client roams from one wireless AP to another, the delay to perform 802.1X authentication can cause noticeable interruptions in network connectivity, especially for time-dependent traffic such as voice or video-based data streams. To minimize the delay associated with roaming to another wireless AP, the wireless equipment can support PMK caching and preauthentication.

PMK Caching

As a wireless client roams from one wireless AP to another, the wireless client must perform a full 802.1X authentication with each wireless AP. WPA allows the wireless client and the wireless AP to cache the results of a full 802.1X authentication so that if a client roams back to a wireless AP with which the wireless client has previously authenticated, the wireless client needs to perform only the 4-way handshake and determine new pairwise transient keys. In the Association Request frame, the wireless client includes a PMK identifier that was determined during the initial authentication and stored with both the wireless client and wireless AP's PMK cache entries. PMK cache entries are stored for a finite amount of time, as configured on the wireless client and the wireless AP.

To make the transition faster for wireless networking infrastructures that use a switch that acts as the 802.1X authenticator, the WPA/WPS IE Update calculates the PMK identifier value so that the PMK as determined by the 802.1X authentication with the switch can be reused when roaming between wireless APs that are attached to the same switch. This practice is known as opportunistic PMK caching.

Preauthentication

With preauthentication, a WPA wireless client can optionally perform 802.1X authentications with other wireless APs within its range, while connected to its current wireless AP. The wireless client sends preauthentication traffic to the additional wireless AP over its existing wireless connection. After preauthenticating with a wireless AP and storing the PMK and its associated information in the PMK cache, a wireless client that connects to a wireless AP with which the wireless client has preauthenticated needs to perform only the 4-way handshake.

WPA clients that support preauthentication can only preauthenticate with wireless APs that advertise their preauthentication capability in Beacon and Probe Response frames.

WiFi-Cellular handoff

When the user in an 802.11 network having a phone conversation walks out of the building where there is no or insufficient 802.11 connectivity, the call is handed over to cellular network.

The decision to handoff the call is made by the client. The decision is based on 802.11 signal-strength, channel loading and voice-quality thresholds. Once the decision is made, the decision is communicated to the server which initiates a call to the client on the cellular network. The client checks the caller-id of the incoming call, compares to the 802.11 caller-id, and if there is a match, accepts the cellular call and drops the 802.11 call leg. On the server side, the server drops the 802.11 call leg to the client, patches the cellular call leg to the other talking party.

Cellular-WiFi handoff

When the user having a phone conversation on cellular network walks into an 802.11 network, and the handset/user can associate itself with a divitas server, then if the user is talking to another user in the 802.11 network, the call is handed over to the 802.11 network.

The decision to handoff the call is made by the client. The decision is based on availability of sufficient 802.11 signal-strength, channel loading and voice quality. Once the decision is made, the decision is communicated to the server which initiates a call to the client on the 802.11 network. The client checks the caller-id of the incoming call, compares to the cellular caller-id, and if there is a match, accepts the 802.11 call and drops the cellular call leg. The server drops the cellular call leg to the client, patches the 802.11 call leg to the other talking party.

Power Save

When the handset client is idle on the 802.11 network, the 802.11 miniport goes to sleep. Before going to sleep the handset tells the AP that the handset wishes to go to sleep by setting the power save bit in the 802.11 header of every frame. The AP receives the frame, notice the client's wish to enter power save mode. The AP begins buffering the packets for the client while the client's 802.11 miniport is asleep. The miniport consumes very little power while asleep. The miniport wakes up periodically to receive regular beacon transmissions coming from the access point. The power-saving clients need to wake up at the right time when the beacons are transmitted to receive the beacons. TSF (Timing Synchronization Function) assures AP and power-save clients are synchronized. TSF timer keeps running when stations are sleeping. These beacons identify whether sleeping stations have packets buffered at the AP and waiting for delivery to their respective destinations.

When there are no incoming beacons for an extended period of time, the 802.11 miniport is put to sleep. The miniport periodically wakes up, probes the air for APs, if there are none present, miniport goes back to sleep. In this case, the miniport sleeps for longer duration than previous case.

B. Codec Based Acoustic Echo Cancellation

One or more embodiments of the present invention relate to an apparatus for canceling a signal. The apparatus may include an identification code (ID code) generator configured to generate an ID code. The apparatus may also include an ID code injector configured to inject the ID code into at least one of the signal and a processed signal to produce a convolved signal. The processed signal may be resulted from a processing of the signal. The apparatus may further include an ID code detector configured to detect at least one of the convolved signal, a transformed signal, and a transformation of the convolved signal, the transformed signal resulted from the transformation of the convolved signal. The apparatus may further include an arithmetic function configured to remove at least one of the convolved signal and the transformed signal.

Figure 4:
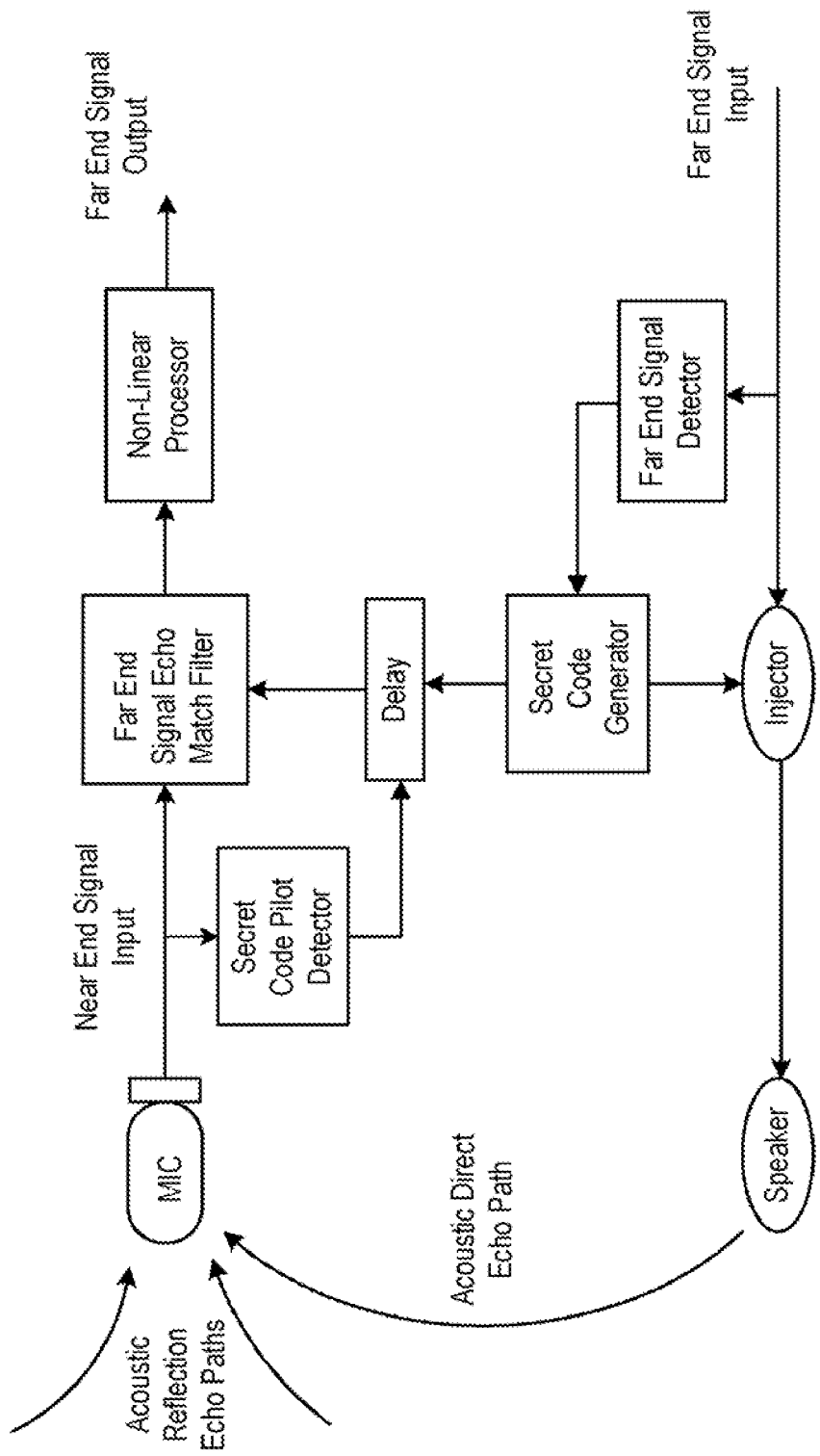
FIG. 4 depicts a block diagram of a codec based echo canceller in accordance with one or more embodiments of the present invention.

FIG. 4 depicts a method for codec based acoustic echo canceller in accordance with one or more embodiments of the present invention.

When both near-end and far-end speakers are talking, it is difficult to differentiate the echo of the far-end talker's voice from the near-end talker's voice since both are present in the near-end signal input with the same human voice characteristics. In this application, a new method is proposed for handling the acoustic echo which is quite different from the current conventional AEC.

One embodiment of the present invention is a method for canceling echo during a communication between a first node and a second node, the method includes injecting a secret code to a signal input of the first node. In accordance with one or more embodiments of the present invention, the first node is a network device used by a far-end user, and the second node is a network device used by a near-end user. In accordance with one or more embodiments of the present invention, the first node is a network device used by a near-end user, and the second node is a network device used by a far-end user.

In accordance with one or more embodiments of the present invention, a secret code is injected into the far-end signal input. So a single or multiple echoes of the far-end signal will carry on this secret code and arrive at the near-end signal input. The near-end signal also includes the near-end speaker voice. Since the secret code is carried only on the echoes of the far-end signal but not on the near-end talker's voice, the secrete code may serve as the identities of those echoes and help us to differentiate them from the near-end speaker voice. Some kinds of the matching filters can be employed like the correlation or other means to identify the echoes of the far-end signal from the near-end speaker voice by the secret code and to remove them. A final echo-free signal will be generated on the far-end signal output.

In order to make this new scheme work, there are two key implementation considerations. One is how to select and design the secret code and another is how to inject the secret code into the far-end input signal. Both considerations come from the same concern that the secret code should not be perceived by the end-end listener.

When a person speaks in a front of the microphone, not only this person's voice but also some degree of the background noise will come in the microphone. But usually this background noise does not disturb the listener as the speaker voice masks out the background noise. As long as the background noise keeps low and the SNR (signal-to-noise ratio) keeps above certain threshold, the background noise should not become a concern. In fact, the background noise always exists in the real voice communications today.

Based on the above fact, first the secret code can be transformed into a pseudo random noise called "secret code random noise". Then the existing background noise is removed from the far-end signal input and insert the secret code random noise. As long as the new SNR is kept above certain threshold, the near-end listener should not hear any difference. In accordance with one or more embodiments of the present invention, the injector shown in FIG. 4 scrambles the secret code to a pseudo random noise, removes the existing background noise in the far-end signal input, and then inserts the secret code random noise.

The far-end signal detector will detect the far-end signal presence and trigger the secret code generator since the echoes will be present only when the far-end talker is speaking. The secret code pilot can include the secret code timing and the phase. The secret code pilot detector is used to detect the secret code pilot carried on the echoes of the far-end signal and to adjust the secret code delay to the matching filter because of the variable echo paths. The unscrambling process will be needed in the secret code pilot detector.

The secret code and the secret code pilot may be designed so that the secret code detector and the matching filter can easily identify the echoes of the far-end signal which carry this secret code and its pilot and then remove these echoes. In addition, a non-linear processor may be used after the matching filter to further reduce the residue echo and improve AEC performance.

Features and advantages of the present invention may be better understood with reference to the figures and discussions that follow.

Echoes have been a significant problem in communication. As discussed in the background of the invention, in the prior art, a filter (or echo canceller) may be employed to model an echo path in trying to provide signals to cancel the echoes.

Figure 8A:
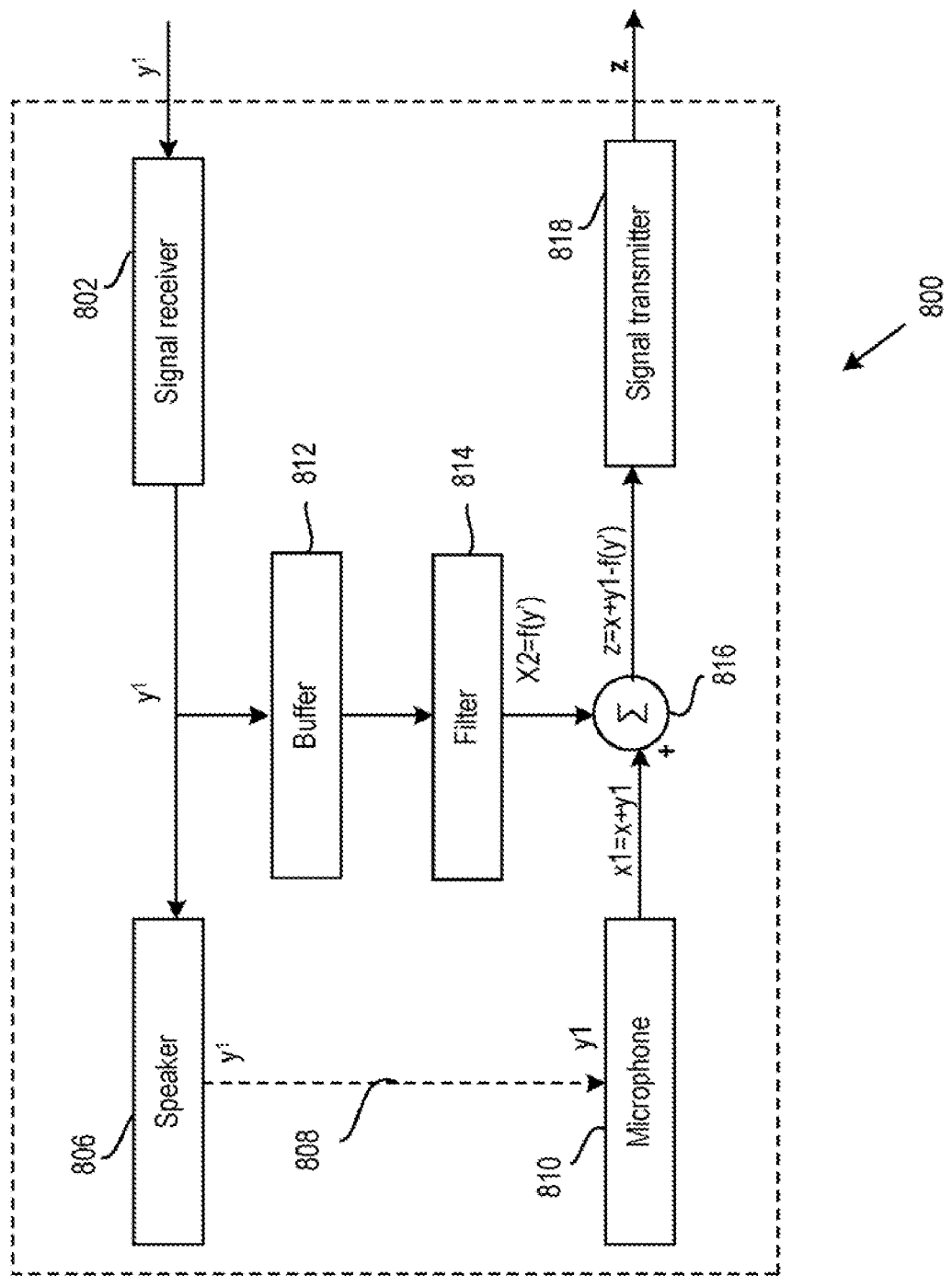
FIG. 8A shows a block diagram of an example prior art communication device including a filter for echo cancellation.

FIG. 8A shows a block diagram of an example prior-art communication device 800 (prior-art device 800) including a filter 814 (or an echo canceller 814) for echo cancellation. As shown in the example of FIG. 8A, prior-art device 800 may include a signal receiver 802 for receiving far-end signals (e.g., signal y') from a remote (or far-end) party and a signal transmitter 818 for sending signals (e.g., signal z) to the remote party.

Prior-art device 800 may also include a speaker 806 for playing out the received signals to a user of prior-art device 800 (i.e., a local or near-end party) and a microphone 810 for collecting near-end signals (e.g., signal x, which may include voice of the local party and background noises).

Prior-art device 800 may also include a buffer 812 for buffering signals received from signal receiver 802 and filter 814 for modeling an echo path 808 between a speaker 806 and microphone 810 and for processing signals buffered in buffer 812. An echo path 808 may represent multiple paths of delay, attenuation, reverberations, etc., transforming signal y' into signal y1, for example.

Prior-art device 800 may further include a summation function 816 for subtracting outputs of filter 814 from outputs of microphone 810. Prior-art device 800 may further include a signal feedback path for feeding outputs of the summation function 816 back to filter 814.

A signal (e.g., signal y') received by signal receiver 802 may be forwarded to both of speaker 806 and buffer 812. Filter 814 may receive the signal from buffer 812, process the signal with a model of echo path 808 to generate a cancelling signal (e.g., x2, a function of y'), and send the cancelling signal to a summation function 816. In turn, summation function 816 may subtract the cancelling signal (e.g., x2=f(y') received from filter 814 from a signal (e.g., x1=x+y1) received from microphone 810 to generate a subtracted signal (e.g., z) and send the subtracted signal to signal transmitter 818. The output of summation function 816 may be fed back to filter 814 for updating and improving the echo path model in filter 814.

The echo cancellation method implemented in prior arrangement 800 is further described with reference to FIG. 8B.

Figure 8B:
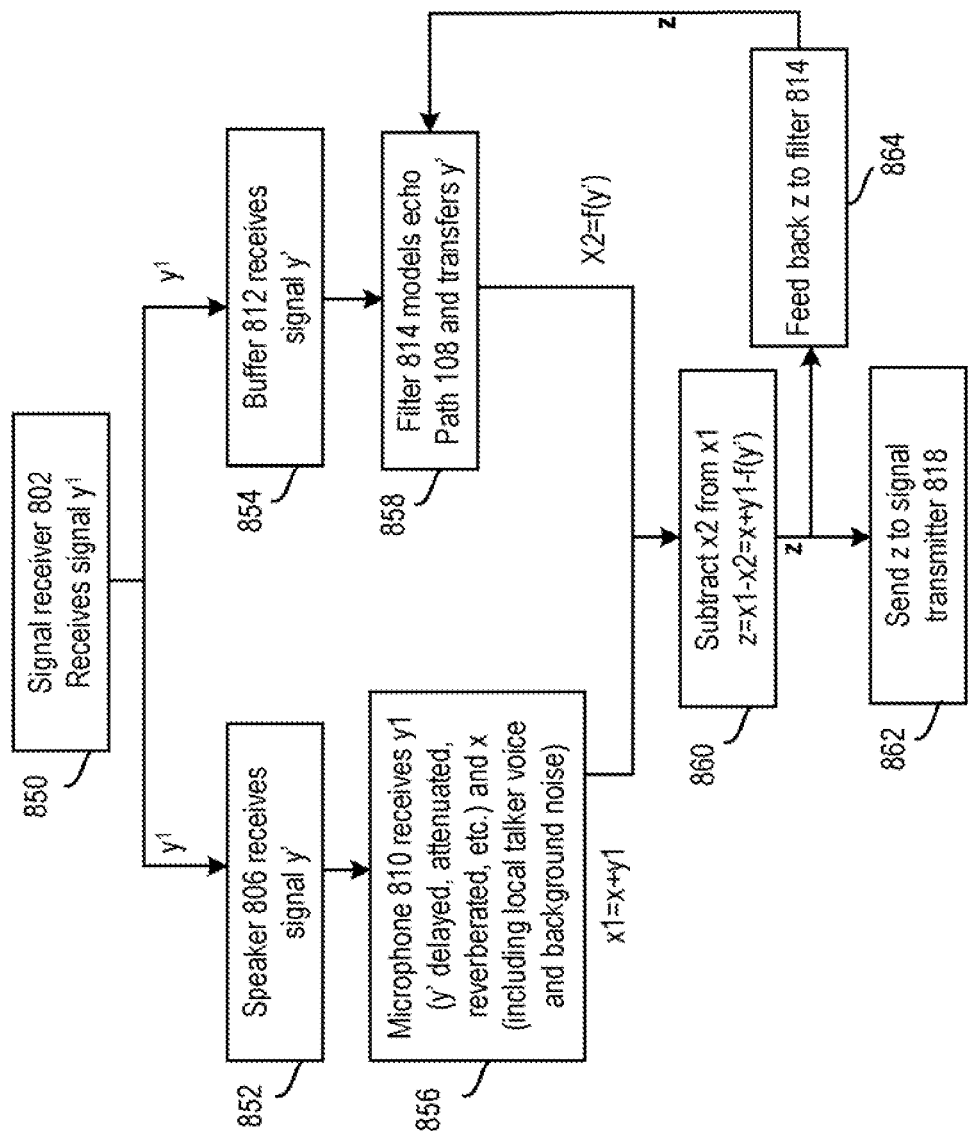
FIG. 8B shows a flowchart of an example prior art method utilized, for example, in the example prior art communication device shown in FIG. 8A, for cancelling echoes.

FIG. 8B shows a flowchart of an example prior art method utilized, for example, in prior-art device 800 (shown in FIG. 8A), for cancelling echoes. As shown in the example of FIG. 8B, the method starts with a step 850, at which signal receiver 802 (shown in FIG. 8A) may send a signal y'. Then, control may be transferred to steps 852 and 854.

At a step 852, speaker 806 (shown in FIG. 8A) may receive signal y'. At a step 856, microphone 810 (shown in FIG. 8A) may receive a signal y1 plus near-end signal x. Signal y1 may represent a transformed signal of signal y' because of delay, attenuation, reverberations, etc. The delay, attenuation, reverberations, etc. may be caused by echo path 808 between speaker 806 and microphone 808 (shown in FIG. 8A). Signal x may include the local party's voice plus local surrounding background noises picked up by microphone 810. Signal x1 that represents a combination of signal y1 and signal x may then be sent to summation function 816 (shown in FIG. 8A).

At a step 854, buffer 812 may also receive signal y'. At a step 858, filter 814 may process signal y' with a model of echo path 808 to produce signal x2, a function of y', e.g., f(y'), which is then sent to summation function 816 (shown in FIG. 8A).

At a step 860, summation function 816 may subtract signal x2 from signal x1 to produce a signal z. Ideally, if f(y') equals to y1, then z will equal to x, the near-end signal that is of interest to the remote party with echo (represented by y1) removed. However, the model of echo path 808 implemented in filter 814 may not be accurate, and typically z may not be equal to x.

At a step 862, summation function 816 may send signal z to signal transmitter 818 for z to be transmitted the remote party.

At a step 864, summation function 816 may feed signal z back to filter 814, for updating and improving the echo path model utilized at step 858. The feedback of signal z and associated calculations and updates may cause filter 814 to require additional processing time or processing power.

The quality of signal z (i.e., the error of signal z with respect to signal x) may depend on algorithms and echo path modeling implemented in filter 814 as well as the processing power and memory of the computing device implementing filter 814.

For prior art devices, arrangements, and methods, as illustrated by prior-art device 800 of FIG. 8A and the method of FIG. 8B, correct modeling of echo path 808, as performed by filter 814, may be crucial for effectively cancelling echoes. However, given various surrounding noises, reverberations of the surrounding noises, and/or other factors, echo path 808 may be dynamic and therefore may be difficult to model correctly. As a result, the prior art devices, arrangements, and methods may not be able to effectively cancel the echoes.

The prior art devices, arrangements, and methods may face further challenges in double-talk scenarios, in which the local (or near-end) party and the remote (or far-end) party are talking at the same time. Since the local party's voice and the remote party's voice may have similar human voice characteristics, filter 814 may be unable to correctly identify which signals to be input into the model of echo path 808. As a result, part of the local party's voice may be cancelled, and part of echoes may not be cancelled, and the error of the echo path model in filter 814 may become divergent instead of converging, resulting in undesirable quality of communication.

Accordingly, in the prior art, much resource has been devoted to improving algorithms for modeling echo path 808. Further, filter 814 may required a large amount of data memory and may require a CPU(s) with high processing power. As a result, a high cost for implementing echo cancellation may be incurred.

In contrast, one or more embodiments of the present invention involve an apparatus for canceling a signal even if a filter is not provided. In one or more embodiments, the signal may represent a digital signal. The apparatus may include an identification code (ID code) generator configured to generate an ID code. The apparatus may also include an ID code injector configured to inject the ID code into at least one of the signal and a processed signal to produce a convolved signal. The processed signal may be resulted from a processing, such as background noise removal, of the signal. The apparatus may further include an ID code detector configured to detect at least one of the convolved signal, a transformed signal, and a transformation of the convolved signal, wherein the transformed signal may be resulted from the transformation of the convolved signal. The transformation of the convolved signal may be caused by the configuration and/or environment of the apparatus. For example, the transformation of the convolved signal may represent the delay caused by one or more echo paths between the speaker and the microphone of the apparatus; the transformed signal may represent a delayed signal given the existence of the delay. The apparatus may further include an arithmetic function configured to remove at least one of the convolved signal and the transformed signal.

Figure 9A:
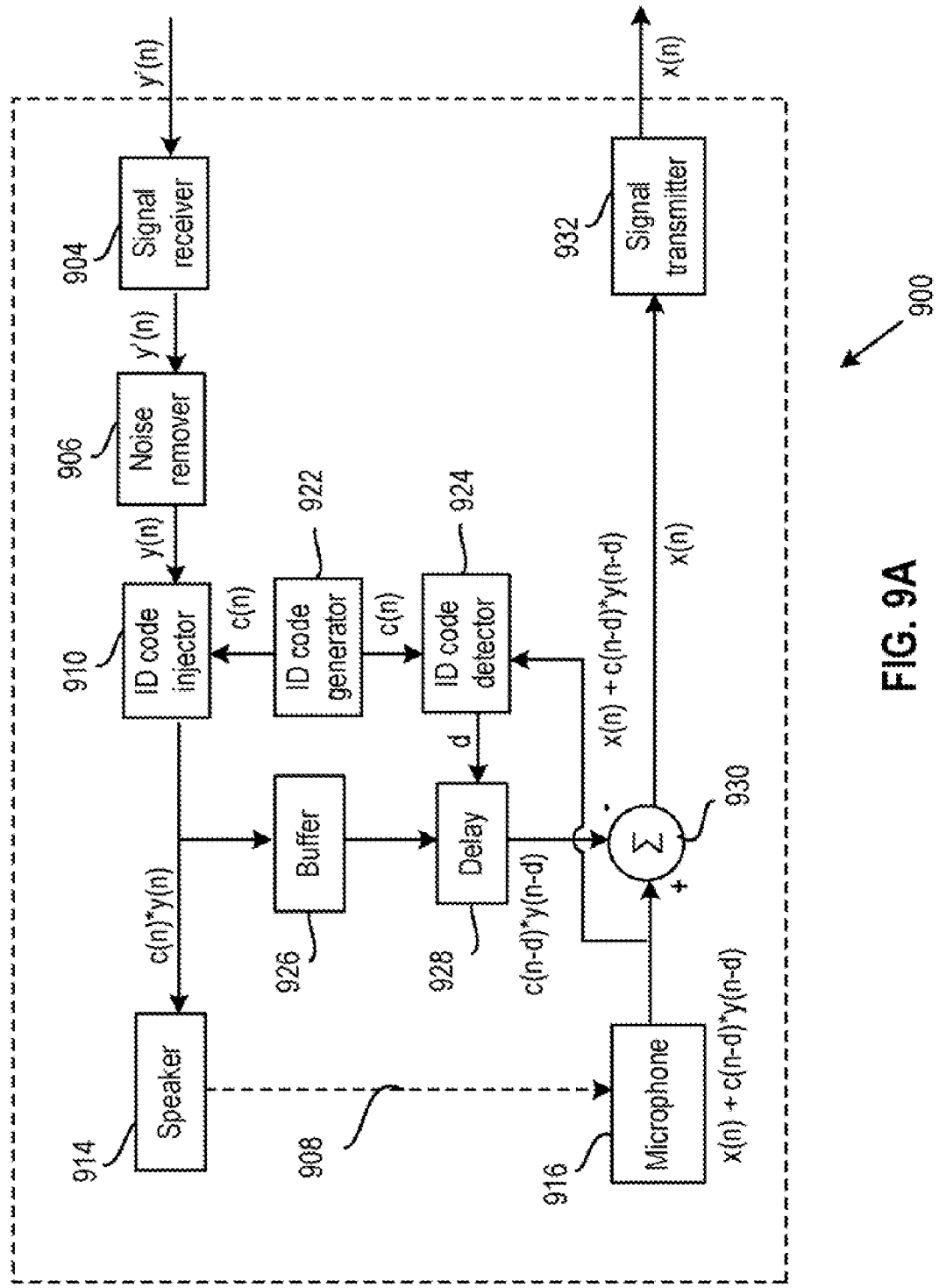
FIG. 9A shows, in accordance with one or more embodiments of the present invention, a block diagram of a communication device (or system or arrangement) that may cancel echoes without relying on a filter.

FIG. 9A shows, in accordance with one or more embodiments of the present invention, a block diagram of a communication device 900 (device 900) that may cancel echoes even if a filter is not provided. The block diagram may also represent a communication system or arrangement with the components shown in FIG. 9A implemented in one or more devices.

Device 900 may include input/output components such as a signal receiver 904 (for receiving a far-end signals from a remote party), a signal transmitter 932 (for sending signals to the remote party), a speaker 914, a microphone 916 (local microphone 916). An echo path 908 that travels from speaker 914 to microphone 916 may exist.

Device 900 may also include a signal processing module such as a background-noise remover 906. Background-noise remover 906 may be configured to remove background noise from signals received from signal receiver 904. Background-noise remover 906 may be implemented utilizing one or more well-known algorithms such as spectral subtraction for removing the background noise.

Device 900 may also include modules for canceling echoes. The modules may include an identification code generator 922 (ID code generator 922), an identification code injector 910 (ID code injector 910), an identification code detector 924 (ID code detector 924), and a buffer 926. The modules may also include a transformation module such as, for example, a delay 928, for transforming signals such as, for example, introducing a delay. The modules may also include an arithmetic function such as, for example, a summation function 930.

ID code generator 922 may be configured to generate a controllable and removable ID code such that a portion of a signal may be identified. The portion of the signal may then be removed, for example, for echo cancellation purposes. The ID code may represent a pseudorandom code that may simulate a background noise or comfort noise. ID code generator 922 may include a linear feedback shift register for generating a pseudorandom noise sequence to be utilized as the ID code.

Alternatively or additionally, the ID code may include a high-frequency or low-frequency signal that is unperceivable to human ears. In one or more embodiments, the sampling rate of microphone 916 may be configured to process the high-frequency or low-frequency signal, for example, through configuring hardware and/or software (or driver) of microphone 916. In one or more embodiments, with the ID code representing a signal that is unperceivable to human ears, device 900 may not include background-noise remover 906.

ID code injector 910 may be configured to inject the ID code generated by ID code generator 922 into a signal. ID code injector 910 may be implemented by some well-known algorithms such as digital correlation for inserting the ID code into the signal, for example, by convolving the ID code with the signal to produce a convolved signal.

ID code detector 924 may be configured to detect the ID code within the convolved signal, for example, in a mixed, superimposed, and/or further convolved signal involving one or more other signals. Alternatively or additionally, ID code detector 924 may be configured to detect a transformed signal resulted from a transformation of the convolved signal and/or the ID code, the transformation may be caused, for example, the configuration and/or environment of device 900. Additionally or additionally, ID code detector 924 may be configured to detect the transformation. The transformation may include a delay and an signal level attenuation. ID code detector 924 may implement one or more well known algorithm such as digital correlation or match filter for detecting the ID.

Delay 928 may be configured to introduce a delay into a signal. The delay may be employed in simulating the transformation. Delay 928 may be implemented by a simple delay line shift register for introducing the delay.

Each of noise remover 906, ID code generator 922, ID code injector 910, ID code detector 924, and delay 928 may be included in software that may be downloaded to a user device such as, for example, a telephone, a mobile phone, a teleconference device, etc. (e.g., for acoustic echo cancellation) and/or a server device (e.g., for line or network echo cancellation).

Figure 9B:
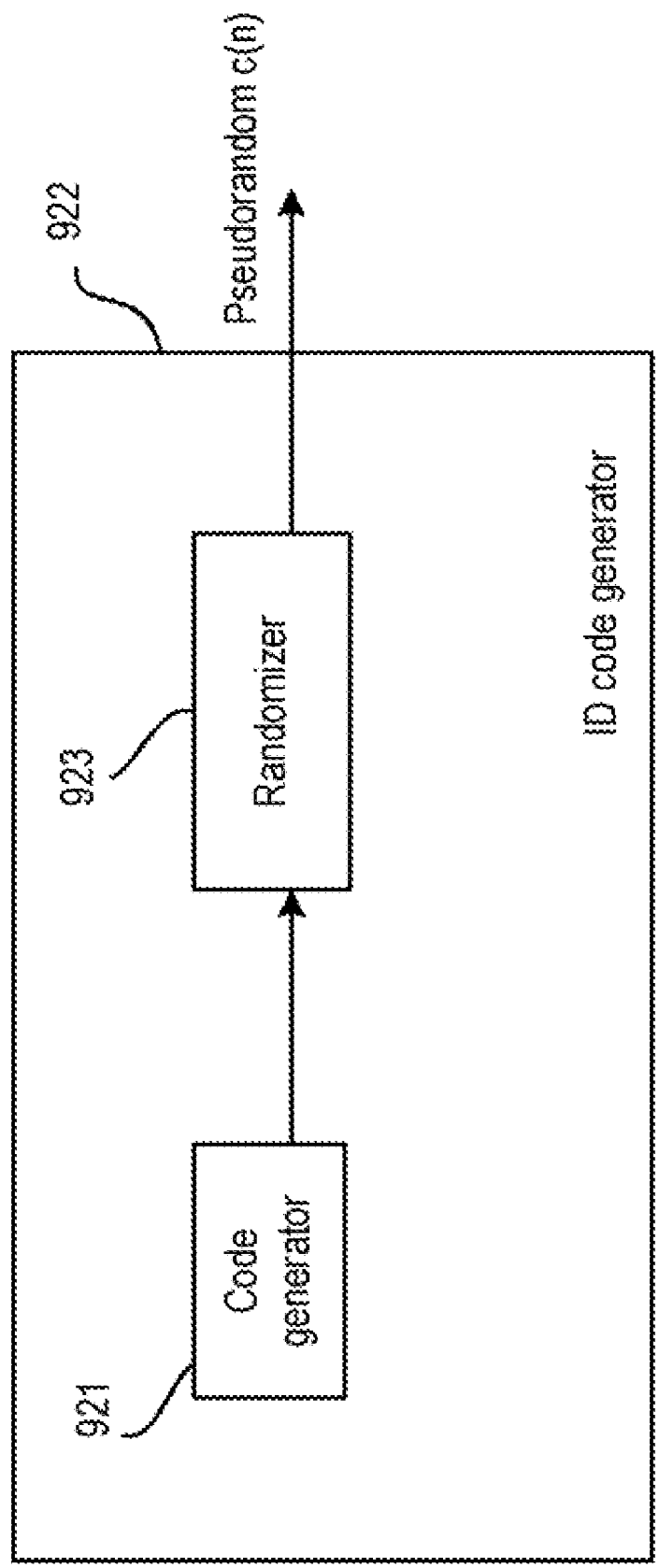
FIG. 9B shows, in accordance with one or more embodiments of the present invention, a block diagram of an ID code generator employed in the communication device (or system or arrangement) shown in FIG. 9A.

FIG. 9B shows, in accordance with one or more embodiments of the present invention, a block diagram of ID code generator 922 employed in device 900 (shown in FIG. 9A). ID code generator 922 may only include a code generator 921 which will generate a random code directly. In this case, the code generator 921 may be implemented by some well-known algorithms such as linear feedback shift register with carefully selecting an appropriate feedback function.

However, ID code generator 922 may include code generator 921 followed by a randomizer 923. In this case, code generator 921 can generate an appropriate identification code first without worrying about the randomization. Then this identification code is fed to randomizer 923 to become a pseudorandom noise sequence as the output of 922. Randomizer 923 could be implemented by a modified liner feedback shift register with its feedback function controlled by code generator 921.

Figure 9C:
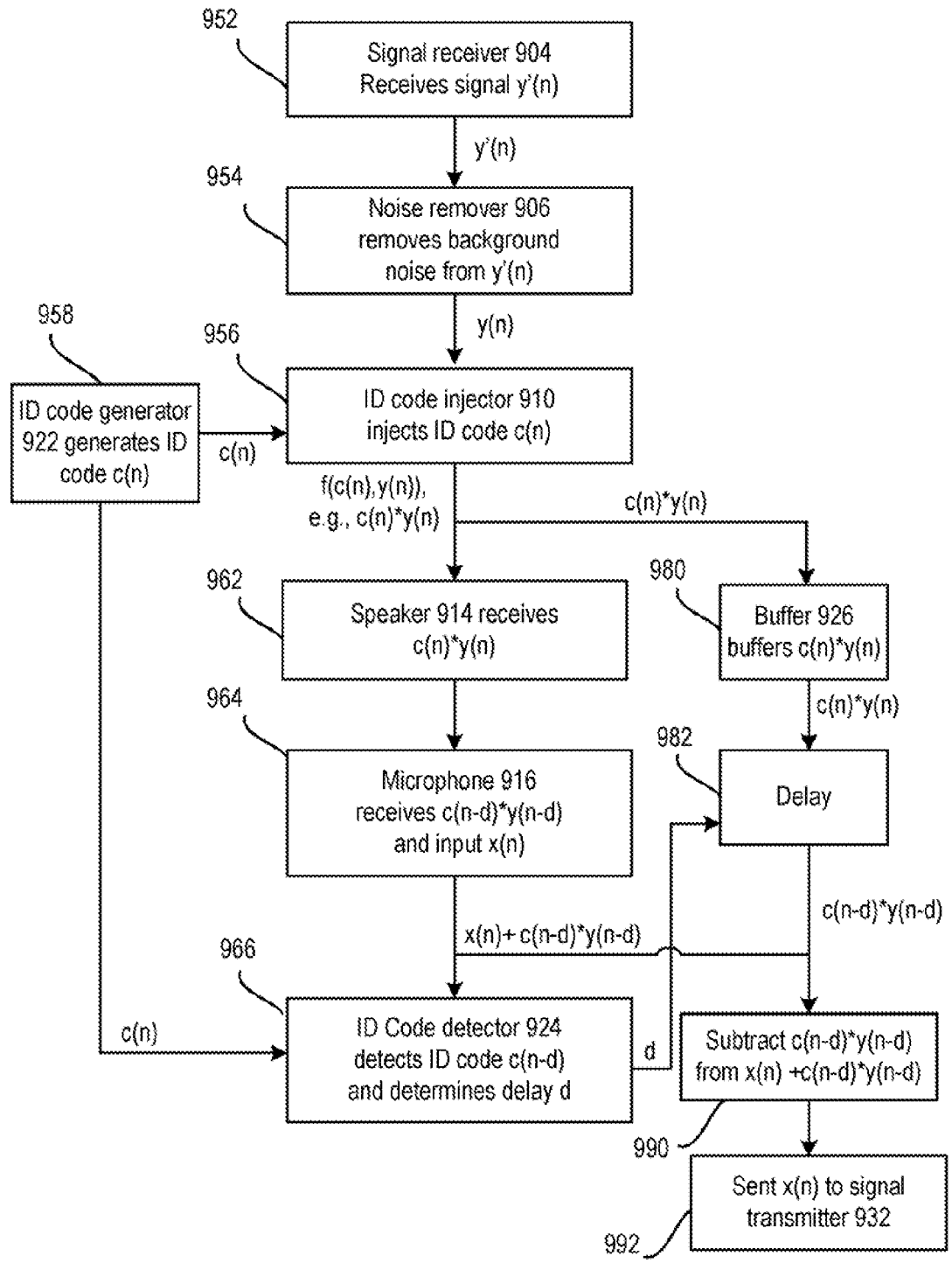
FIG. 9C shows, in accordance with one or more embodiments of the present invention, a flowchart of a method for cancelling echoes, for example, in the communication device (or system or arrangement) shown in FIG. 9A.

FIG. 9C shows, in accordance with one or more embodiments of the present invention, a flowchart of a method for cancelling echoes, for example, in device 900 (shown in FIG. 9A). The method starts with a step 952, at which the signal receiver 904 (shown in FIG. 9A) may receive a signal y'(n) from the remote party.

At a step 954, noise remover 906 may remove background noise from y'(n), resulting in a signal y(n). The background noise may be removed in order to make room for an ID code that includes a random noise. Accordingly, the local party may not receive excessive noise.

At a step 958, ID code generator 922 (shown in FIG. 9A) may generate an ID code c(n). The ID code c(n) may represent a known and controllable function. At a step 956, ID code injector 910 (shown in FIG. 9A) may injects the ID code c(n) into signal y(n). As a result, a convolution of c(n) and y(n) may be generated. For example, the convolution of c(n) and y(n) may be a convolved signal c(n)*y(n). Then, control may be transferred to steps 962 and 980.

At step 962, speaker 914 (shown in FIG. 9A) may receive the convolved signal c(n)*y(n). At a step 964, microphone 916 (shown in FIG. 9A) may receive a delayed signal from speaker 914, i.e., signal c(n−d)*y(n−d). Microphone 916 may also pick up another input signal x(n), which may include voice of a local party (e.g., in a double-talk scenario) and/or background noise surrounding microphone 916. Microphone 916 may then output a combined signal x(n)+c(n−d)*y(n−d) to ID code detector 924 (shown in FIG. 9A) and summation function 930 (shown in FIG. 9A).

At step 980, buffer 926 (shown in FIG. 9A) may buffer a copy of convolved signal c(n)*y(n) and output the copy of the convolved signal to delay 928.

At a step 966, ID code detector 924 (shown in FIG. 9A) may detect the ID code c(n−d) in the combined signal x(n)+c(n−d)*y(n−d) and may determine a delay amount d by comparing c(n−d) with c(n) received from ID code generator 922 given that c(n) is a known and controllable function. The delay amount d may be fed into delay 928 (shown in FIG. 9A).

At a step 982, delay 928 (shown in FIG. 9A) may introduce the delay amount d into the output of buffer 926 from step 980, i.e., a copy of c(n)*y(n), resulting in a copy of c(n−d)*y(n−d).

At a step 990, summation function 930 (shown in FIG. 9A) may subtract the output of step 982, i.e., the copy of signal c(n−d)*y(n−d), from the output of step 964, i.e., signal x(n)+c(n−d)*y(n−d). In other words, at step 990, summation function 930 calculates signal x(n)+c(n−d)*y(n−d)−c(n−d)*y(n−d) to obtain signal x(n), which may represent the input signal picked up by receiver microphone 916 (shown in FIG. 9A) with no presence of an echo of signal y'(n), which may be represented by signal y(n−d). Signal x(n) may include voice of a local party, e.g., in a double-talk scenario, and/or background noise surrounding microphone 916.

At a step 992, signal x(n), including voice of a local party, e.g., in a double-talk scenario, and/or background noise surrounding microphone 916 and containing no echo, may be sent to signal transmitter 932. Thus, echoes may be effectively canceled in both signal-talk and double-talk scenarios.

As can be appreciated from the foregoing, embodiments of the present invention may effectively cancel echoes without the need of a filter (or echo canceller) that is required in a prior art device, arrangement, or method. Being immune to possible errors in echo path modeling that the filter may rely on, embodiments of the present invention may provide more accurate echo cancellation and faster cancellation, and therefore better quality of service. Further, the embodiments of the present invention may effectively cancel echoes in double-talk scenarios where conventional filters may usually perform poorly.

Without substantially relying on filter and associated complexity of echo path modeling, embodiments of the present invention may also advantageously eliminate the need for high CPU processing power and large data memory that may be required by the filter, thereby reducing the cost in implementing echo cancellation.

C. Content-Based Jitter Buffer Scheme for Voice/Video over IP Communications One or more embodiments of the present invention provide a mechanism to handle excessive WLAN jitter using VAD and jitter compensation for audio. One or more embodiments of the present invention work also for video where lack of motion or no motion is used in conjunction with packet jitter.

One or more embodiments of the present invention relate to a packet communication device. The packet communication device may include a detector configured to detect a characterized content in incoming packets received by the packet communication device. The packet communication device may further include a play-out control configured to perform an adjustment of the incoming packets to produce adjusted packets and output the adjusted packets, if the detector has detected the characterized content in the incoming packets.

A new jitter buffer scheme called content-based jitter buffer is proposed to overcome the current jitter buffer technology limitation. In accordance with one or more embodiments of the present invention, not only the RTP header information of the incoming packets, but also their RTP payload contents to identify the silences and talk spurts on the incoming packets are observed. Then based on this silence or talk spurt cue to decide when the play-out delay can be inserted to compensate the network packet jitter. With this new scheme, the jitter buffer on the receiver side will no longer depend on the transmitter's silence suppression any more.

Figure 5A:
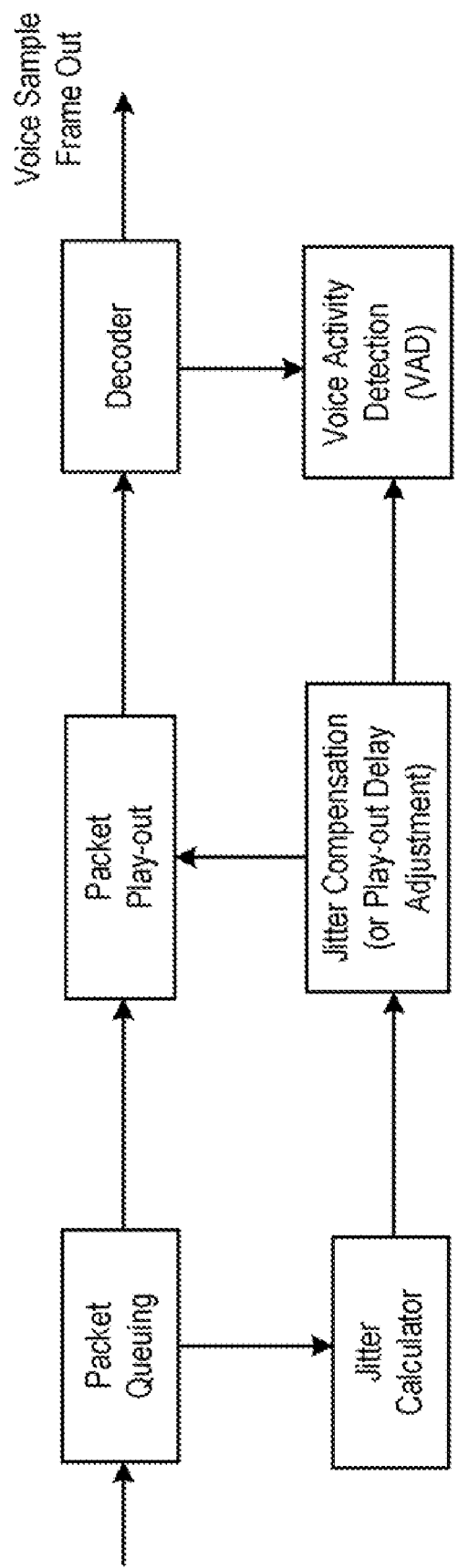
FIG. 5A depicts a voice jitter buffer scheme in accordance with one or more embodiments of the present invention.
Figure 5B:
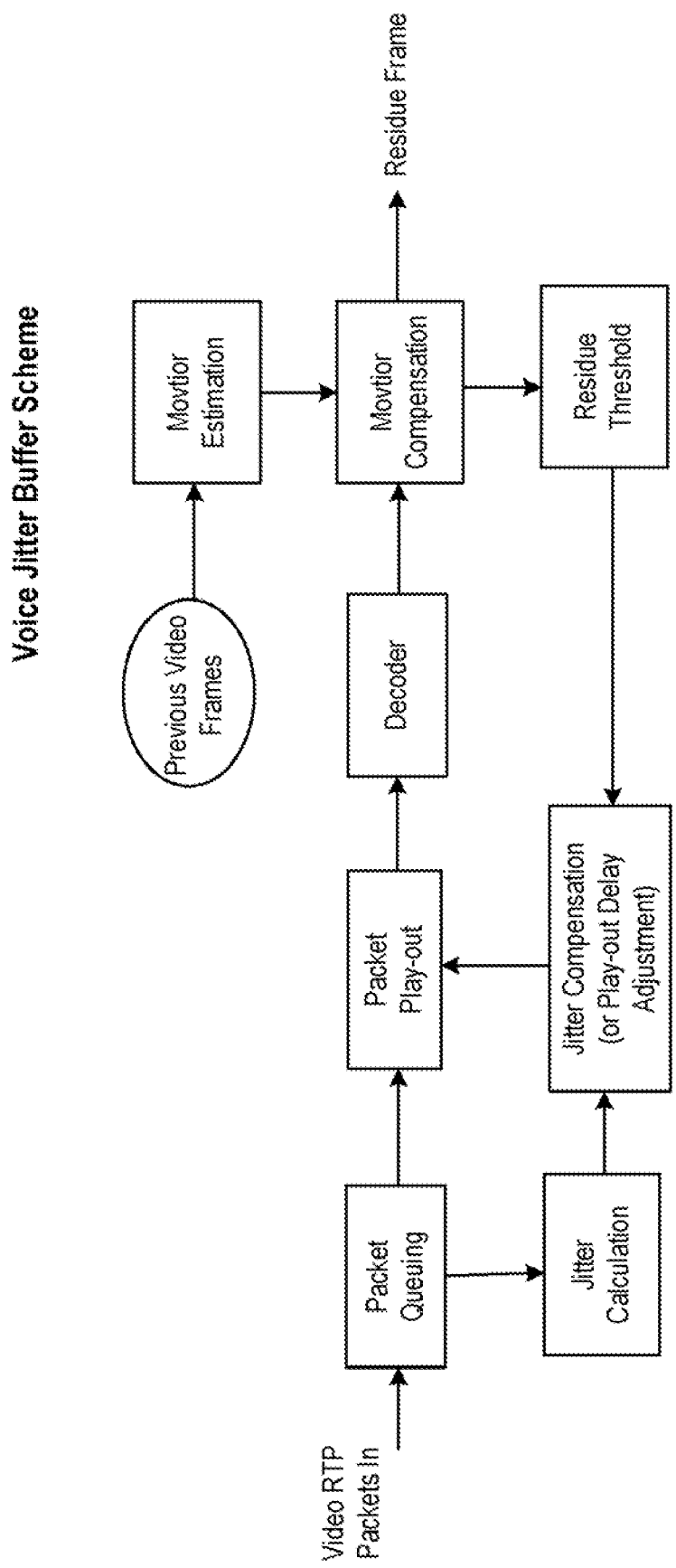
FIG. 5B depicts a video jitter buffer scheme in accordance with one or more embodiments of the present invention.

FIG. 5A-B gives a high level overview of the jitter buffer architecture. Is the path the packets will trace through functional blocks in the Voice Quality Engine (VQE). The aim here is introduce an adaptive de-jitter controller to even out play-out. A similar scheme may be used to handle video jitter.

In one of prior art jitter buffer designs, a so-called receiver-side VAD (voice activity detection) may be used to prevent the jitter buffer overflow.

In another word, the silence or talk spurt cue is used to flush the jitter buffer when the silence or talk spurt cue reaches the maximum length. The differences of the new scheme from the prior art design include that the silence or talk spurt cue is used to control when the play-out delay can be inserted to compensate the network packet jitter. So, in accordance with one or more embodiments of the present invention, the silence or talk spurt detection will become a key part of the jitter buffer scheme. Under some circumstances it may be too late to make any adjustment when the jitter buffer becomes overflow.

Here is how this content-based jitter buffer apparatus and methods can be applied to the real-world applications. Both voice and video cases are described as follows.

The FIG. 5A shows a block diagram voice of a jitter buffer in accordance with one or more embodiments of the present invention. The core jitter buffer includes one or more components for packet queuing, packet play-out, jitter calculation and jitter compensation. Here the decoder and VAD will generate a silence or talk spurt indicator. The silence or talk spurt indicator is then fed back to the jitter compensation part and used to decide when to insert the play-out silence to compensate the network packet jitter.

FIG. 5B shows a block diagram of a video jitter buffer in accordance with one or more embodiments of the present invention. The core jitter buffer is similar to voice's one, except the play-out delay will be inserted when there is no motion or very low motion on the video frames. Here after the decoder, the motion estimation and the motion compensation will generate a residue frame. A no-motion indicator can be formed from this residue frame plus some specific threshold. The no-motion indicator then fed back to the jitter compensation part and used to decide when to insert the play-out silence to compensate the network packet jitter. In video, inserting the play-out silence is actually to stop playing out the new frame while repeating the previous video frame.

As discussed above, problems such as packet delays (i.e., late arrivals of packets), packet delay variations, and packet loss may have negative effects on quality of service (QoS) in packet communication. Packet delays and packet delay variation may also be known as jitter. To address the problems, in the prior art, a fixed de-jitter buffer scheme may be employed to compensate the late arrivals of packets by periodically inserting delays (e.g., in the form of silence packets or comfort noise packets) when playing out packets from a packet buffer. However, with the fixed de-jitter scheme, delays may be excessively inserted between voice packets, resulting in choppy voice.

In the prior art, a transmitter-side voice activity detector (VAD) may also be employed for adaptively inserting delays, thereby compensating packet delays and packet delay variations. However, the transmitter-side VAD may not be supported by some user devices. Further, given existing VAD algorithms, the transmitter-side VAD may cause undesirable noise or choppy voice, for example, when a transmitting party is performing music playback, because pauses in music may be treated as silence and inappropriately handled. For another example, when the transmitting party uses G.729AB codec with the transmitter-side VAD turned on to play out some music, the user in the receiver side may perceive distorted music. Therefore, the transmitter-side VAD may be commonly turned off by packet communication service providers and may not be able to compensate packet delays and packet delay variations. As a result, fixed de-jitter buffer scheme may still be employed, and the quality of service may still be undesirable to a receiving party.

Further, in the prior art, a receiver-side silence detector may be employed for controlling packet buffer overflow, for preventing packet loss. However, according to arrangements in the prior art, voice packets may be discarded and therefore lost when the packet buffer is nearly full or is full, and the quality of service may be undesirable to the receiving party.

In contrast, embodiments of the present invention may employ a receiver-side silence detector for timely compensating delays and delay variations and adaptively playing out packets from the packet buffer. Advantageously, the transmitter-side VAD is not needed, and desirable quality of service may be provided. Further, one or more embodiments of the present invention may employ a receiver-side video detector, thereby adaptively handling jitter in video communication.

The present invention relates, in one or more embodiments, to a packet communication device that may include a detector configured to detect a characterized content in incoming packets received by the packet communication device. The characterized content may represent silence (e.g., a time period with no voice packets received) in voice communication. Alternatively or additionally, the characterized content may represent at least one of no motion and an amount of motion that is lower than a threshold. For example, the threshold of a no-motion or still picture may be selected to be 10% to 15% (in terms of data volume) of the full active picture in video communication.

The packet communication device may further include a play-out control configured to perform an adjustment of the incoming packets to produce adjusted packets and output the adjusted packets, if the detector has detected the characterized content in the incoming packets. The adjustment may include insertion of a delay, for example, in the form of silence packets or comfort noise packets. Alternatively or additionally, the adjustment may include repeating playing out packets that have been previously played out. As a result, the delays and delay variations of the incoming packets received at the packet buffer may be timely compensated, and the adjusted packets may be of acceptable quality to the receiving party.

Features and advantages of the present invention may be better understood with reference to the figures and discussions that follow.

Figure 10A:
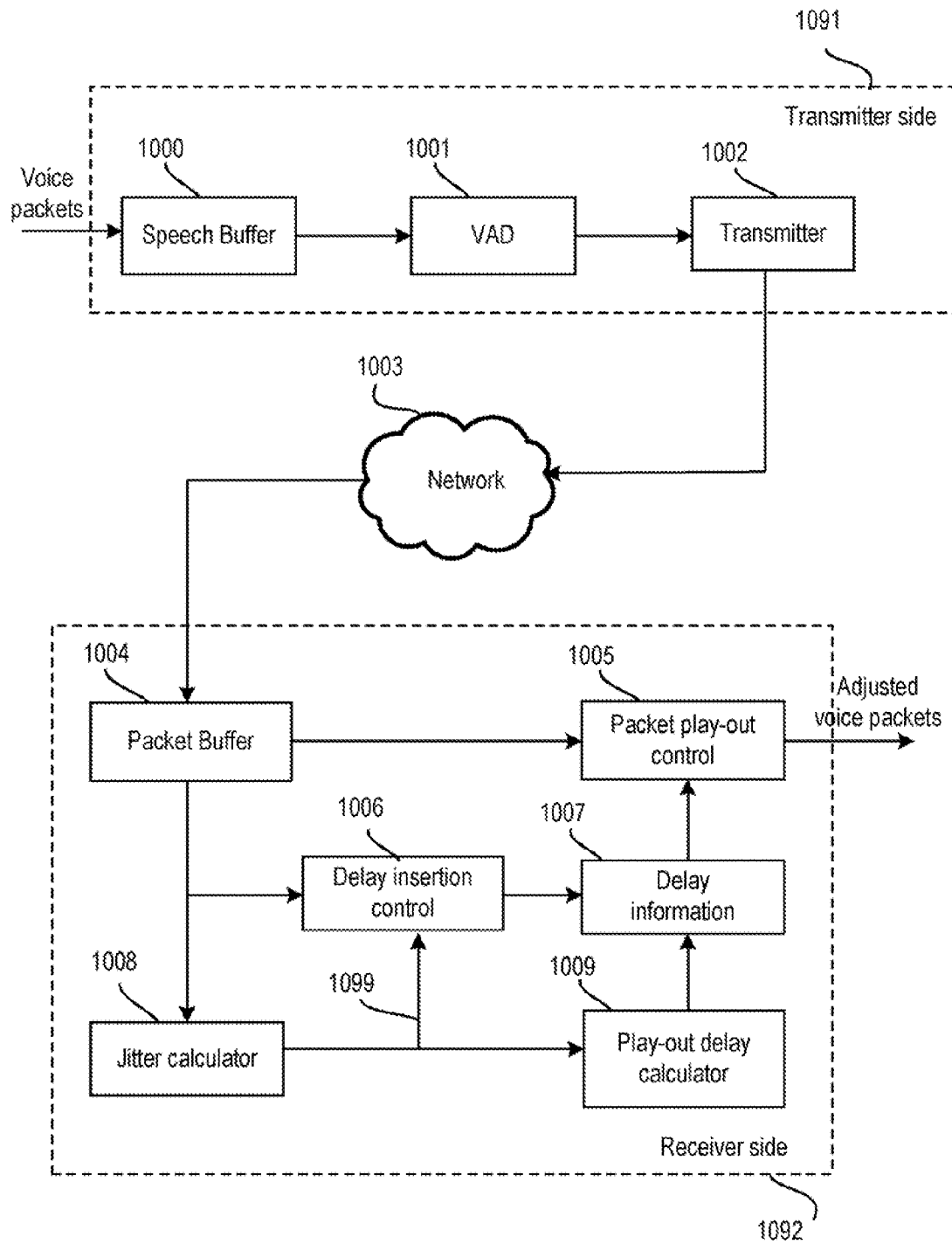
FIG. 10A shows a block diagram of a first example prior art packet voice communication system (first prior art arrangement) with an adaptive jitter buffer scheme.

FIG. 10A shows a block diagram of a first example prior art packet voice communication arrangement (first prior art arrangement) with an adaptive jitter buffer scheme. As shown in the example of FIG. 10A, the first prior art arrangement includes a transmitter-side device 1091 and a receiver-side device 1092, connected through a network 1003. Each of transmitter-side device 1091 and receiver-side device 1092 may represent a telephone, a mobile phone, or a teleconference device.

Transmitter-side device 1091 may include the following components, a speech buffer 1000, a voice activity detector 1001 (VAD 1001), and a transmitter 1002. These components may be described as follows:

Speech buffer 1000 may be configured to receive voice packets (packets) from a microphone, buffer the packets, and then transmit the buffered packets to VAD 1001.

VAD 1001 may be configured to insert a silence descriptor (SID) when there is silence (i.e., a period of time between voice packets) in the packets received from speech buffer 1000.

Transmitter 1002 may be configured to receive the packets from VAD 1001 and transmit the packets to network 1003.

In turn, network 1003 may transmit the packets to receiver-side device 1092.

Receiver-side device 1092 may include the following components, a packet buffer 1004, a packet play-out control 1005, a delay insertion control 1006, a delay information module 1007, a jitter calculator 1008, and a play-out delay calculator 1009. These components may be described as follows:

Packet buffer 1004 may be configured to receive the packets from network 1003, buffer the packets, and then send the packets to jitter calculator 1008, delay insertion control 1006, and packet play-out control 1005.

Jitter calculator 1008 may be configured to calculate the size of jitter in the packets. The jitter may represent silence, i.e., a time period between arrivals of two voice packets with no data.

Delay insertion control 1006 may be configured to determine when to insert delays based on SIDs inserted in the packets by VAD 1001 of transmitter-side device 1091. Delay insertion control 1006 may receive jitter size information from jitter calculator 1008 and may receive packets from packet buffer 1004.

Play-out delay calculator 1009 may be configured to receive jitter size information from jitter calculator 1008. Based on the jitter size information, play-out delay calculator 1009 may calculate sizes of delays to be inserted into the packets.

Delay information module 1007 may be configured to consolidate information from delay insertion control 1006 regarding timing for inserting the delays and information from play-out delay calculator 1009 regarding the sizes of the delays. Accordingly, delay information module 1007 may build the consolidated information into a data structure and send the data structure to packet play-out control 1005.

Packet play-out control 1005 may be configured to receive packets from packet buffer 1004 and insert delays into the packets, according to the data structure received from delay information module 1007.

Figure 10B:
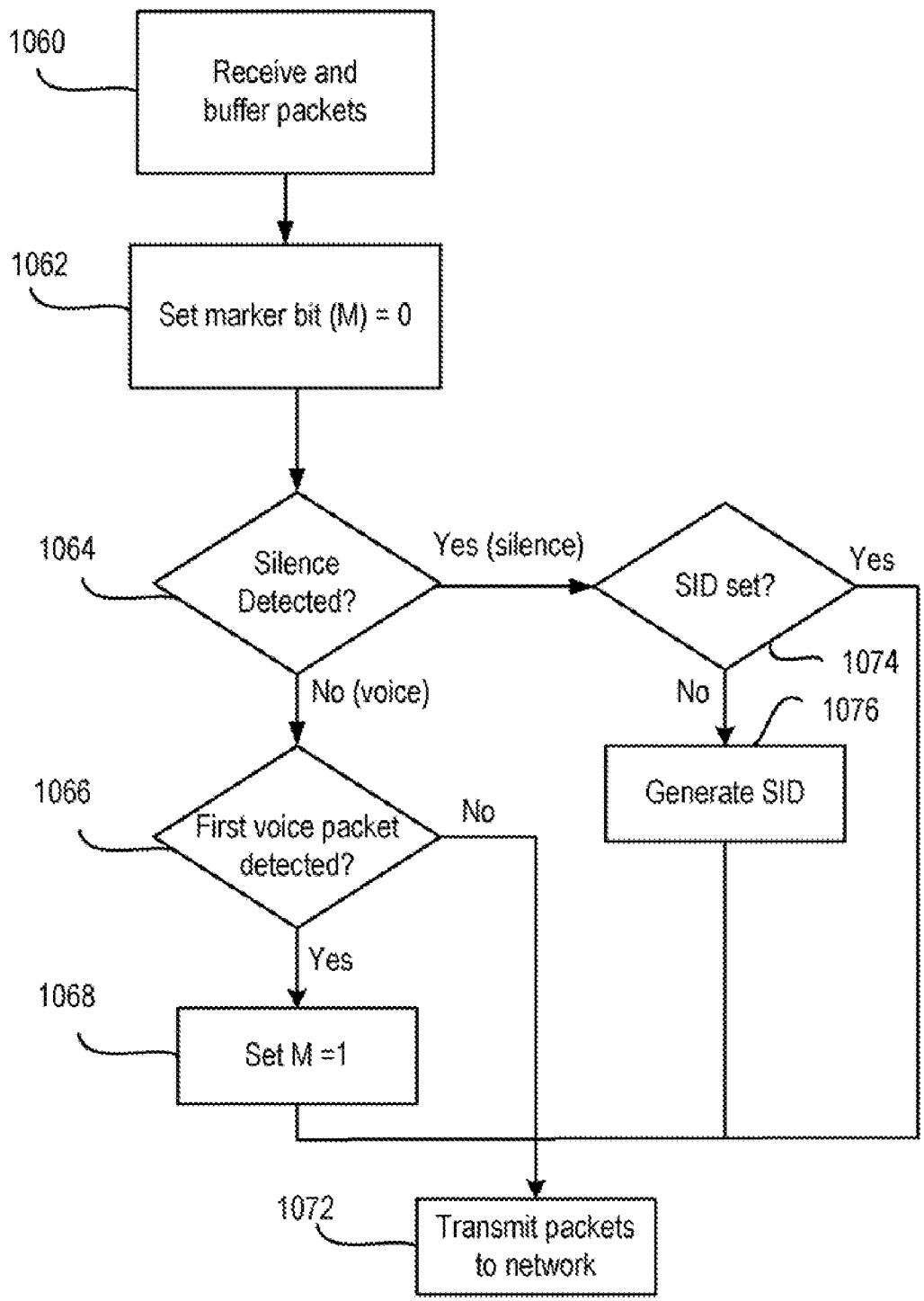
FIG. 10B shows a flowchart of a transmitter-side process of a prior art jitter buffer scheme utilized, for example, in the first prior art arrangement shown in the example of FIG. 10A.

FIG. 10B shows a flowchart of a transmitter-side process of a prior art jitter buffer scheme utilized, for example, in the first prior art arrangement shown in the example of FIG. 10A. The transmitter-side process starts with a step 1060, at which speech buffer 1000 (shown in FIG. 10A) may receive packets, for example, from the microphone used by a transmitting party. Speech buffer 1000 many then buffer the packets.

At a step 1062, speech buffer 1000 may set the marker bit of each packet to 0 by default. When each packet reaches a final step 1072, the marker bit of the packet may be set to 1 if the packet the first voice packet of a talk spurt. Otherwise, the marker bit may be kept to 0.

At a step 1064, VAD 1001 may determine whether the packets contain one or more silence periods (i.e., one or more time periods with no data between packets). If the packets contain one or more silence periods, control may be transferred to a step 1074; if not, control may be transferred to a step 1066.

At step 1074, VAD 1001 may determine whether a SID(s) have been set in the packets. A SID (silence descriptor) is configured to mark the beginning of a silence period. If the SID(s) have been set for a silence period(s) in the packets, control may be directly transferred back to final step 1072; if not, control may be transferred to a step 1076 before being transferred to final step 1072. At step 1076, VAD 1001 may generate the SID(s) for the packets. At final step 1072, transmitter 1002 (shown in FIG. 10A) may transmit the packets to network 1003.

At step 1066, VAD 1001 may determine whether the packets contain a first voice packet(s) after a silence period(s). If the packets contain a first voice packet(s), control may be transferred to a step 1068, at which VAD 1001 may set the marker bit(s) for the first voice packet(s) to 1. If the packets contain no first voice packet(s), control may be transferred to final step 1072, at which transmitter 1002 may transmit the packets to network 1003.

Figure 10C:
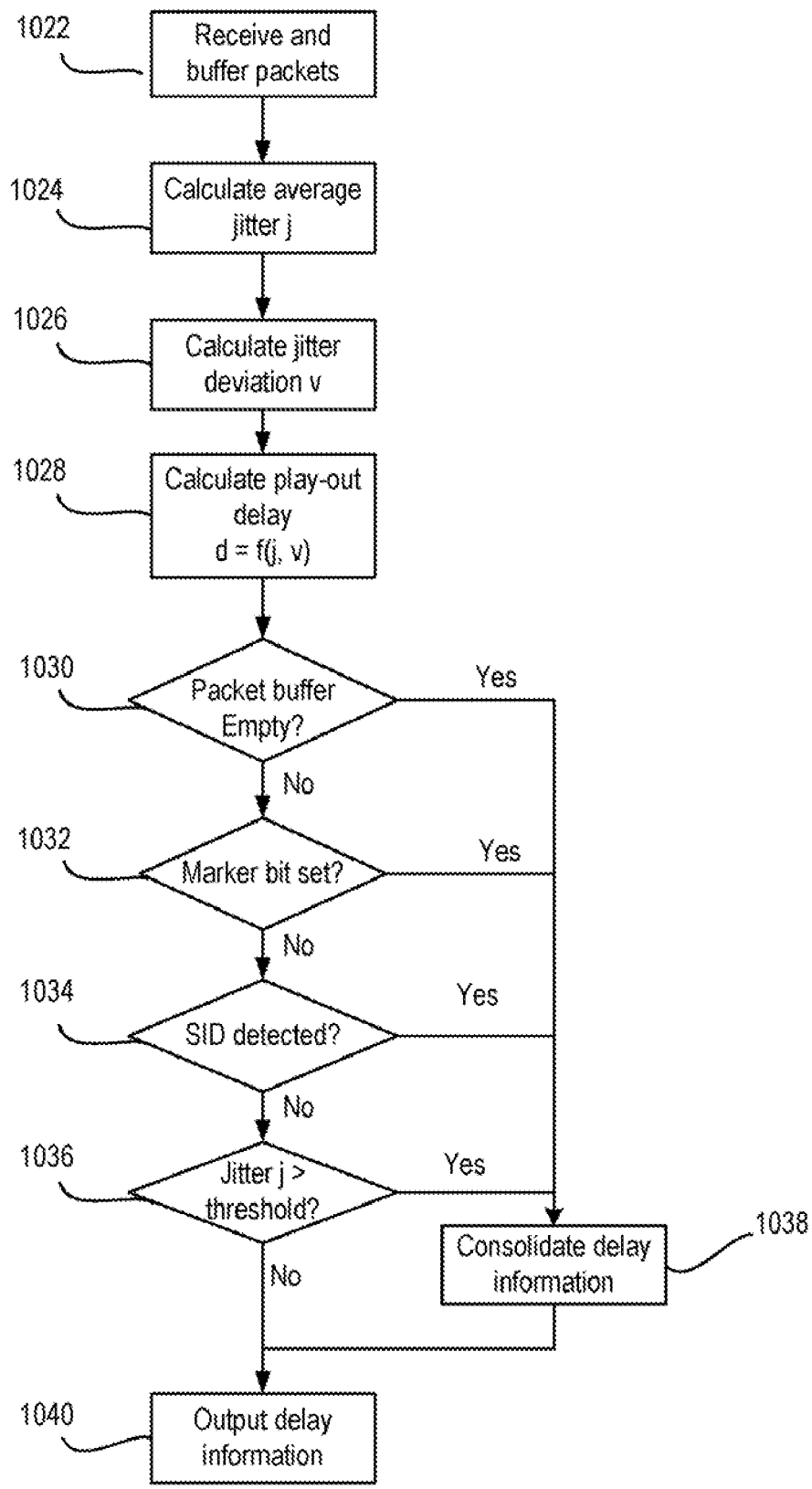
FIG. 10C shows a flowchart of a prior art delay calculation process.

FIG. 10C shows a flowchart of a prior art delay calculation process. The delay calculation process may be part of the receiver side process utilized, for example, in receiver-side device 1092 of the first prior art arrangement shown in FIG. 10A. The delay calculation process may be performed involving packet buffer 1004, delay insertion control 1006, jitter calculator 1008, play-out delay calculator 1009, and delay information module 1007 of receiver-side device 1092 shown in the example of FIG. 10A.

The delay calculation process may start at a step 1022, at which packet buffer 1004 may receive packets from network 1003 and buffer the packets. For example, the packets may represent packets transmitted by transmitter 1002 (shown in FIG. 10A) at final step 1072 (shown in FIG. 10B).

At a step 1024, jitter calculator 1008 may calculate an average jitter j.

At a step 1026, jitter calculator 1008 may calculate jitter deviation v.

At a step 1028, play-out delay calculator 1009 may calculate a play-out delay using j and v and based on a network model represented by f(j, v), i.e., delay d=f(j, v).

At a step 1030, delay insertion control 1006 may determine whether packet buffer 1004 is empty. If packet buffer 1004 is empty, control may be transferred to a step 1038; if not, control may be transferred to a step 1032.

At step 1032 delay insertion control 1006 may determine whether marker bit(s) of value 1 have been set. If the mark bit(s) of value 1 have been set, control may be transferred to step 1038; if not, control may be transferred to a step 1034.

At step 1034, delay insertion control 1006 may determine whether there is a SID(s) in the packets. If there is a SID(s), control may be transferred to step 1038; if not, control may be transferred to a step 1036.

At step 1036, delay insertion control 1006 may determine whether the average jitter j is greater than a predetermined threshold. For example, the threshold here may be the length of packet buffer 1004.

If the average jitter j is greater than the predetermined threshold, control may be transferred to step 1038; if not, control may be directly transferred to a step 1040.

At step 1038, delay information module 1007 may consolidate size and timing information for inserting delays, then control may be transferred to step 1040.

At step 1040, information pertaining to inserting delays may be output to play-out control 1005.

Figure 10D:
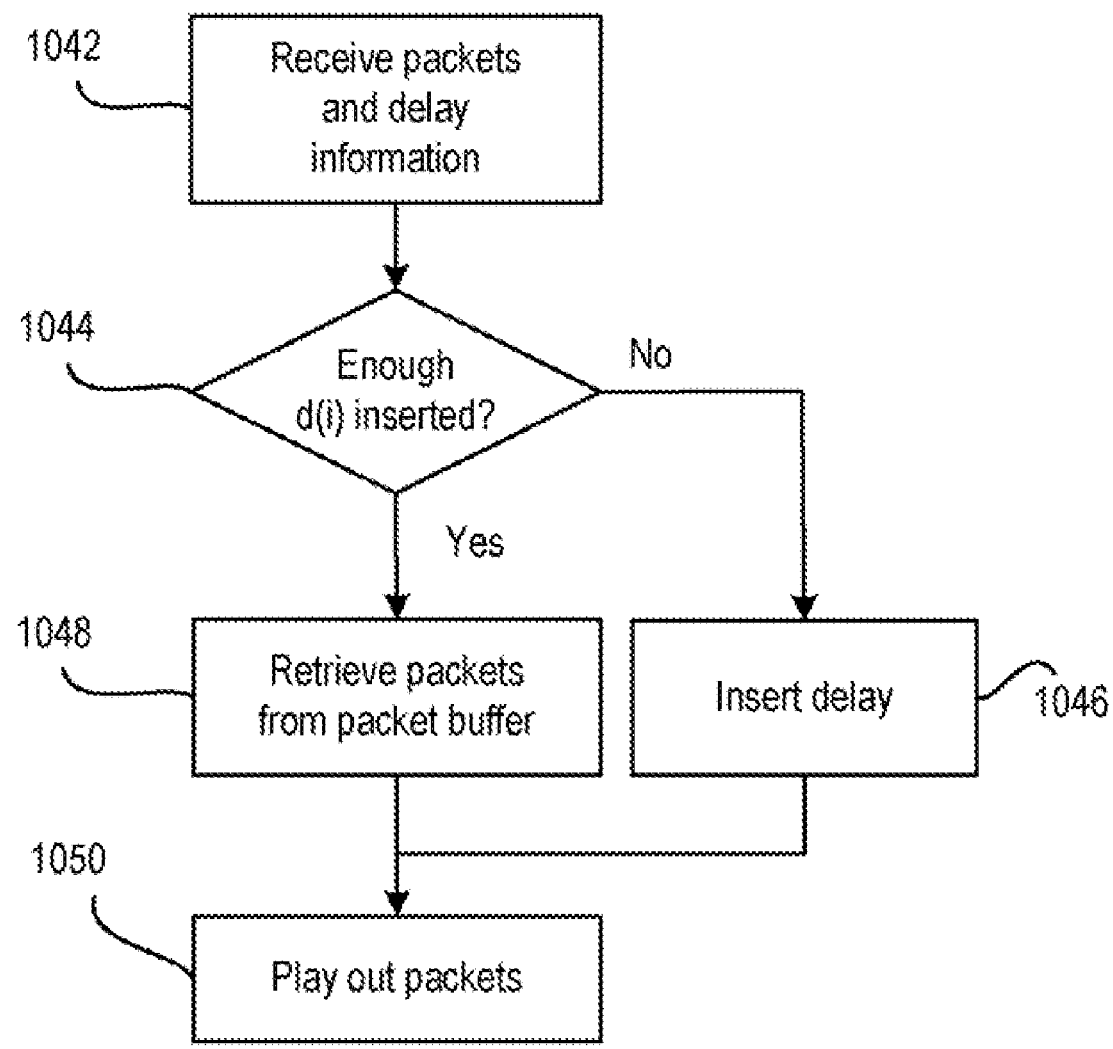
FIG. 10D shows a flowchart of a prior art packet play-out control process.

FIG. 10D shows a flowchart of a prior art packet play-out control process. The packet play-out control process may be part of a receiver side process utilized, for example, in receiver-side device 1092 of the first prior art arrangement shown in FIG. 10A. The packet play-out control process may be performed by packet play-out control 1005 shown in FIG. 10A.

The packet play-out control process starts at a step 1042, at which packet play-out control 1005 may receive packets from packet buffer 1004 (shown in FIG. 10A) and may receive the information pertaining to inserting delay as a result of step 1040 (shown in FIG. 10C) from delay information module 1007 (shown in FIG. 10A).

At a step 1044, packet play-out control 1005 may determine whether enough delays have been inserted. If enough delays have been inserted, control may be transferred to step 1048; if not, control may be transferred to a step 1046.

At step 1046, packet play-out control 1005 may insert delays (e.g., in the form of silence packets or comfort noise packets) into the packets received from packet buffer 1004.

At a step 1048, packet play-out control 1005 may retrieve packets from packet buffer 1004.

At step 1050, packet play-out control 1004 may play out packets resulted from steps 1046 and 1048.

Figure 10E:
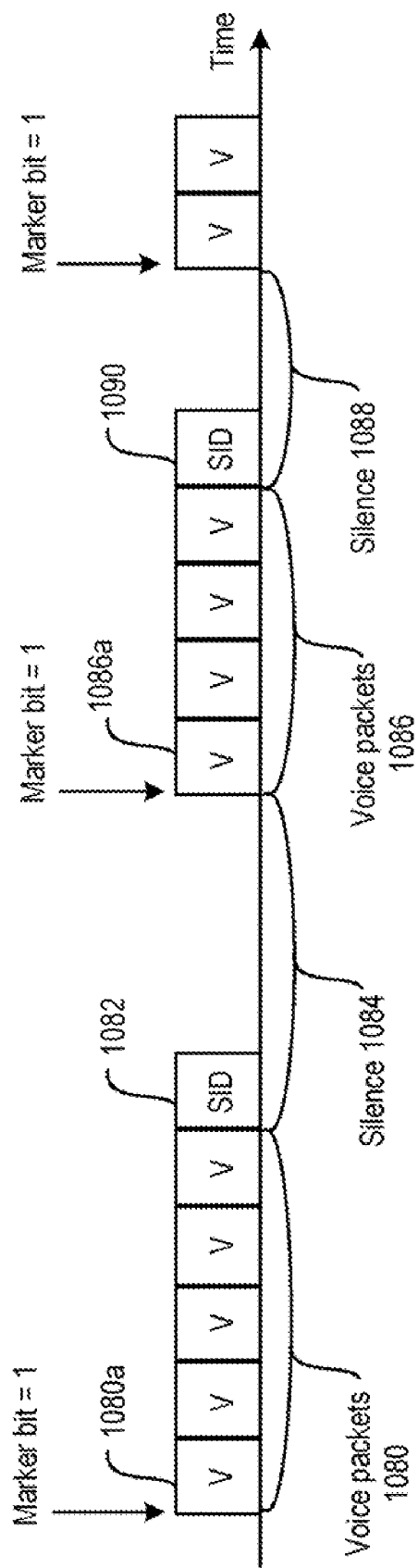

FIG. 10E shows a schematic representation of received packet flow at packet buffer 1004 (shown in FIG. 10A) when the transmitter-side VAD 1001 (shown in FIG. 10A) is turned on. As shown in the example of FIG. 10E, the received packet flow may include voice packets 1080, silence 1084 following voice packets 1080, voice packets 1086 following silence 1084, silence 1088 following voice packets 1086, etc. Silence 1084 and silence 1088 represent time periods during which no voice packets are received at packet play-out control 1005. Since VAD 1001 is turned on, VAD 1001 may have set marker bits of first voice packets such as packets 1080a and 1086a to 1. The marker bits of value 1 may be utilized at step 1032 shown in FIG. 10C for determining when to insert delay.

Further, VAD 1001 may have inserted SID 1082 at the beginning of silence 1084 and SID 1090 at the beginning of silence 1088. SID 1082 and SID 1090 may also be utilized at step 1034 shown in FIG. 10C to determine when to insert the delay.

Figure 10F:
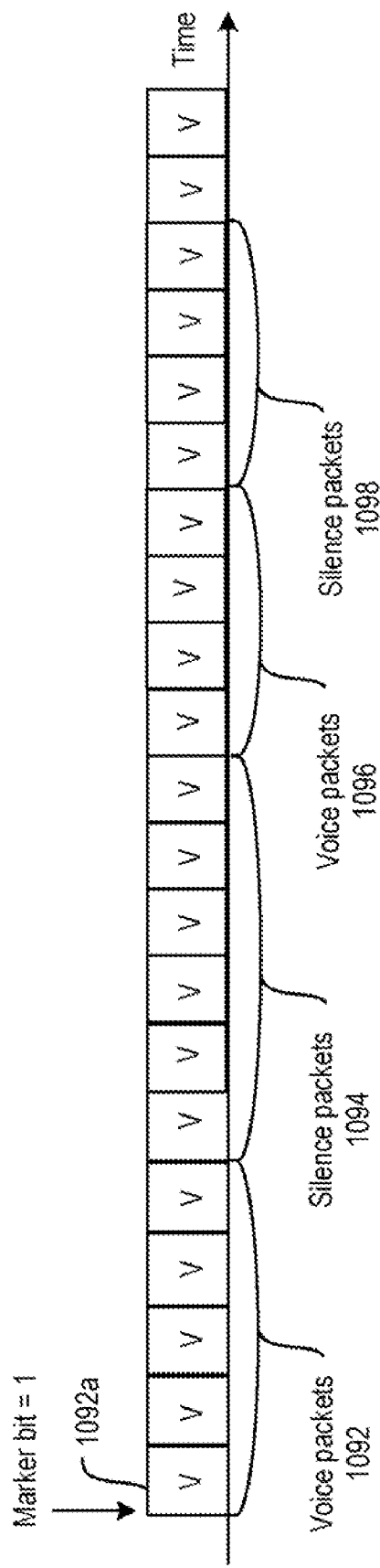
FIG. 10F shows a schematic representation of received packet flow at the packet play-out control when the transmitter-side VAD is turned off.

FIG. 10F shows a schematic representation of received packet flow at packet buffer 1004 (shown in FIG. 10A) when transmitter-side VAD 1001 (shown in FIG. 10A) is turned off. Because existing algorithms employed in VAD 1001 may cause undesirable noise or choppy voice, for example, in music playback, VAD 1001 may commonly be turned off by packet communication service providers and therefore may not be able to provide information related to voice activity.

As shown in the example of FIG. 10F, the received packet flow may include voice packets 1092, silence packets 1094 following voice packets 1092, voice packets 1096 following silence packets 1094, silence packets 1098 following voice packets 1096, etc. Because VAD 1001 is turned off, there may be no SID inserted for the silence periods represented, for example, by silence packets 1094 and silence packets 1098. As a result, step 1034 (i.e., detecting SIDs) shown in FIG. 10C may not be performed.

Further, although voice packet 1092a may have a marker bit value of 1, all of the rest of the received packets may have a marker bit value of 0. Therefore, step 1032 (i.e., determining whether mark bit values for first packets are set to 1) shown in FIG. 10C may not be performed.

Still further, when VAD 1001 on transmitter side 1091 is turned off, the packets may be continuously coming into the packet buffer 1004 on receiver side 1092 such that packet buffer 1004 may never be empty. Therefore, step 1030 (i.e., determining whether packet buffer 1004 is empty) shown in FIG. 10C may not be performed as designed.

Accordingly, when VAD 1001 is turned off, delay insertion control 1006 may not be able to perform steps 1030, 1032, and 1034 for determining the timing for inserting delays. Although, at step 1036 shown in FIG. 10C, delay insertion control 1006 may still be able obtain information regarding whether the average jitter j(i) is greater than the predetermined threshold, the information is not sufficient for determining the timing for inserting the delays. For example, when the average jitter j(i) is greater than the predetermined threshold, it may have been to late to insert the delays. Consequently, the delays may be inserted at inaccurate timing, causing choppy voice in voice communication.

Furthermore, even if VAD 1001 is turned on, existing VAD algorithms may not enable VAD 1001 to insert SIDs precisely. As a result, front end clipping and/or rear end clipping of voice packets may occur, and voice quality may be undesirable to a receiving party.

Figure 11A:
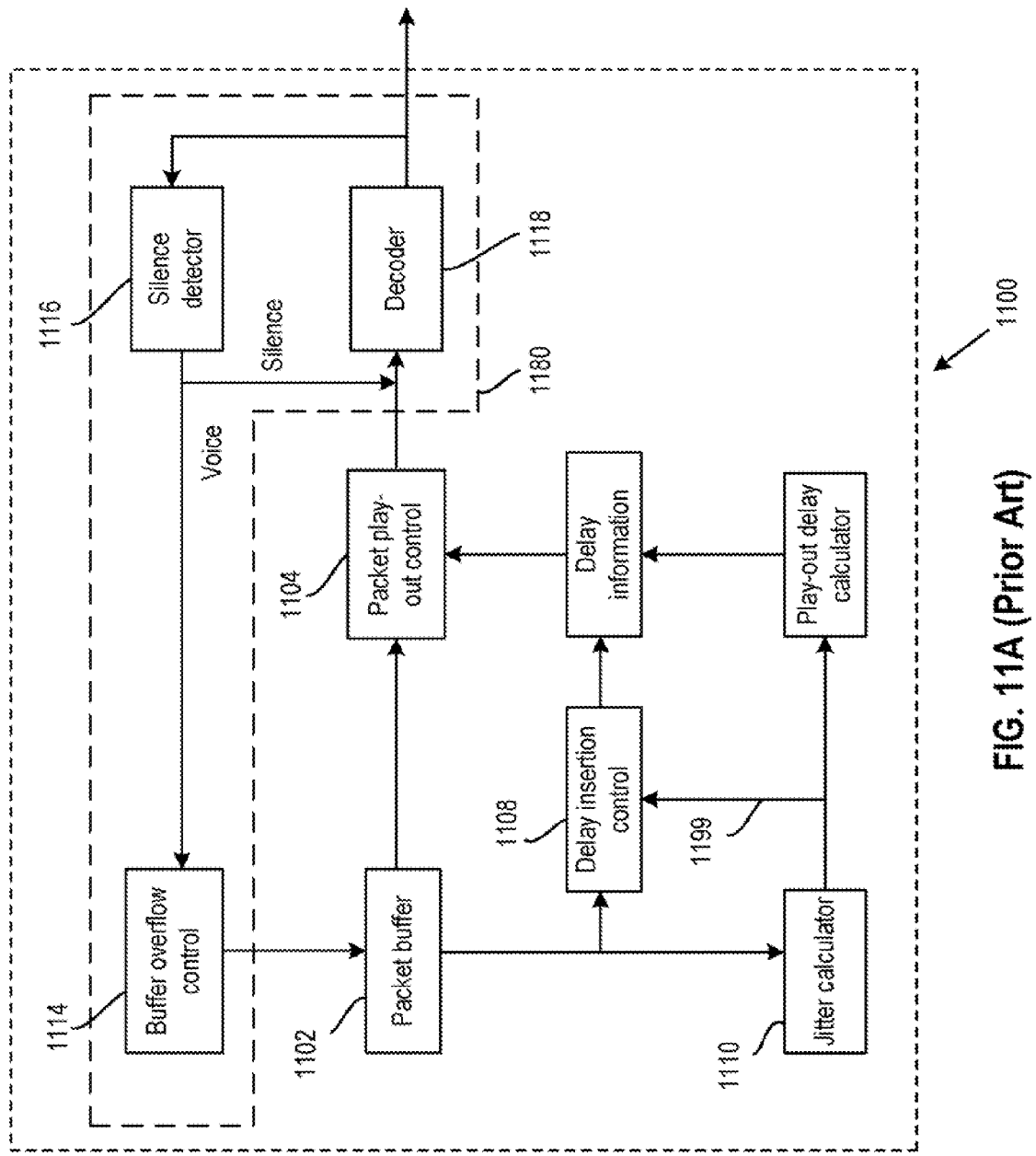
FIG. 11A shows a block diagram of a receiver-side device of a second prior art packet voice communication system (second prior art arrangement), which includes adaptive buffer overflow control.

FIG. 11A shows a block diagram of a receiver-side device 1100 of a second prior art packet voice communication arrangement (second prior art arrangement), which includes adaptive buffer overflow control. As shown in the example of FIG. 11A, receiver-side device 1100 includes the components of receiver-side device 1092 in the first prior art arrangement shown in FIG. 10A. In addition, receiver-side device 1100 includes additional components 1180. The additional components 1180 may include a decoder 1118, a silence detector 1116, and a buffer overflow control 1114, described as follows.

Decoder 1118 may be configured to decompress voice packets.

Silence detector 1116 may be configured to detect silence in the packets received from decoder 1118. If there is silence, then silence detector 1116 may set a silence flag value to 1. If there is no silence, silence detector 1116 may set the silence flag value to 0.

Buffer overflow control 1114 may be configured to monitor the status of a packet buffer 1102. According to the status of packet buffer 1102, buffer overflow control 1114 may determine whether to drop or to keep next packets received at packet buffer 1102.

Figure 11B:
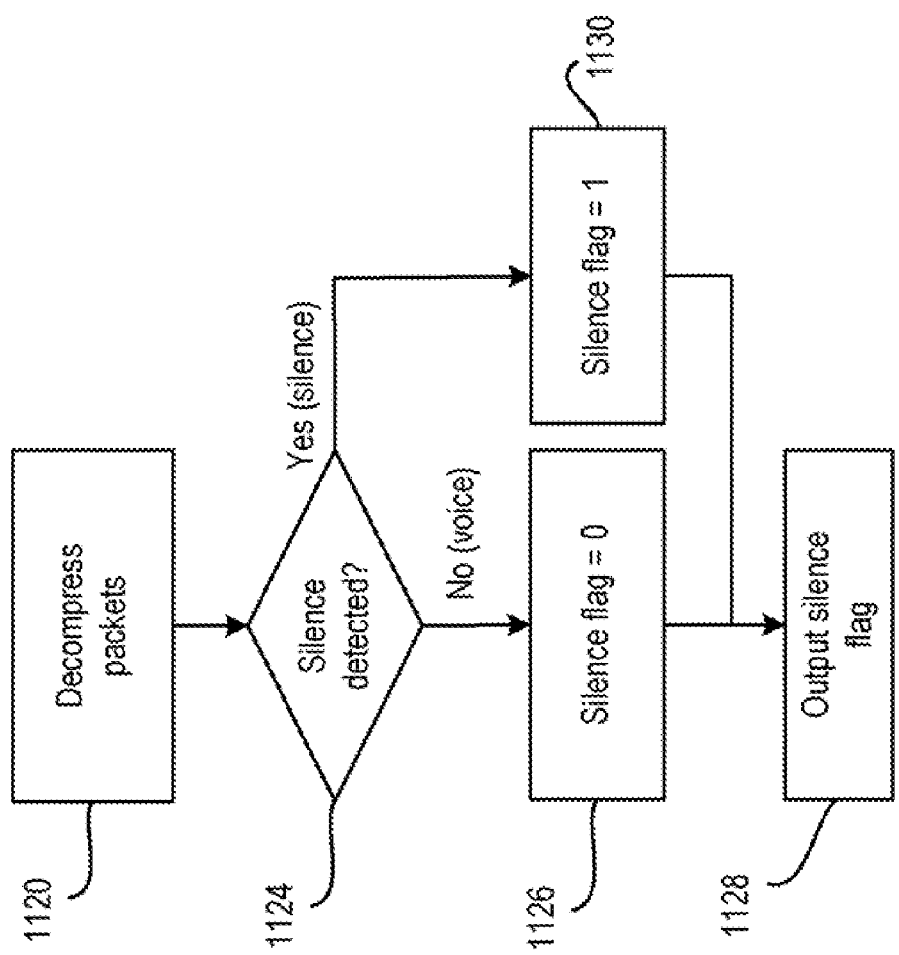
FIG. 11B shows a flowchart of a silence detection process utilized, for example, in the receiver-side device shown in the example of FIG. 11A.

FIG. 11B shows a flowchart of a silence detection process utilized, for example, in receiver-side device 1100 shown in the example of FIG. 11A. The silence detection process starts at a step 1120, at which decoder 1118 (shown in FIG. 11A) may decompress voice packets (packets) received from a packet play-out control 1104 (shown in FIG. 11A).

At a step 1124, silence detector 1116 (shown in FIG. 11A) may determine whether there is silence in the received packets. If there is silence, control may be transferred to a step 1130, at which silence detector 1116 sets the silence flag value to 1. If there is no silence, control may be transferred to a step 1126, at which silence detector 1116 sets the silence flag value at 0.

At a step 1128, silence detector 1116 may output the silence flag value.

Figure 11C:
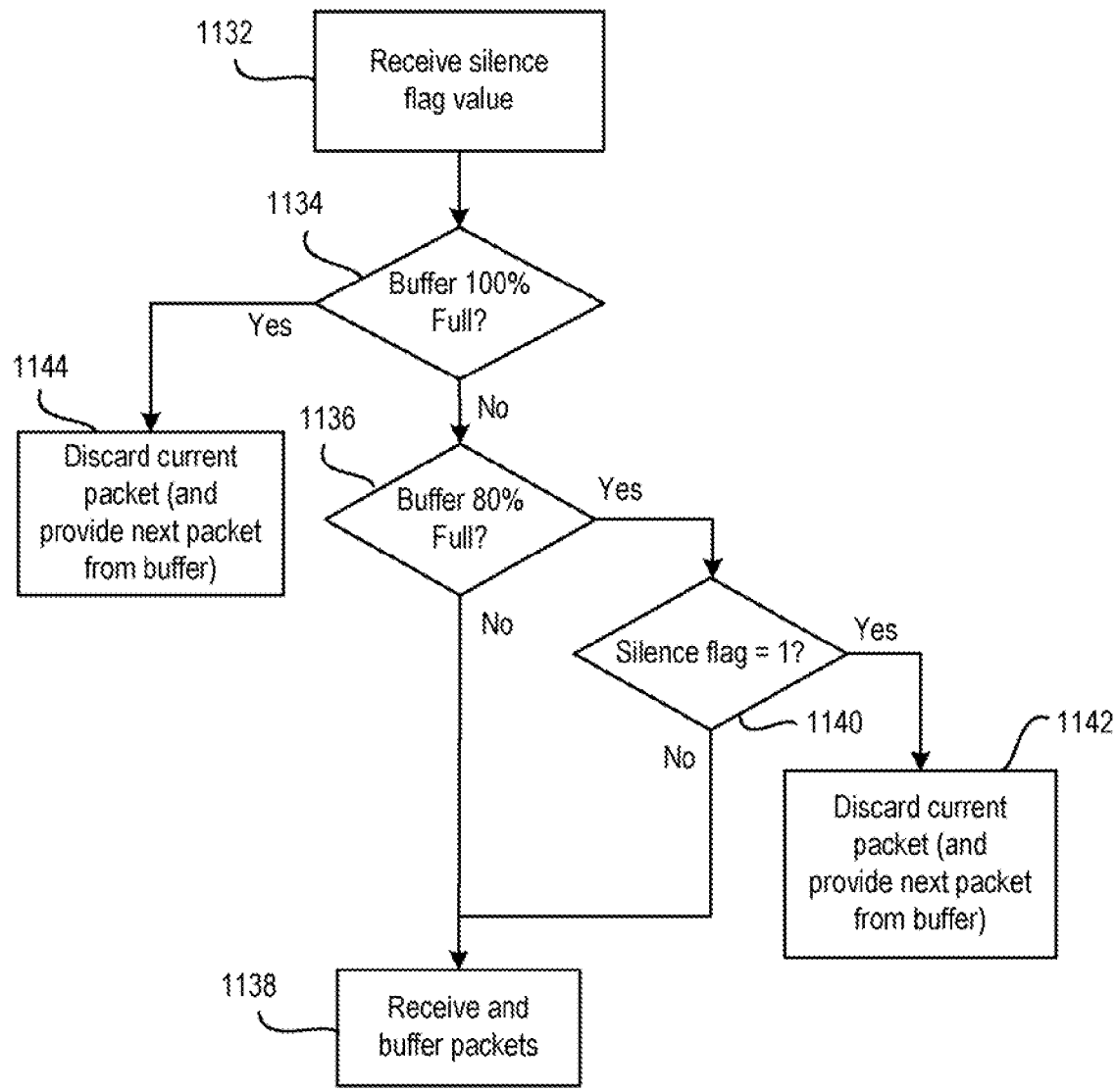
FIG. 11C shows a flowchart of a buffer overflow control process utilized, for example, in the receiver-side device shown in the example of FIG. 11A.

FIG. 11C shows a flowchart of a buffer overflow control process utilized, for example, in receiver-side device 1100 shown in the example of FIG. 11A. The buffer overflow control process may be performed by buffer overflow control 1114 shown in FIG. 11A. The buffer overflow control process starts at a step 1132, at which buffer overflow control 1114 receives the silence flag value from silence detector 1116 (shown in FIG. 11A).

At a step 1134, buffer overflow control 1114 may determine whether packet buffer 1102 (shown in FIG. 2A) has reached a first threshold such as, for example, 100% full. If packet buffer 1102 has reached the first threshold, control may be transferred to a step 1144; if not, control may be transferred to a step 1136.

At step 1144, buffer overflow control 1114 may command packet buffer 1102 to discard newly received packets, regardless of whether the newly receive packets represent voice packets. Buffer overflow control 1114 may also command packet buffer 1102 to provide packets to be played out.

At step 1136, buffer overflow control 1114 may determine whether packet buffer 1102 has reached a second threshold such as, for example, 80% full. If packet buffer 1102 has reached the second threshold, control may be transferred to step 1140; if not, control may be transferred to a step 1138.

At a step 1140, buffer overflow control 1114 may determine whether the silence flag value received from silence detector 1116 is 1. If the silence flag value is 1, control may be transferred to step 1142; if not, control may be transferred to step 1138.

At a step 1142, buffer overflow control 1114 may command packet buffer 1102 to discard newly received packets since the newly received packets may represent silence. Buffer overflow control 1114 may also command packet buffer 1102 to provide packets to be played out. Control may then be transferred to step 1138.

At step 1138, packet buffer 1102 may receive and buffer packets.

The buffer overflow control process shown in the example of FIG. 11C may not be effective in maintaining quality of service. For example, when packet buffer 1102 has reached the first threshold, e.g., 100% full, voice packets may be discarded according to step 1144. Therefore, choppy voice may be resulted. Further, when packet buffer 1102 has reached the second threshold but not the first threshold, e.g., 80% full but not 100% full, packet buffer 1102 may still receive bursts of voice packets which are greater than the remaining capacity of the packet buffer 1102. Consequently, overflow may still occur, and packets (including voice packets) that exceed the capacity of packet buffer 1102 may still be lost. As a result, quality of service may be undesirable to a receiving party.

Figure 12A:
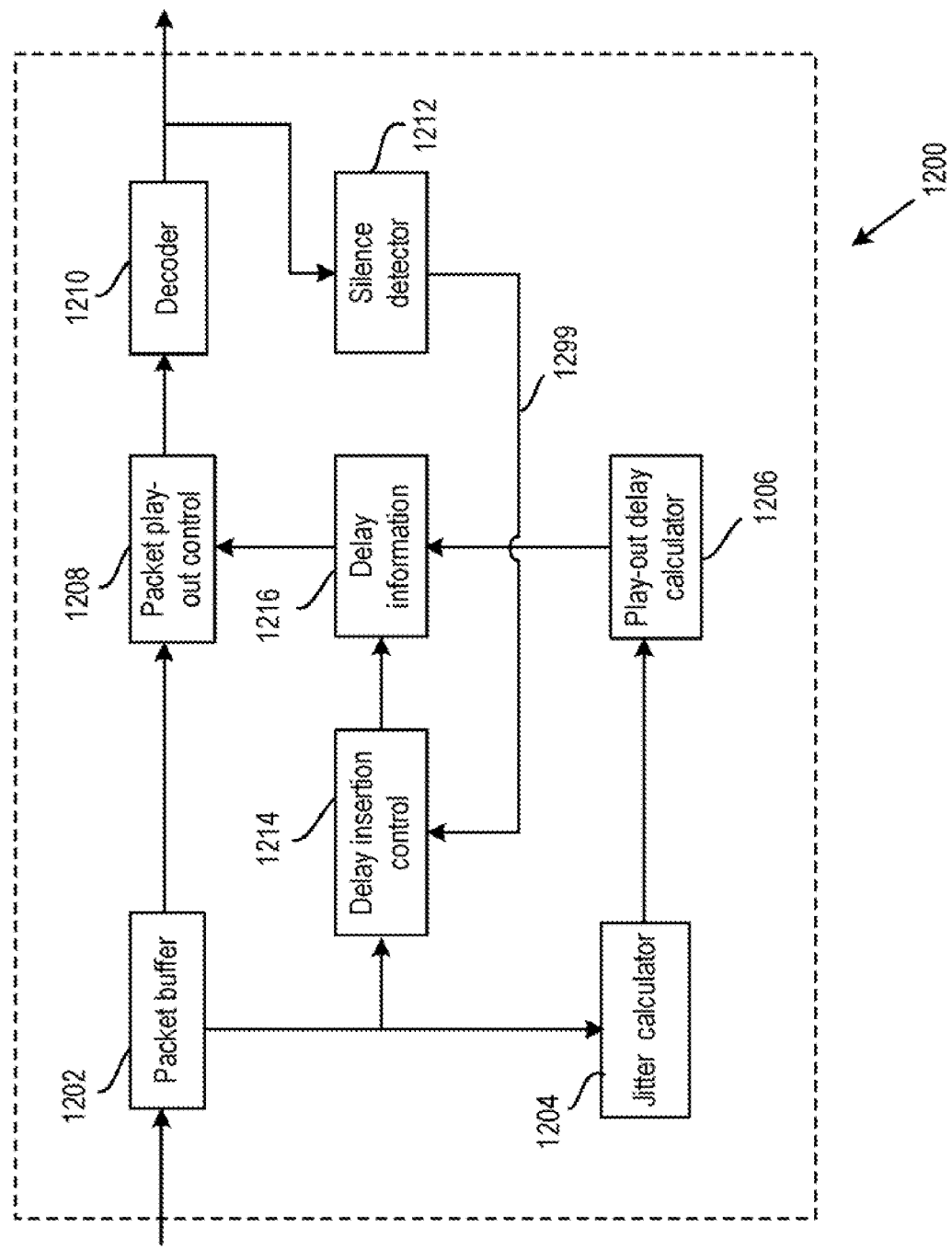
FIG. 12A shows, in accordance with one or more embodiments of the present invention, a block diagram of a receiver-side device of a packet voice communication system with adaptive jitter handling.

FIG. 12A shows, in accordance with one or more embodiments of the present invention, a block diagram of a receiver-side device 1200 of a packet voice communication system with adaptive jitter handling. Receiver-side device 1200 may represent a user device such as, for example, a telephone, a mobile phone, a teleconference device, an audio player, or a video phone. Alternatively or additionally, receiver-side device 1200 may represent a server device in a packet communication network.

As shown in the example of FIG. 12A, receiver-side device 1200 may include one or more of the following components: a packet buffer 1202, a packet play-out control 1208, a decoder 1210, a delay insertion control 1214, a delay information module 1216, a jitter calculator 1204, and a play-out delay calculator 1206. Receiver-side device 1200 may further include a detector configured to detect a characterized content such as a silence detector 1212 for detecting silence. Silence detector 1212 may be configured to receive decompressed packets from decoder 1210. Silence detector 1212 may further be configured to process the decompressed packets and provide a silence flag (but not the decompressed packets) to delay insertion control 1214 through a link 1299. One or more of the components may be included in software that may be downloaded into receiver-side device 1200.

One or more components of receiver-side device 1200 may have capabilities similar to capabilities of components of receiver-side device 1100 shown in FIG. 11A. However, in contrast with silence detector 1116 of receiver-side device 1100, silence detector 1212 may be configured determine when to insert delays for handling jitters instead of or in addition to controlling packet buffer overflow.

Further, in contrast with delay insertion control 1108 of receiver-side device 1100, instead of receiving information from jitter calculator 1204 as in the prior art jitter buffering schemes, delay insertion control 1214 may receive information from silence detector 1212.

Delay insertion control 1214 may be directly coupled to silence detector 1212 through link 1299. Link 1299 may represent a direct logical link or physical link. There may be no direct logical or physical connection between jitter calculation 1204 and delay insertion control 1214, in contrast with link 1199 between jitter calculator 1110 and delay insertion control 1108 shown in the example of FIG. 11A and link 1099 between jitter calculator 1008 and delay insertion control 1006 shown in the example of FIG. 10A.

Figure 12B:
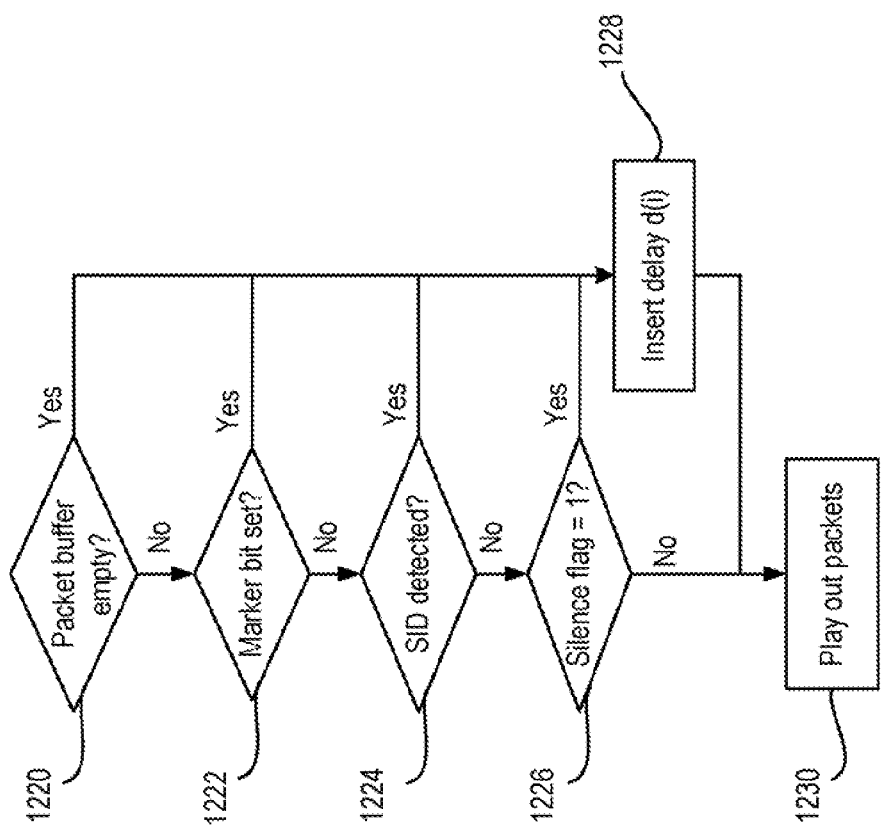
FIG. 12B shows, in accordance with one or more embodiments of the present invention, a delay insertion control process utilized for adaptive jitter handling utilized, for example, in the receiver-side device shown in the example of FIG. 12A.

FIG. 12B shows, in accordance with one or more embodiments of the present invention, a delay insertion control process utilized for adaptive jitter handling utilized, for example, in receiver-side device 1200 shown in the example of FIG. 12A. The delay insertion control process starts with a step 1220, at which delay insertion control 1214 (shown in FIG. 12A) may determine whether packet buffer 1202 (shown in FIG. 12A) is empty, i.e., containing no packets for playing out. If packet buffer 1202 is empty, control may be transferred to a step 1228; if not, control may be transferred to a 1222.

At step 1222, delay insertion control 1214 may determine whether the marker bit(s) of value 1 are set in incoming packets that are received through packet buffer 1202. If the mark bit(s) of value 1 are set, control may be transferred to step 1228; if not, control may be transferred to a step 1224.

At step 1224, delay insertion control 1214 may determine whether there is a SID(s) in the incoming packets. If there is a SID(s), control may be transferred to step 1228; if not, control may be transferred to a step 1226.

At step 1226, delay insertion control 1214 may determine whether the silence flag value received from silence detector 1212 (shown in FIG. 12A) is 1. If the silence flag value is 1, control may be transferred to step 1228; if not, control may be transferred to a step 1230.

At step 1228, packet play-out control 1208 (shown in FIG. 12A) may insert delays (e.g., silence packets or comfort noise packets) into the incoming packets according to information received from delay information module 1216 (shown in FIG. 12A) to generate adjusted packets. The delay information includes size information provided by play-out delay calculator 1206 (shown in FIG. 3A) and timing information provided by delay insertion control 1214.

At step 1230, packet play-out control 1208 may play out the adjust packets. The adjusted packets may be decompressed by decoder 1210 and then be played out by receiver-side device 1200.

As can be appreciated from FIG. 12B, in accordance with one or more embodiments of the present invention, delay insertion control 1214 may determine the timing for inserting delays based on silence flag value received from silence detector 1212 (at step 1226) even if no information is received from jitter calculator 1204.

Figure 13:
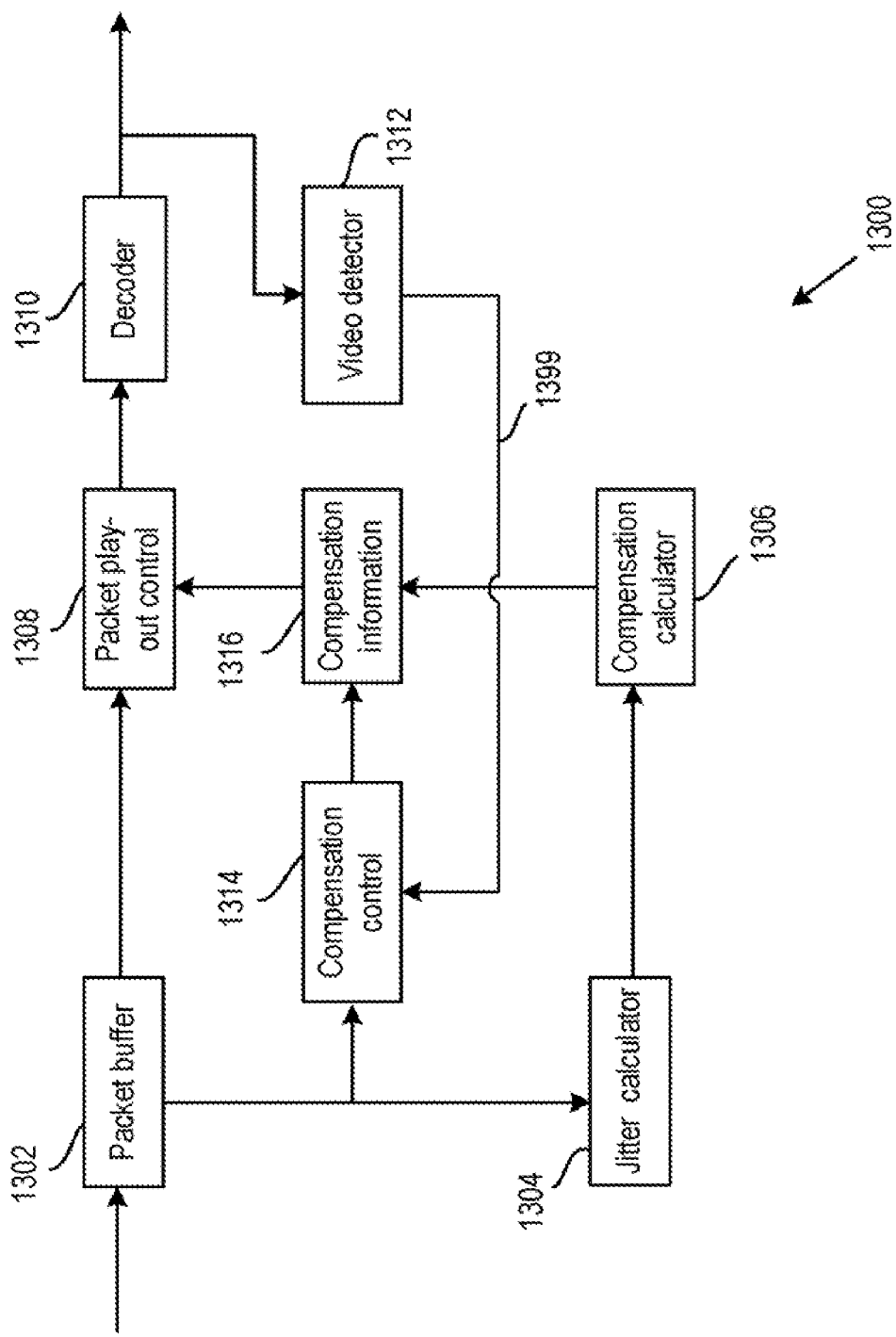
FIG. 13 shows, in accordance with one or more embodiments of the present invention, a block diagram of a receiver-side device of a packet video communication system with adaptive jitter handling.

FIG. 13 shows, in accordance with one or more embodiments of the present invention, a block diagram of a receiver-side device 1300 of a packet video communication system with adaptive jitter handling. Receiver-side device 1300 may represent at least one of a telephone, a mobile phone, a teleconference device, a video phone, and a video player. Alternatively or additionally, receiver-side device 1300 may represent a server device in a packet communication network.

Receiver-side device 1300 may include components performing functions similar to functions of components of receiver-side device 1200 shown in the example of FIG. 12A. Receiver-side device 1300 may include one or more of a packet buffer 1302, a jitter calculator 1304, a compensation control 1314, a compensation calculator 1306, a compensation information module 1316, a packet play-out control 1308, a decoder 1310, and a video detector 1312.

What may be different may be that video detector 1312 may be configured to detect no motion or low motion in video packets, instead of silence. Further, instead of being configured to calculate and consolidate information for delay insertion, compensation 1306, compensation control 1314, and compensation information module 1316 may be configured to calculate and consolidate information for video compensation. The video compensation may include stopping playing new video frames while repeating video frames and may be performed by packet play-out control 1308.

Similar to the configuration of receiver-side device 1200, compensation control 1314 may be directly coupled to video detector 1312 through a link 1399 for determining timing for the video compensation.

The video compensation control process for jitter handling utilized in receiver-side device 1300 may be similar to the delay insertion control process shown in the example of FIG. 12B.

One or more embodiments of the present invention may involve a receiver-side device that includes a configuration similar the configuration of receiver-side device 1300 and is configured to handle jitter in multimedia communication that includes voice and video. Further, one or more embodiments of the present invention may involve a delay insertion control and video compensation control process that is similar to the delay insertion control process shown in the example of FIG. 12B.

As can be appreciated from the foregoing, embodiments of the present invention may effectively handle jitter in packet communication without depending on a transmitter-side voice activity detector (VAD) or a fixed jitter buffer scheme. Using a receiver-side silence detector for delay insertion control instead of only for buffer overflow control, embodiments of the present invention may accurately insert delays without unnecessarily inserting delays into voice packets. Advantageously, choppy voice may be reduced, and voice quality may be ensured. Further, embodiments of the present invention may be utilized in video communication and/or multimedia communication.

D. Divitas Description Protocol (DDP)

One or more embodiments of the present invention include a light weight protocol over SIP that will efficiently transport information between the server and the client and will work independent of the hardware and software platforms.

Architecture of DDP: DDP has been architected taking the following factors into consideration:

Independent of server and client hardware and OS: The structure and format of the protocol (DDP) is such that DDP is agnostic of the server or handset hardware platform as well as the operating system running on both of the platforms. In accordance with one or more embodiments of the present invention, the protocol is architected and designed to run on any server or handset hardware platform and is independent of the Operating System/SW platform running as well. For example, DDP may run on Linux, Symbian, Windows Mobile 5.0 etc. In summary, no special adapter layer needs to designed or developed every time this module has to be ported on to a new hardware or software platform.

Decoupled from control plane protocol: DDP has been architected such that is can be used with any of the control plane technologies that is use on a given platform—i.e., SIP, H.323 etc.

Independent of transport protocol: Designed to be efficient when used over both UDP and TCP. Has an optical module to ensure a level of reliability and performance (using ACK/NACK and a windowing mechanism) if being used over a transport layer than is best effort. This reliability module removes the burden on higher layer application to worry about guaranteed delivery especially in environments with high packet loss.

Generic and application-unaware: DDP will be used for a wide range of application ranging from critical control plane messages with strict real time requirements to application that need to transfer large amounts of data between the server and the client. Optional module within DDP enables the application to transfer files and buffers between the server and client. The protocol also does not care about the type of the application data—i.e. binary, text.

Service Priority Level: Enables the scheduling and queuing of messages with different priority levels for application with different delay and service requirements.

Support for Encryption: Optional module within DDP allows the server and handset to set up a secure tunnel at initialization and all further exchange of DDP messages are encrypted providing a level of security for applications that need encryption. This will still allow applications to exchange unencrypted messages for such applications that do not need encryption.

Built-in Session Management: Has specific control messages to initialize and maintain the session between the server and the client.

Independent of the medium: The protocol is independent of the medium over which the client is connected to the server. The session could be over WiFi, cellular data channel or wired Ethernet.

Figure 6A:
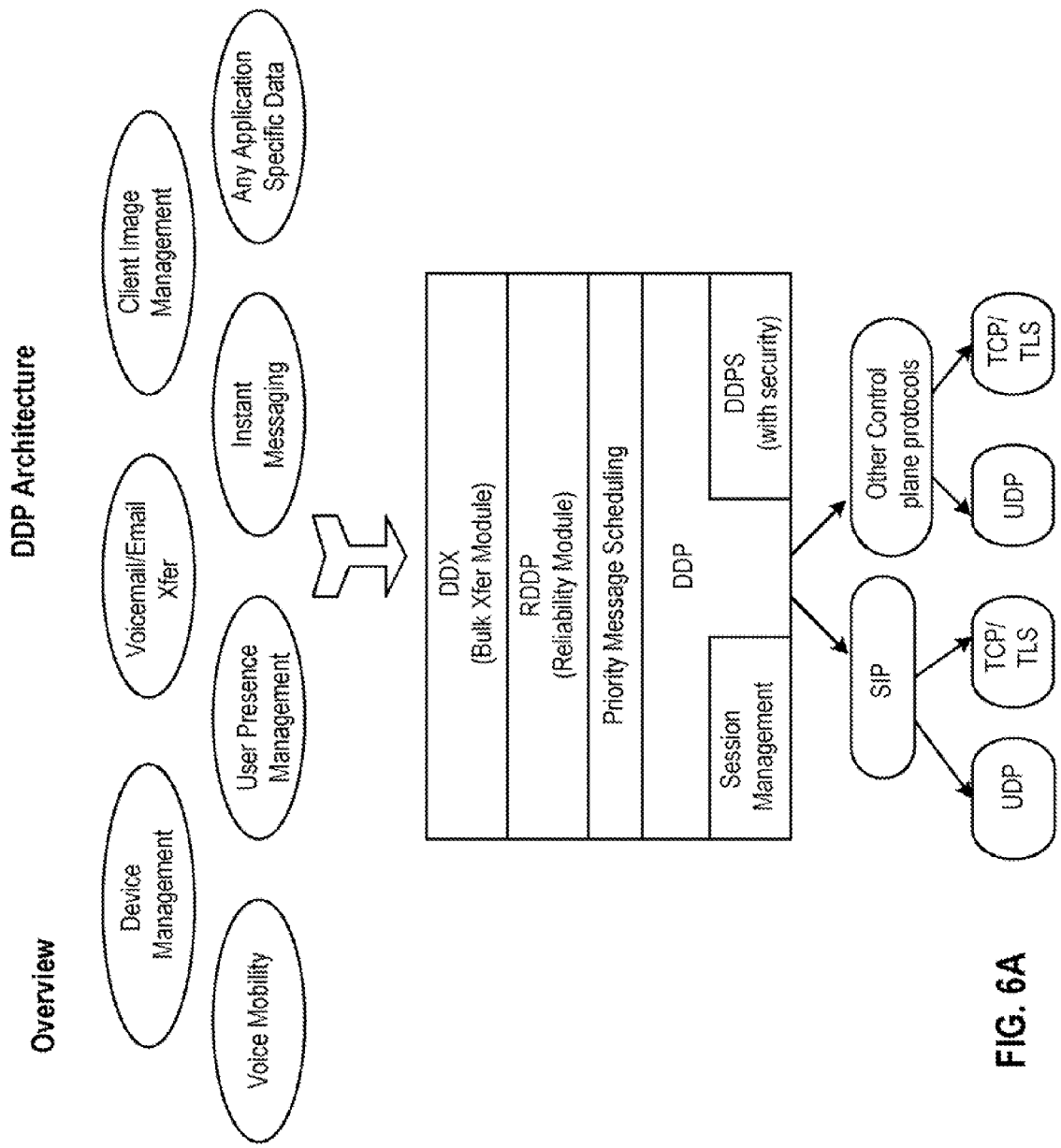
FIG. 6A depicts an overview of a DDP architecture in accordance with one or more embodiments of the present invention.

FIG. 6A shows an overview of a DDP architecture that is fabricated in accordance with one or more embodiments of the present invention. As shown in FIG. 6A, DDP is a session layer application that runs over SIP protocol. The encrypted application layer information that is transmitted between client and server is used to affect handoff decisions, provide session persistence for data applications such as, for example and without limitation, email or SMTP. FIG. 6A gives a high level view of the different modules that make up DDP. Here is a brief description of the different modules within DDP in accordance with one or more embodiments of the present invention:

i. DDP Message Handler: This is comprised of the parser and the message formatting module. The parser is responsible for checking the validity of a received DDP message and extracting the various information pieces before invoking the callback handlers. The formatting module takes the information from a higher level application and formats the DDP message before the DDP message is packed in to a signaling message packet.

ii. Session Management: An inbuilt mechanism to evaluate the health of the DDP session between two peers and mechanism for informing the registered applications if the session fails.

iii. DDP Scheduler: Provision for having different priority levels for DDP messages based on the application requirements.

iv. Reliable DDP module: Support for guaranteeing reliable delivery of DDP messages depending on the application requirements.

v. DDX (Divitas Data Transfer) module: The module that uses DDP messages for transferring files and data buffers between peers. The DDX module will work independent of the file format or the buffer contents and has mechanisms for error checking and confirmation of delivery.

vi. DDPS: The module in DDP that encrypts and decrypts the DDP contents before they are inserted in the signaling packets. DDP has a protocol for establishing the secure DDP tunnel between 2 Divitas peers.

Figure 6B:
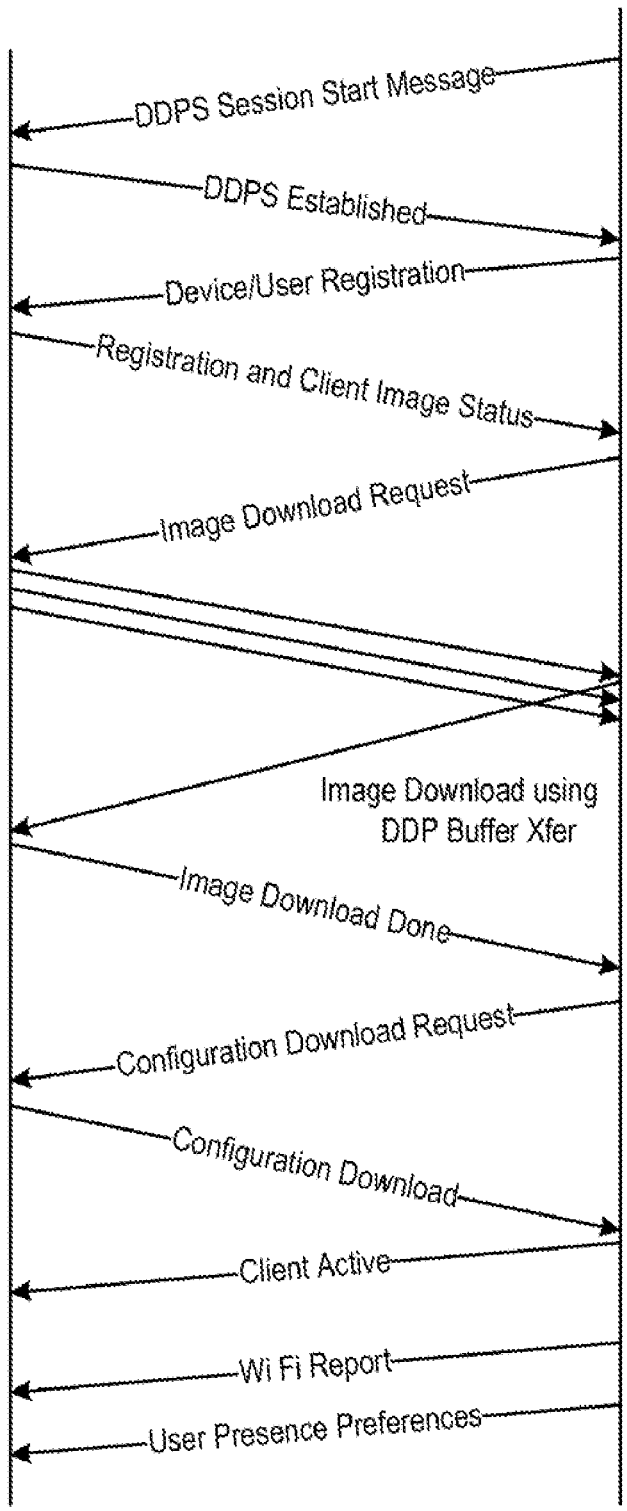
FIG. 6B depicts a DDP message exchange in accordance with one or more embodiments of the present invention.

FIG. 6B shows the exchange of DDP messages during the initialization of a client when a user logs on to one of the devices in accordance with one or more embodiments of the present invention.

In accordance with one or more embodiments of the present invention, DDP is a Layer 4 or an application layer protocol. DDP can use TCP, UDP or TLS for transport. Similar to SIP or SDP, DDP is a text-encoded protocol. In accordance with one or more embodiments of the present invention, a DDP message comprises a sequence of lines or fields wherein each line of field begins with a single lower case letter which denotes the type of information that is being conveyed; the rest of the line or field contains pieces of information associated with a function or method. In accordance with one or more embodiments of the present invention, there can be multiple lines or fields with the same starting name or type. In accordance with one or more embodiments of the present invention, each DDP message comprises a set of mandatory lines or fields and optional lines or field, depending on the specific type of DDP message being sent. If any of the mandatory lines are missing, a parser will reject the DPP message. Optional lines that the parser cannot understand are skipped over. This allows for backward compatibility and interoperability between different versions of software. Here is an example of a DDP message:

v=0.0.0.1
o=server
r=data 2
c=ext 4444
c=pref cell wifi gprs sms wka 5 cka 10 pwd 1200 whys 20 chys 60
c=wifi rssilo 30 rssihi 60 chlo 30 chhi 50
c=qos delaylo 50 delayhi 100 losslo 1 losshi 10 jitterlo 30 jitterhi 50
c=srv intip 1023414444 extip -1343245032
c=end The DDP message is then added as a message body in a SIP message with a message body type of "application/ddp" or "application/ddps". The DDP body can also be sent with other signaling protocols if required.

Exemplary applications of DDP in accordance with one or more embodiments of the present invention are described as follows.

Voice Mobility: Voice mobility depends on a lot of factors—the primary one being the WiFi quality experienced by the client. DDP is used to send the WiFi report in real time with information about the AP that the handset is currently associated with to make mobility decisions. The WiFi report can also optionally contain information about the neighboring APs so that the mobility server can use this information to take preemptive mobility decisions based on the predicting the movement of the handset. In addition to the automatic updates based on the WiFi conditions. DDP is also used for user initiated mobility decisions.

Client/Device Management: DDP is used extensively in managing the client and the user experience on the handset. Here are some of the different way in which DDP based control and bulk transfer messages are used for managing the client:

a. Device Configuration: Sending device specific configuration to the device during initialization once the device/user have been authenticated.

b. Mobility Thresholds: WiFi thresholds based on administrator settings for the client to initiate mobility actions.

c. User Information: When a user logs on to one of the clients, the server pushes the user specific information (like extensions, preferences etc.) over DDP.

d. Device Image Management: Ability to upgrade the handset software over the air is achieved using DDP bulk transfer capability.

Voicemail/Email download to handset: One of the key differentiator of the Divitas solution is the ability to download voicemails to the handset and manage them at a time of your convenience. The ability to manage voicemails without IVR is possible by proprietary control messages that interface with the Voicemail system as well the bulk transfer capability in DDP to transfer the voicemails to the handset. A similar functionality can also be achieved for Email system where an adapter module can be built to interface with the Email system of choice.

User Presence Management: DDP messages with the user's preference for voice and text over the different medium is communicated to the server for presence management. This is a key piece of functionality that allows the support of Presence aware calling. The architecture and design of Rendezvous calling is also based on enhanced presence and user preferences—all communicated over DDP to provide the service Rendezvous calling is designed to provide.

Instant Messaging: The messages for IM are tunneled over a DDP session. This allows the IM client on the handset to be unaware of the medium/protocol in which the device is operating.

Features and advantages of the present invention may be better understood with reference to the figures and discussions that follow.

Figure 14:
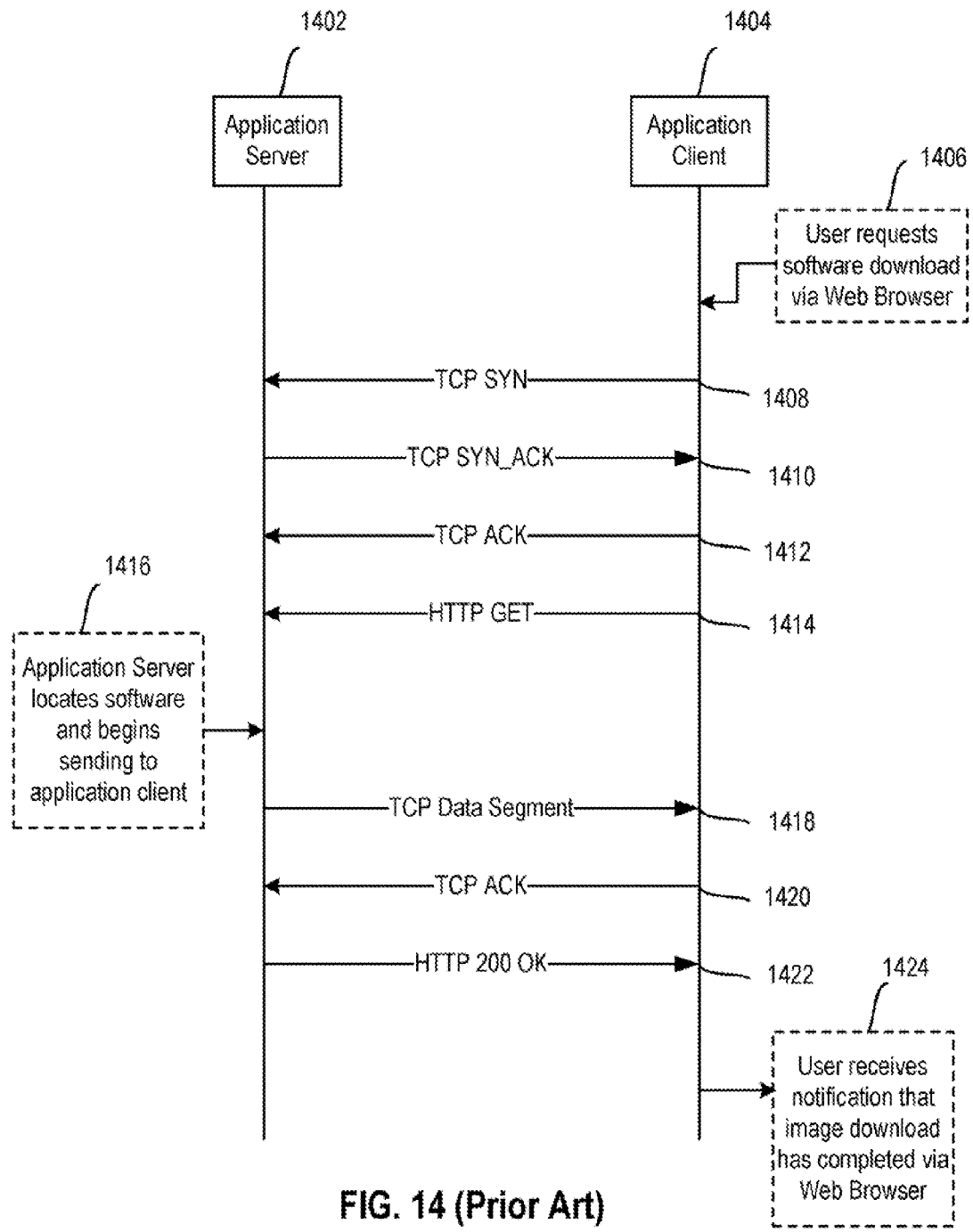
FIG. 14 shows a prior art example of a call flow for establishing a connection between an application client and an application server.

FIG. 14 shows a prior art example of a call flow for establishing a connection between an application client and an application server. Consider the situation wherein, for example, a user of a handset wants to employ an application client 1404 to request for a software download 1406 via a web browser through a HTTP (hypertext transfer protocol) connection.

Before software download 1406 may occur, an HTTP connection may first have to be established between application client 1404 and an application server 1402. At a first step 1408, application client 1404 may send a TCP (transmission control protocol) SYN (synchronization) to application server 1402. At a next step 1410, application server 1402 may send a TCP SYN-ACK (TCP synchronization acknowledgement) back to application client 1404. At a next step 1412, application client 1404 may send a TCP ACK to application server 1402.

Once an HTTP connection has been established between application client 1404 and application server 1402, at a next step 1414, application client 1404 may send an HTTP Get to application server 1402. In other words, at step 1414, application client 1404 is sending the user's request for a software download 1406 to application server 1402.

Upon receiving the HTTP Get, application server 1402 may perform a search to locate the requested download, at a next step 1416.

At a next step 1418, once the software has been located, application server 1402 may begin sending the requested software as data packets (e.g., TCP data segments) to application client 1404. In sending the requested software file, the software file may be broken into a plurality of data packets in order to facilitate the process of sending the software file through the network.

At a next step 1420, upon receiving the TCP data segment, application client 1404 may send a TCP ACK to application server 1402.

Steps 1418 and 1420 may be repeated until all of the data packets for the requested software download have been sent by application server 1402 to application client 1404.

Once all of the TCP data segments have been sent, then at a next step 1422, application server 1402 may send an HTTP 200 OK to application client 1404. In sending an HTTP 200 OK, application server 1402 is notifying application client 1404 that all data packets related to the software download request have been sent.

Once application client 1404 has received each of the data packets, then application client 1404 may send a notification 1424 to the user informing the user that the download has been completed.

For each application client on a handset, the method described in the call flow of FIG. 14 may have to be performed by each application client. Thus, if the handset includes multiple application clients (e.g., video application client, voice application client, instant messaging application client, game application client, virtual reality application client, etc.), an independent channel may have to be established between each application client and its corresponding application server before interaction between the application client and the application server may commence. With multiple applications running on a client, communication between the different applications is not guaranteed. As a result, an application running on a given client may be unaware of the data exchange that may be happening for another application on the same client.

In addition, the method described in FIG. 14 is a cumbersome method that may require each application on a client to be properly configured in order to assure that the application may successfully interact with its corresponding application on a given server within an enterprise. This method may create both security risks and increased complexity by requiring that a separate network session be allowed for each of the applications that communicate between a client and a server.

In one aspect of the invention, the inventors herein realized that a single protocol that is independent of hardware (e.g., handset) and software (e.g., video application client, voice application client, instant messaging application client, game application client, virtual reality application client, etc.) may be employed to consolidate all of the applications network sessions. In other words, the inventors realized that application clients do not need to establish multiple network sessions with their corresponding application servers. Instead, a protocol may be implemented that takes advantage of existing control and transport protocols but is hardware and software independent, thereby allowing a plurality of application clients to interact with its corresponding plurality of application servers.

In accordance with embodiments of the invention, a mobility architectural arrangement is provided by implementing a DiVitas description protocol (DDP). In an embodiment, the DDP may include a DDP client and a DDP server. Embodiments of the invention enable the DDP to efficiently transport data packets between a plurality of application clients on a handset and a plurality of application servers within an enterprise. Embodiments of the invention also enable DDP to be implemented independent of the hardware and software platforms.

In an embodiment of the invention, the DDP is independent of the hardware platform. Thus, the DPP may be implemented on dual-mode handsets, personal digital assistants (PDAs), 802.11 telephones, and the like. In an embodiment of the invention, the DPP is also independent of the software platform. As a result, the DPP may be run on a Linux® system, a Symbian® system, a Window™ Mobile 5.0 system, and the like.

In the prior art, the establishment of multiple network sessions may require multiple channels to be established between the client and the server. In other words, a plurality of "holes" may be "punched" into the firewall of the enterprise in order to enable the plurality of application clients to interact with their corresponding application servers. In an embodiment of the invention, DDP may be implemented to establish a single secure channel through which interaction between application clients on a handset and application servers within an enterprise may be conducted.

With a single secure channel from which a plurality of data traffic may be exchanged, the information that is downloaded onto the handset may be managed by the application client. Thus, an application client that may require the utilization of information that has already been downloaded does not have to request for the data to be downloaded again. Instead, the mobility client with DDP may be able to direct the application client to the storage location of the requested data.

In an embodiment of the invention, the DDP may be independent of the network. In an example, the secure channel established by the DDP may be through Wi-Fi network or a cellular data network, for example. This enables DDP to ensue that a network session can be handed off to a separate network, when a user on a client device roams.

In an embodiment, the DDP is built on top of a control protocol and a transport protocol. In an embodiment, the DDP may be implemented with any available control protocol (e.g., SIP, H.323, etc.). In another embodiment, the DDP may be implemented with any available transport protocol, such as a user datagram protocol (UDP), a transmission control protocol (TCP), or a transport layer security (TLS), for example. Thus, the DDP is able to efficiently route data packets and manage connectivity without having to be concerned about the control and/or transport protocol that may be available.

In an embodiment of the invention, the DDP may include a reliability module (RDDP) which may ensure a level of reliability for the delivery of the data traffic. This module is useful when utilizing a transport protocol, such as UDP, that does not provide reliability. Thus, DDP may provide assurance of a successful transfer and remove the burden of monitoring the data traffic from the application clients.

In an embodiment of the invention, the DDP may be implemented for a plurality of applications (i.e., application clients and their corresponding application servers). In an example, the DDP may be employed by a simple application that may not require real time exchange of data. In another example, the DDP may be employed by an application that has real time requirements for the exchange of data. Due to the DDP adaptability, applications may be added or removed without impacting the capability and versatility of the DDP.

In an embodiment of the invention, DDP may include a priority message scheduler module which may be configured to schedule and queue data traffic. The DDP may employ the priority message scheduler module to automate the plurality of downloads and uploads that the plurality of applications may need or require.

The features and advantages of the present invention may be better understood with reference to the figures and discussions that follow.

Figure 15:
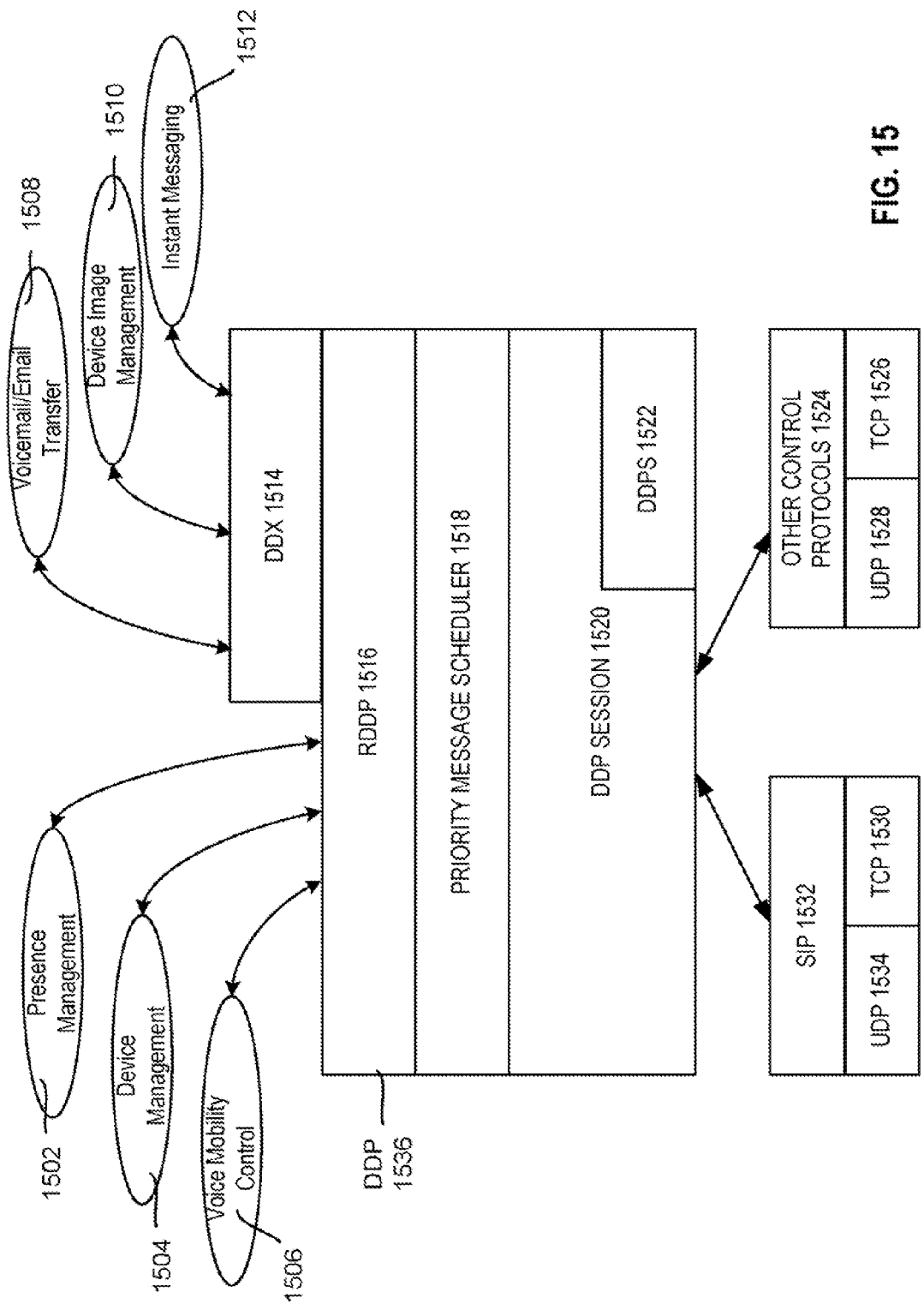
FIG. 15 shows, in an embodiment of the invention, a simple architectural diagram of the DDP invention.

FIG. 15 shows, in an embodiment of the invention, a simple architectural diagram of the DDP invention. In an embodiment of the invention, DDP 1536 is independent of hardware and/or software platforms. In an example, DDP 1536 may be implemented on a plurality of client devices, including, but are not limited to, dual-mode handsets, PDAs, laptops, and the like. In another example, DDP 1536 may be implemented with different operating systems, such as, a Linux® system, a Symbian® system, a Window™ Mobile 5.0 system, and the like. As a result, DDP 1536 may be loaded onto different hardware and/or software platform with minimal modification.

DDP 1536 may be built on top of a control protocol and a transport protocol. In an example, DDP 1536 may be used with different type of control protocols (e.g., SIP 1532 and other control protocols 1524) and different type of transport protocols (e.g., UDP 1534, UDP 1528, TCP 1530, TCP 1526, etc.). The type of control protocol and/or transport protocol that may be employed by DDP 1536 in order to perform its function may be easily adapted by DDP. Thus, if the control protocol and/or the transport protocol change, DDP 1536 will adapt itself to utilize any combination of available transport and control protocols as required. Note that changes to the control protocol and/or the transport protocol do not impact the application layer which may include, but is not limited to, a voice mobility control application client 1506, a device management application 1504, a project management application 1502, a voicemail/email transfer application 1508, a device image management application 1510, an instant messaging application 1512, and the like.

In addition, DDP 1536, in an embodiment, that is capable of determining the preferred transport protocol to provide the best performance and reliability. Thus, the responsibility of identifying the correct transport protocol may be centralized and moved from the plurality of applications to DDP 1536. Since all the data traffic between a DDP client and server is now handled by DDP 1536, DDP 1536 may be able to determine the best transport protocol for routing data traffic while minimizing the possibility of data packet loss.

In an embodiment, DDP 1536 may include one or more modules, such as a DDP with security extension module (DDPS module 1522), a priority message scheduler module 1518, a reliable DDP module (RDDP module 1516), a built-in session management module 1520, and a DiVitas data exchange module (DDX module 1514).

In an embodiment, DDPS module 1522 may provide security functionality to DDP 1536. In an example, DDPS module 1522 may enable a secure channel to be established between a mobility client of a handset and a mobility server within an enterprise. With a secure channel, all incoming and outgoing data traffic from the plurality of applications may be routed through a single secure channel.

In some situations, individual authentication may have to occur before an application client may be able to interact with its corresponding application server. Unlike the prior art, the authentication process may be automated. In an embodiment, DPPS module 1522 may include a database, which may include the authentication data required for establishing a connection between an application client and an application server.

In an embodiment of the invention, DDPS module 1522 may provide encryption/decryption functionality, thus enabling DDP 1536 to provide security for applications that may require the functionality. In an example, an important e-mail from application client 1508 is routed from an email server to an email application client on the handset. To ensure the security of the email, DDPS module 1522 may encrypt the DDP data packets before sending the packets to the corresponding application server. In another example, an instant message between two IM clients may be sent in a non-secure manner. Thus, DDP 1536 may route the instant message without employing the DDPS module 1522 to encrypt the data packets sent between the IM clients.

In an embodiment of the invention, DDP 1536 may include priority message scheduler module 1518, which may be configured to schedule and queue data packets. In other words, priority message scheduler module 1518 may be responsible for managing the plurality of different data packets that may be serviced by DDP 1536. In an embodiment, priority message scheduler module 1518 may establish a policy for handling the incoming and outgoing data packets. In an embodiment, priority message scheduler module 1518 may have different priority levels depending upon the originating application. In an example, application A (e.g., email) may have no requirement for real-time delivery of its data packets. However, application B (e.g., Presence Management) may be sensitive to time delay and require real-time delivery of the data packets. In an embodiment, priority message scheduler module 1518 may be an optional DDP module. In an example, if DDP 1536 is currently only handling data traffic for one application, then DDP 1536 may not have to employ priority message scheduler module 1518 to handle the scheduling of the data packets.

In an embodiment of the invention, DDP 1536 may include reliable module (RDDP 1516), which may provide a level of assurance for the delivery of the plurality of data packets. To assure delivery, in an embodiment, RDDP 1516 has mechanism to retransmit packets that do not successfully reach their destination within a specified time interval. In an embodiment, if a data packet is not received within a preset time interval, the packet will be retransmitted. The packet may be retransmitted a specified number of times before notifying the application that the transfer of the packet has failed. With RDDP 1516, DDP 1536 may provide assurance that data packets are being sent and/or received in the order in which the application requires.

In an embodiment, DDP 1536 may include DDX module 1514, which may be employed to transport large amounts of data (e.g. image files, log files, etc. . . . ) between the mobility client and the mobility server. In an embodiment, DDX module 1514 includes mechanisms to ensue the data integrity of the data transfers between the mobility client and mobility server. In yet another embodiment of the invention, DDX module 1514 may include mechanisms for confirming completion of the data transfer to the applications.

In an embodiment of the invention, DDP 1536 may be implemented for a plurality of applications including, but are not limited to, voice mobility control application 1506, device management application 1504, project management application 1502, voicemail/email transfer application 1508, device image management application 1510, instant messaging application 1512, and the like. In an embodiment of the invention, the plurality of applications may be divided into two groups.

In the first group, the plurality of applications (e.g., voicemail/email transfer application 1508, device image management application 1510, instant messaging application 1512, etc.) are applications that may tend to send larger files, thus DDP 1536 may employ DDX module 1514 to convert the files into smaller data packets that can utilize any of the other modules within DDP 1536, including 1516, 1518, 1522, and provide assurance that the data file has been successfully transmitted and that the application has been notified of the completed transfer.

In the second group, the plurality of applications (voice mobility control application 1506, device management application 1504, project management application 1502, etc.) are usually applications that may tend to send smaller control messages. Usually, applications in the second group tend to be control applications. In an example, voice mobility control 1506 may enable the mobility client and the mobility server to share mobility status, which may be sent in a single DDP packet.

Figure 16A:
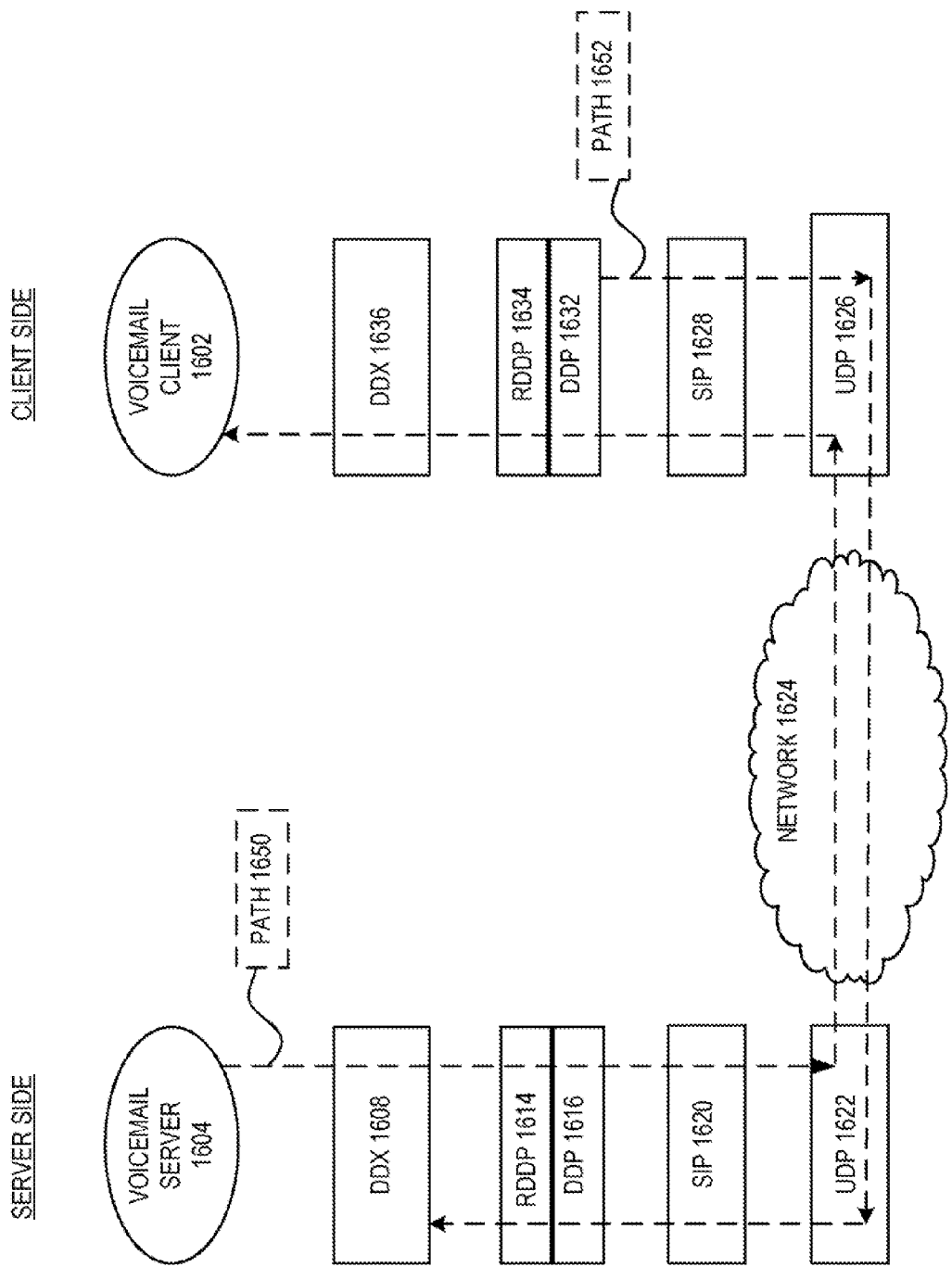
FIG. 16A shows, in an embodiment, an example of how data within a mobility architectural arrangement with DDP may flow between an application client located within a client device and an application server, which is managed by an enterprise.

FIG. 16A shows, in an embodiment, an example of how data within a mobility architectural arrangement with DDP may flow between an application client located within a client device and an application server, which is managed by an enterprise. Consider the situation wherein, for example, a user on a client device wants to employ a voicemail client 1602 to retrieve a voicemail from a voicemail server 1604.

Upon receiving the request from application client 1602, voicemail server 1604 may initiate a file transfer. Voicemail server 1604 may send the file along a path 1650. Upon receiving the file, the mobility server may prepare the file to be sent through a secure channel to a mobility client on the client device.

In an embodiment, a server DDX module 1608, which is within the mobility server, may be employed to convert the file into a format that is compatible with the control and transport protocol of the secure channel. In an example, server DDX module 1608 may convert the file, which may be in a binary format, into a format that can be transported over the SIP protocol. Also, server DDX module 1608 may break the file into a plurality of data packets in order to ensure the effectiveness of routing the plurality of data packets through the secure channel.

After initial processing has completed, server DDX module 1608 may send a first data packet to a server DDP 1616. Server DDP 1616, in an embodiment, may include a server RDDP 1614, which may provide a level of assurance for the delivery of the first data packet.

Once the first data packet has been received by server DDP 1616, the first data packet may be encrypted. In an embodiment, server DDP 1616 may include a DDPS module, which may encrypt the data packets as required by the application. In an example, simple data packets (e.g., instant messages) may be sent without encryption. In another example, important data packets (e.g., a confidential email) may be encrypted before being routed to the requestor.

From server DDP 1616, the first data packet may be encapsulated as a SIP notify message (as shown in a code example 1670 of FIG. 16B) and sent via the secure channel through a network 1624 to the client device. In an example, the first data packet may be sent through the secure channel by using a server SIP control protocol 1620 and a server UDP transport protocol 1622. The first data packet may be received securely by the mobility client of the client device, which may receive data packets through a client UDP transport protocol 1626 and a client SIP control protocol 1628.

Within the mobility client, a client DDP 1632 may receive the first data packet. A client RDDP 1634 may perform a similar check as that performed by server RDDP 1614. Also, client RDDP 1634 may send a SIP Notify Message with a DDP acknowledgment along a path 1652 through the secure channel to server DDX module 1608. By sending the DDP acknowledgement, client RDDP 1634 may send an assurance from the mobility client to the mobility server that data packet has been received. Likewise, if server RDDP module 1614 does not receive the RDDP acknowledgement, server RDDP module 1614 will retransmit the data packet until the packet has been successfully acknowledged or the maximum number of retries is exhausted.

In an embodiment, a data packet may be sent and the next data packet may not be sent until a DDP acknowledgement has been received. In an example, server DDX module 1608 may not send a second data packet until a DDP acknowledgement has been received. In another embodiment, a fixed number of data packets may be sent and the sending of additional packets would not occur until an acknowledgement is received for one or more of the initial data packets. In an example, server DDX module 1608 may send a group of 10 data packets and will be required to wait until at least one acknowledgment is received before it is allowed to transmit an additional data packet.

Once the mobility client has sent a DDP acknowledgment to the mobility server, the data packet will be routed to a client DDX module 1636. In an embodiment, client DDX module 1636 may hold the data packets until all data packets have been received. In an embodiment, server DDX module 1608 may send a message indicating that each of the data packets for the requested file has been sent and that no additional data packet for the file will be forthcoming. Once all of the data packets have been received, then client DDX module 1636 will reassemble the file and notify voicemail client 1602 that the voicemail file is available.

As can be seen from FIGS. 15 and 16, the architecture of the DDP may provide a single secure channel from which a plurality of application clients may interact with a plurality of application servers. By having data traffic flowing through a single secure channel, the architecture of the DDP may provide control by assuring that the data packets are being received, that proper verification has been done in order to acknowledge that all data packets have been received, and that there are no missing data packets. In an example, the architecture of the DDP may enable large files to be broken up into smaller data packets, which may be sent with the assurance that the acknowledgement may be sent by the receiving side.

Figure 17:
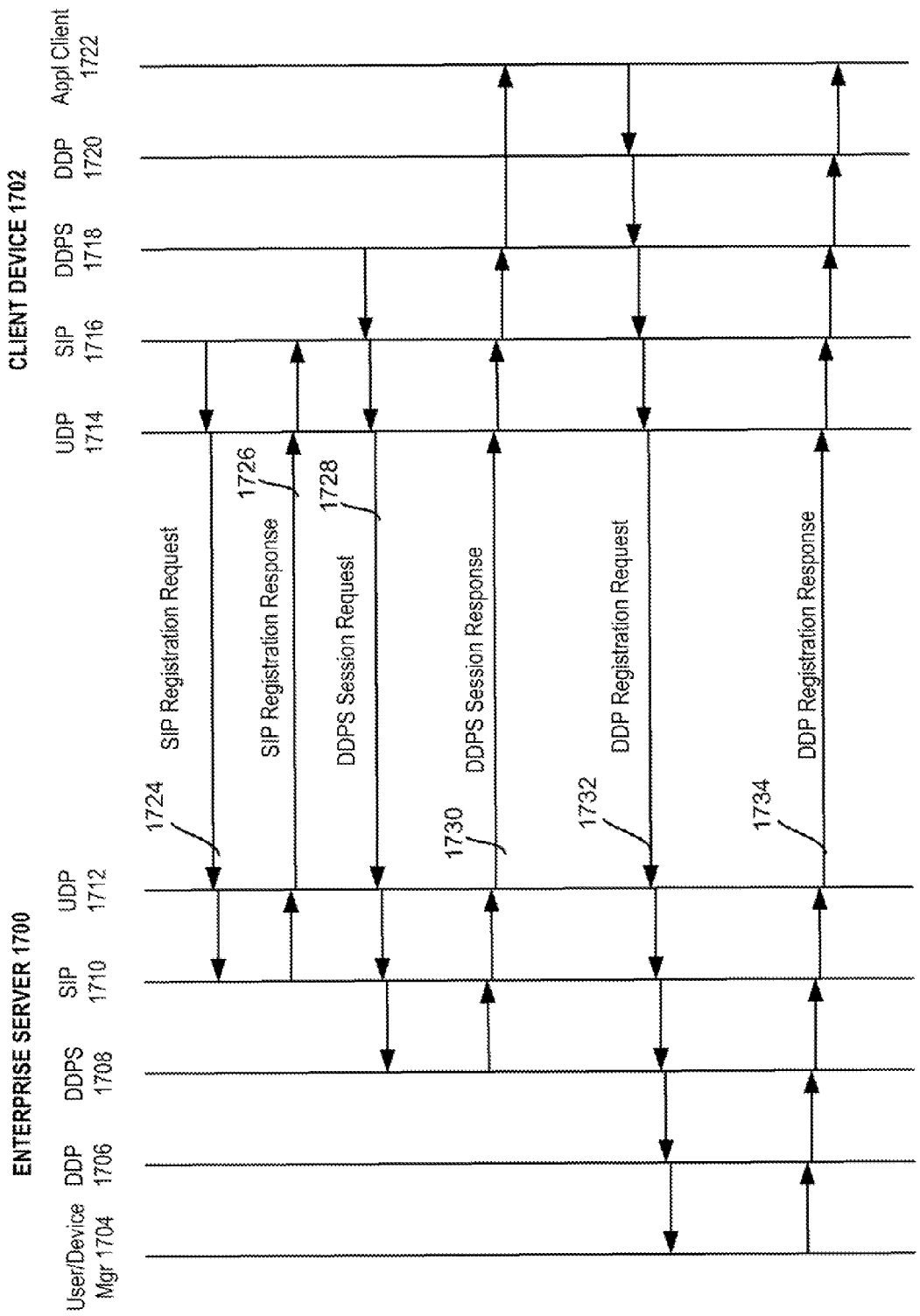
FIG. 17 shows, in an embodiment, an example of a call flow illustrating how a secure channel may be established between a client device and a mobility server. In an embodiment, to establish a secure channel, registration may occur.

FIG. 17 shows, in an embodiment of the invention, an example of a call flow illustrating how a secure channel may be established between a client device and a mobility server. In an embodiment, to establish a secure channel, registration may occur. Consider the situation wherein, for example, a user initializes a client device for the first time.

At a first step 1724, a SIP registration must first be established. In an example, a client SIP 1716 may send a SIP registration request through a client UDP 1714. The SIP registration request may be received by a server SIP 1710 through a server UDP 1712.

Upon receiving the SIP registration request, server SIP 1710 may send a SIP registration response 1726 via server UDP 1712 and client UDP 1714 to client SIP 1716. Once the SIP registration has been successfully completed, steps to establish a secure DDP channel are initiated.

At a next step 1728, a client DDPS module 1718, a module of a client DDP 1720, will send a DDPS session request to a server DDPS module 1708. In an example, the DDPS session request may be routed through client SIP 1716, client UDP 1714, server UDP 1712, server SIP 1710 to server DDPS module 1708.

Upon receiving the DDPS session request, at a next step 1730, server DDPS module 1708 will send a DDPS session response 1730 to client DDPS module 1718 via server SIP 1710, server UDP 1712, client UDP 1714, and client SIP 1716. Once the secure channel has been established, the user may have to register with the mobility server. To notify the user, client DDPS 1718 may forward the DDPS session response to an application client 1722.

Upon receiving the notification, at a next step 1732, application client 1722 may send a DDP registration request to a user/device manager 1704. In an example, application client 1722 may send the registration information to a client DDP 1720. Client DDP 1720 may send the registration information through the established secure channel (i.e., through client DDPS module 1718, client SIP 1716, client UDP 1714, server UDP 1712, server SIP 1710, and server DDPS module 1708) to a DDP 1706, which may then route the registration information to user/device manager 1704.

Upon receiving the registration information, user device manager 1704 may send a DDP registration response to application client 1732, at a next step 1734. In an example, user device manager 1704 may send the DDP registration response to server DDP 1706. Server DDP 1706 may send the registration information through the established secure channel (i.e., through server DDPS 1708, server SIP 1710, server UDP 1712, client UDP 1714, client SIP 1716, and client DDPS 1718) to DDP 1720, which may then route the DDP registration response to the user of application client 1722.

Figure 18:
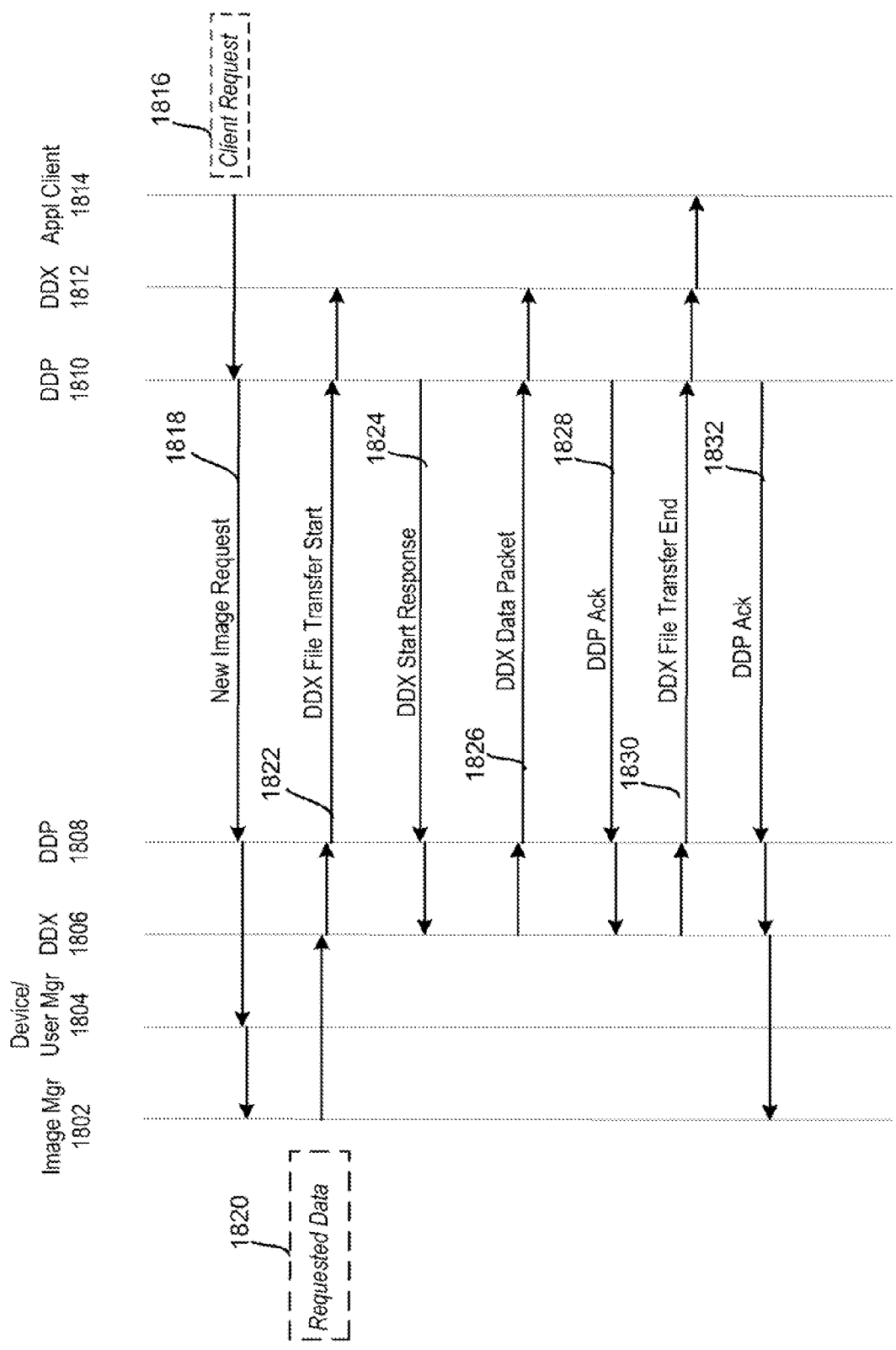
FIG. 18 shows, in an embodiment, a simple call flow illustrating a situation in which a large file may have to be sent.
Figure 19:
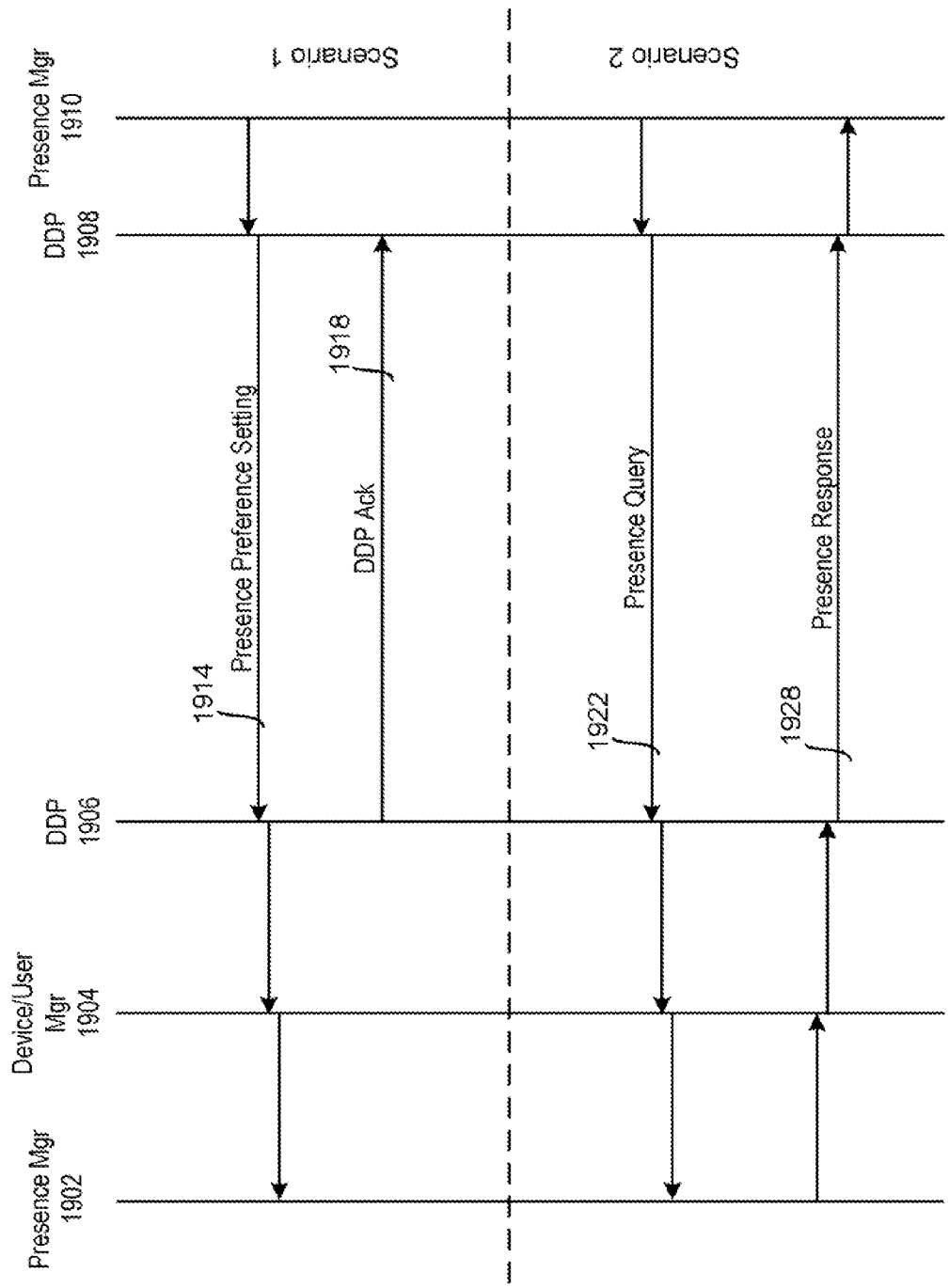
FIG. 19 shows, in an embodiment of the invention, a simple call flow illustrating a situation in which small control messages, such as those sent by control applications, may be sent.

In a mobility architectural arrangement with DDP, registration may be a one-time event. In an example, client device will register with the mobility server when the client device is initialized for the first time. Since a secure channel has already been established at steps 1728 and 1730, the user of the client device may be assured that the sensitive DDP registration information is being sent encrypted and through a secure channel. In an embodiment, no additional DDP registration may need to occur as long as the secure channel between the client device and the mobility server is maintained. In an embodiment, interaction between application clients on a client device and application servers managed by an enterprise may now be conducted securely through a single secure channel. FIGS. 18 and 19 show, in an embodiment, examples of how DDP may handle interaction between applications clients on a client device and application servers managed by an enterprise.

FIG. 18 shows, in an embodiment, a simple call flow illustrating a situation in which a large file may have to be sent. Consider the situation wherein, for example, a client device may need to download the latest software upgrade. In an example, an application client 1814 may send a request 1816 for software upgrade to an image manager 1802, which may be responsible for managing the different software images on the server side.

At a first step 1818, application client 1814 may send a new image request to image manager 1802. In an example, the new image request may first be sent from client application 1814 to a client DDP 1810. After receiving the new image request, DDP 1810 may send the request through a secure channel to a server DDP 1808. Before being sent to image manager 1802, the new image request may be routed to a device/user manager 1804, which may be responsible for determining which software may need to be upgraded. After device user/manager 1804 has determined which software upgrades the client device may need, device user/manager 1804 may route the new image request to image manager 1802.

Upon receiving the request, the image manager 1802 may then send the requested software upgrade (e.g., requested data 1820) to a server DDX module 1806. In an embodiment, server DDX module 1806 may convert the file into a format that is capable of being sent through the secure channel established between the client device and the mobility server. In an embodiment, server DDX module 1806 will break the large file into a plurality of data packets in order to transport the file through the secure channel.

At a next step 1822, server DDX module 1806 may send a DDX file transfer start to a client DDX module 1812 via server DDP 1808 and client DDP 1810. In an embodiment, a DDX file transfer start refers to a notification between a server DDX and a client DDX that a file is about to be sent. The DDX file transfer start may include basic information about the incoming file such as, for example, name of the file, file size, number of data packets that may be sent, the application that is requesting for the file, and the like.

At a next step 1824, client DDP 1810 may send a DDX start response to server DDX 1806. In an embodiment, an RDDP module within the DDP may be sending the DDX start response.

At a next step 1826, sever DDX module 1806 may send a first DDX data packet to client DDX module 1812. As described in FIG. 16, the DDX data message may first be sent to server DDP 1808. The DDX data message will be encapsulated as a SIP notify message, in an embodiment, and sent through the secure channel over a SIP control protocol and a UDP transport protocol. On the client device, the DDX data message may be received by a client DDP 1810, which may then route the DDX data message to client DDX module 1812.

At a next step 1828, upon receiving the DDX data message, a DDP acknowledgement will be sent by client DDP 1810. In an embodiment, the RDDP module within client DDP 1810 will send the DDP acknowledgement to inform server DDX module 1806 that the incoming DDX data message has been received successfully.

Steps 1826 and 1828 may be iterative steps that may be repeated until all DDX data packets and acknowledgements have been exchanged between the server and client DDX module.

Once the last DDX data message and DDX acknowledgement have been sent, server DDX module 1806 will send a DDX file transfer end, at a next step 1830, to application client 1814 to notify the application client that all DDX data messages have been sent. In an example, the DDX file transfer end may be sent from server DDX module 1806 to server DDP 1808 to the client device.

The DDX file transfer end may be received by client DDP 1810. In an embodiment, the RDDP of client DDP 1810 may send a DDP acknowledgement to image manager 1802, at a next step 1832.

Meanwhile, client DDP 1810 may route the DDX file transfer end to client DDX module 1812, which will notify the application client 1814.

As can be appreciated from FIG. 18, a new secure channel may not have to be established in order to request the software upgrade. Instead, the request for a software upgrade may be received and handled by the application server without having to establish a new secure channel. As can also be seen, FIG. 18 shows how the architecture of the DDP may be employed to send data traffic in a secure and reliable manner that may enable the sender and the requestor the assurance that all data packets for a requested file have been successfully received.

FIG. 19 shows, in an embodiment of the invention, a simple call flow illustrating a situation in which small control messages, such as those sent by control applications, may be sent. In FIG. 19, the interaction between an application client and an application server may occur without a DDX module.

Consider the situation wherein, for example, a user of a client device wants to share his or her user presence (e.g., available, busy, phone call only, etc.).

At a first step 1914, a client presence manager 1910 on a client device may send a presence preference setting to a server presence manager 1902. In an example, client presence manager 1910 may send a presence preference setting (as a single DDP data packet) to a client DDP 1908, which may then send the presence preference setting through a secure channel to a server DDP 1906.

Upon receiving the presence preference setting, server DDP 1906 may send a DDP acknowledgement, at a next step 1918. In an embodiment, a RDDP module within the DDP may be sending the DDP acknowledgement. Meanwhile, server DDP 1906 will notify the server presence manager 1902 of the presence preference setting through device/user manager 1904.

Consider another situation wherein, for example, the same user wants to discover the presence status of another user.

At a first step 1922, client presence manager 1910 may send a presence query to client DDP 1908, which may send the presence query through the established secure channel to server DDP 1906. Upon receiving the presence query, server DDP 1906 will forward the query through device/user manager 1904 to server presence manager 1902, which may perform the requested query to retrieve the requested information.

At a next step 1928, server presence manager 1902 may send a presence response (e.g., requested status data) to client presence manager 1910. In an example, the presence response may be sent from server presence manager 1902 through device/user manager 1904 to server DDP 1906. Then, the presence response may be sent through the secure channel to client DDP 1908, which may then route the presence response to client presence manager 1910.

As aforementioned, FIGS. 18 and 19 show different examples of how DDP may be employed to manage the interaction between a plurality of data applications on a client device and a plurality of application servers managed by an enterprise. A mobility architectural arrangement with DDP establishes a single channel from which each of the application clients and the application servers may interact with one another. Also, the architecture of DDP may be employed to send data traffic in a secure and reliable manner that may enable the sender and the requestor the assurance that all data packets for a requested file have been successfully received.

Since the mobility architectural arrangement with DDP may now be the center of control, the mobility architectural arrangement with DDP may now coordinate the various activities that a user of a client handset may have previously individually managed. In an example, FIG. 18 shows how DDP may be employed in managing the user's experience on the client device including, but are not limited to, software upgrade, device configuration, and user information management. In another example, the DDP may manage a user's presence (as seen in FIG. 19) by allowing the user to share his status, thus enabling the system to manage incoming traffic and to allow others to see his or her status. In yet another example, DDP may manage mobility by allowing the user to roam from one data network to another without having to worry about session management.

As can be appreciated by the embodiment of the invention, a mobility architectural arrangement with DDP reduces the security risk by providing a single secure channel from which multiple applications on a client device may be able to communicate with a plurality of applications on an enterprise server. DDP is a versatile protocol that may be advantageously implemented independent of hardware and/or software limitations. Also, DDP is an adaptable protocol that may be manipulated to take advantage of a plurality of control and/or transport protocols.

E. Divitas Protocol Proxy (DPP)

If clients for applications on the mobile handset access the enterprise resources directly, the enterprise firewall needs to be opened for multiple protocols. A method which fabricated in accordance with one or more embodiment of the present invention allows the handset based enterprise applications to make use of existing VoIP related connection in a secure manner.

This invention is implemented by devising a distributed protocol proxy. The distributed protocol proxy may be divided into two parts. One part resides on the mobile handset along with the VoIP client. The other part resides inside the enterprise along with the VoIP server.

As shown in the FIG. 7A-D the handset based VoIP client acts as a server for the different applications running on the handset. This component makes use of existing VoIP related connection (e.g. SIP) to send the application payload across to the enterprise. The server side proxy component is responsible for stripping the payload and making connection to the actual enterprise servers. The client and server side proxy components may further be sub-divided into multiple sub-components. Each subcomponent shall be responsible for proxying one protocol.

Figure 7A:
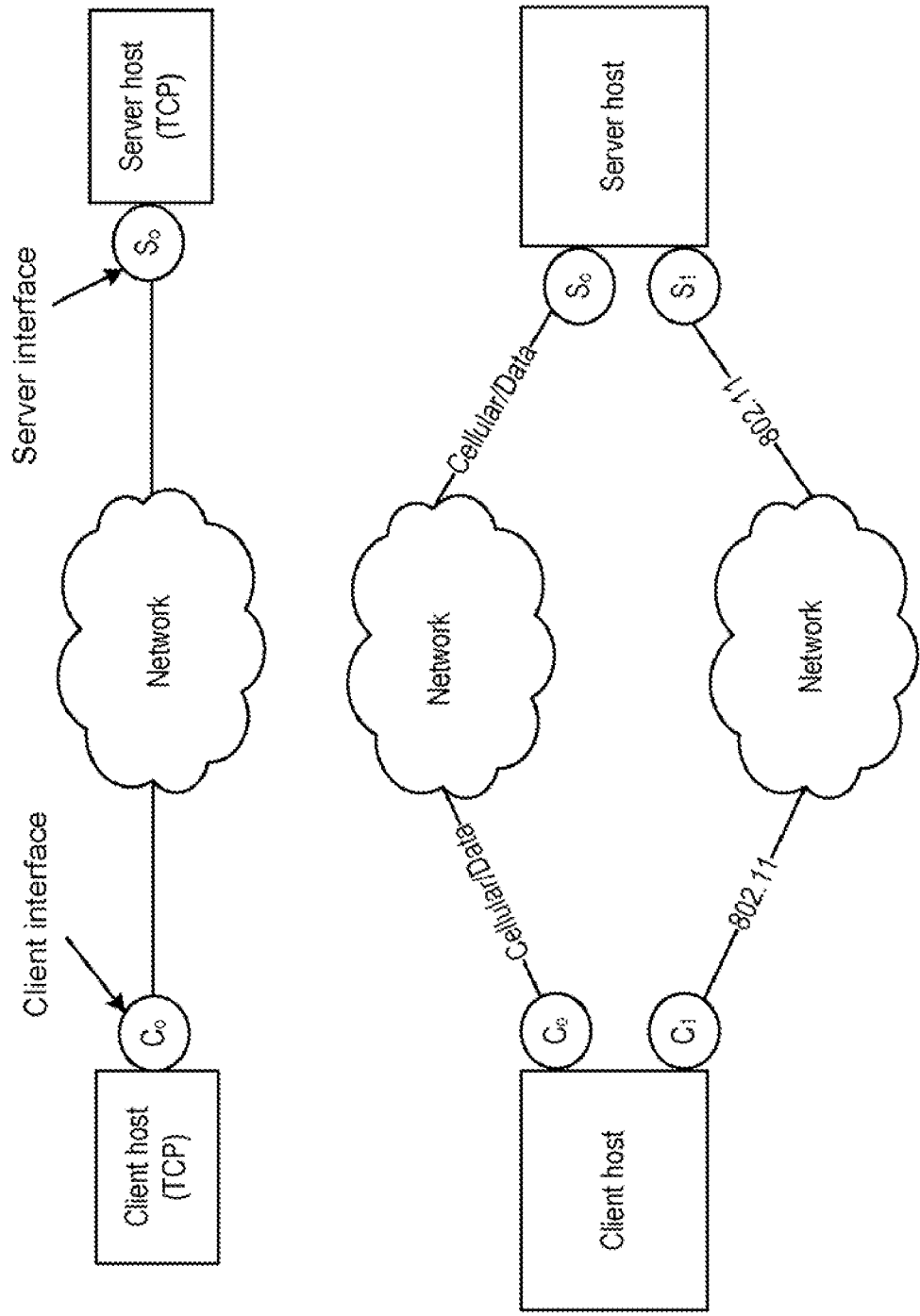
FIG. 7A depicts a network architecture which includes two network interfaces per host and is fabricated in accordance with one or more embodiments of the present invention.

FIG. 7A shows a network architecture in accordance with one or more embodiments of the present invention and includes two network interfaces per host. Two paths are provided through the independent networks, one from interface C0 to S0 and another from C1 to S1. In SCTP, these two paths would be collected into an association.

Divitas "Thin Client" monitors the paths of the association using a built-in heartbeat; upon detecting a path failure, the protocol sends traffic over the alternate path. It may not be necessary for the applications to know that a failover recovery occurred.

Failover can also be used to maintain network application connectivity. For example, consider a laptop that includes a wireless 802.11 interface and an Ethernet interface. When the laptop is in its docking station, the higher-speed Ethernet interface would be preferred; but upon loss of connection (removal from the docking station), connections would be failed over to the wireless interface. Upon return to the docking station, the Ethernet connection would be detected and communication resumed over this interface. This is a powerful mechanism for providing high availability and increased reliability.

In accordance with one or more embodiments of the present invention, a multi-homing scheme is implemented which provides applications with higher availability than those that use TCP. A multi-homed host is one that has more than one network interface and therefore more than one IP address for which the multi-homed host can be addressed. In TCP, a connection refers to a channel between two endpoints (in this case, a socket between the interfaces of two hosts).

Figure 7B:
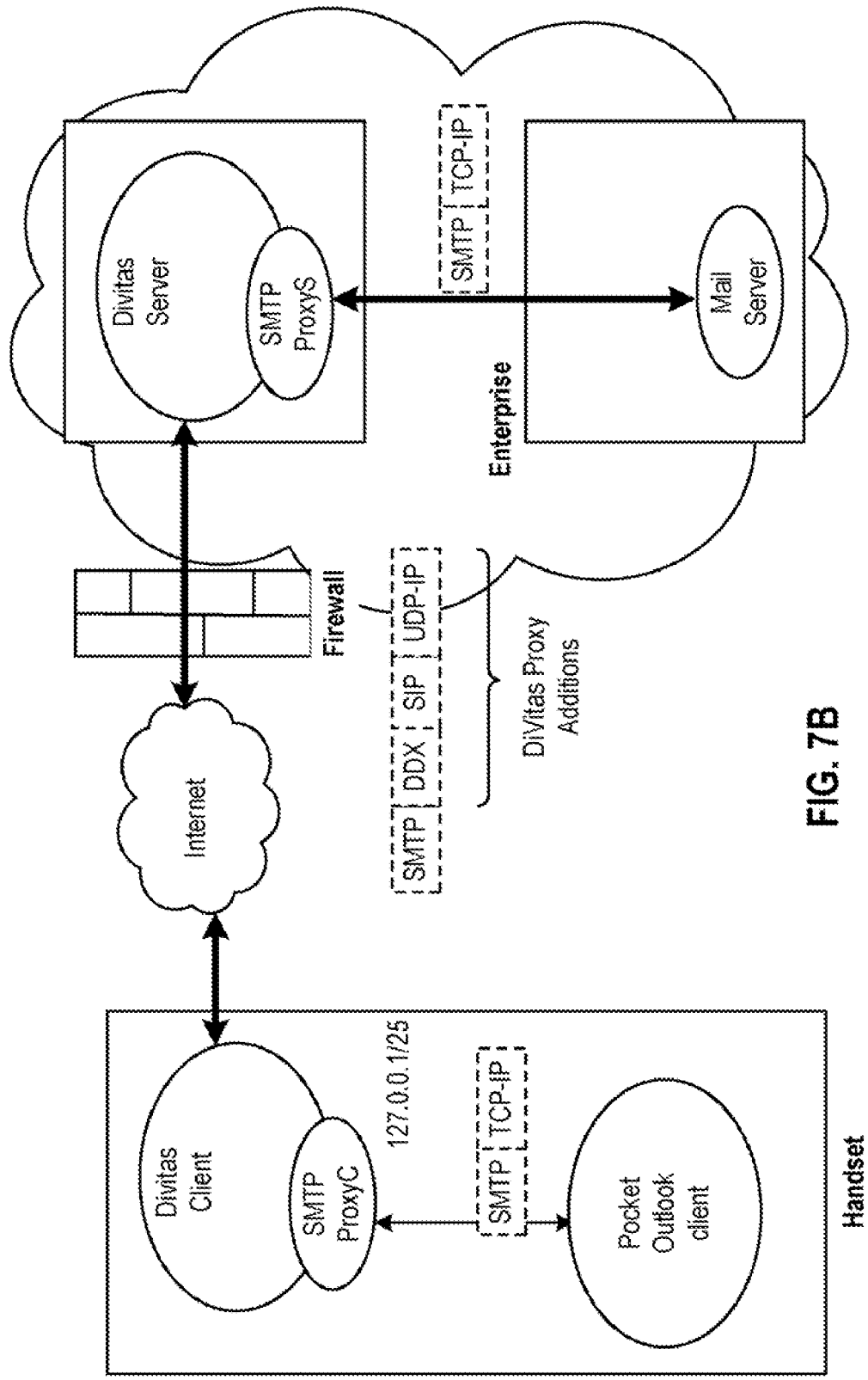
FIG. 7B depicts a network architecture in accordance with one or more embodiments of the present invention.
Figure 7C:
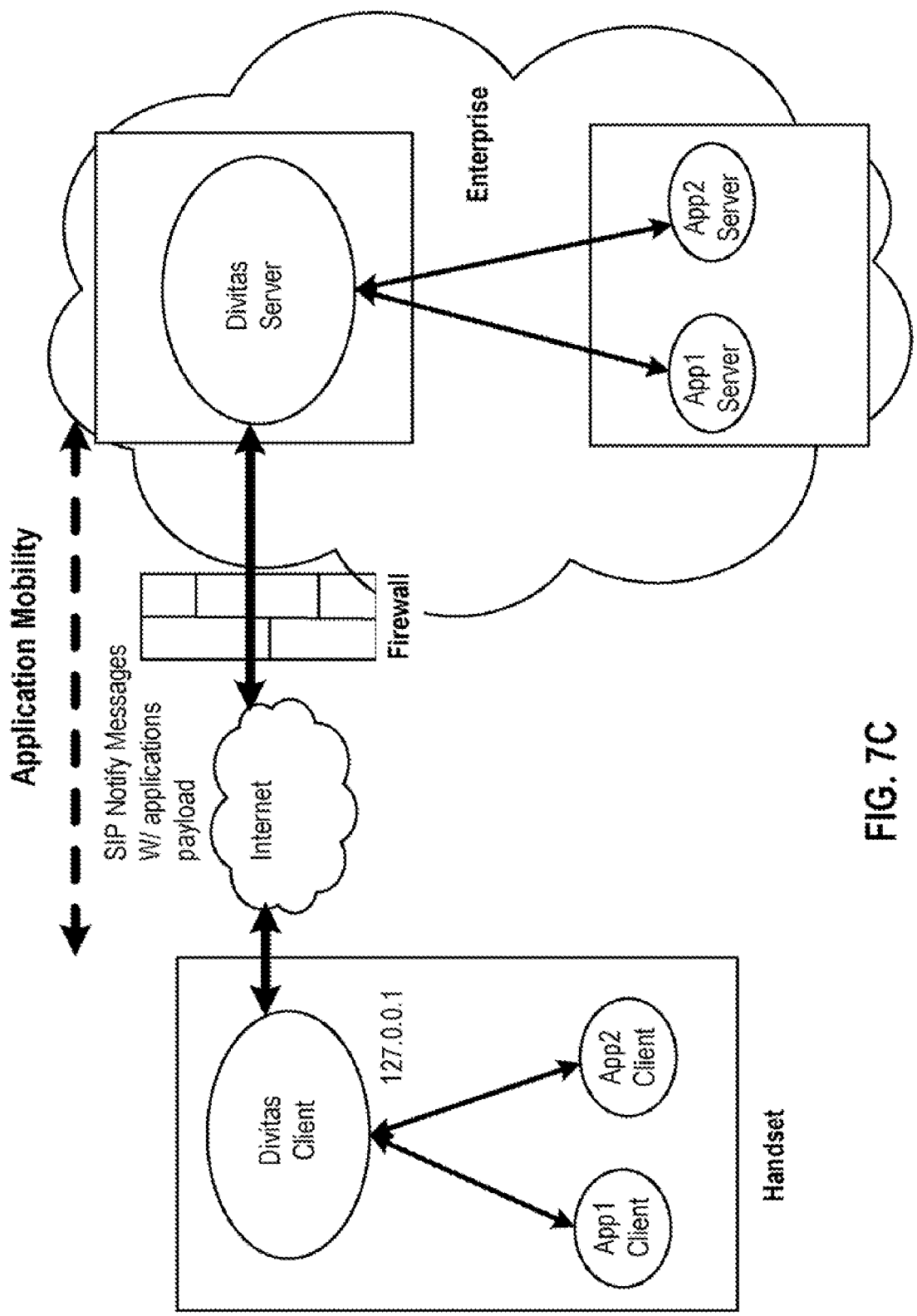
FIG. 7C depicts a network architecture in accordance with one or more embodiments of the present invention.

FIGS. 7B-D show how a thin client along with a counterpart of the thin client on the server has in affect created an efficient transport mechanism for conveying state information between handset and the server in accordance with one or more embodiments of the present invention. An example of an e-mail application (i.e., SMTP) is shown that uses the SIP—NOTIFY method to tunnel application layer packets without the knowledge of the SMTP application. This has advantages where the presentation layer application on the client does not have to be changed to provide session persistence.

Advantageously, using the above method for mobility applications, the enterprises may achieve a more secure and easy to manage enterprise mobility. This method also enables VoIP vendors to extend their mobility solution to different enterprise applications.

Features and advantages of the present invention may be better understood with reference to the figures and discussions that follow.

Figure 20:
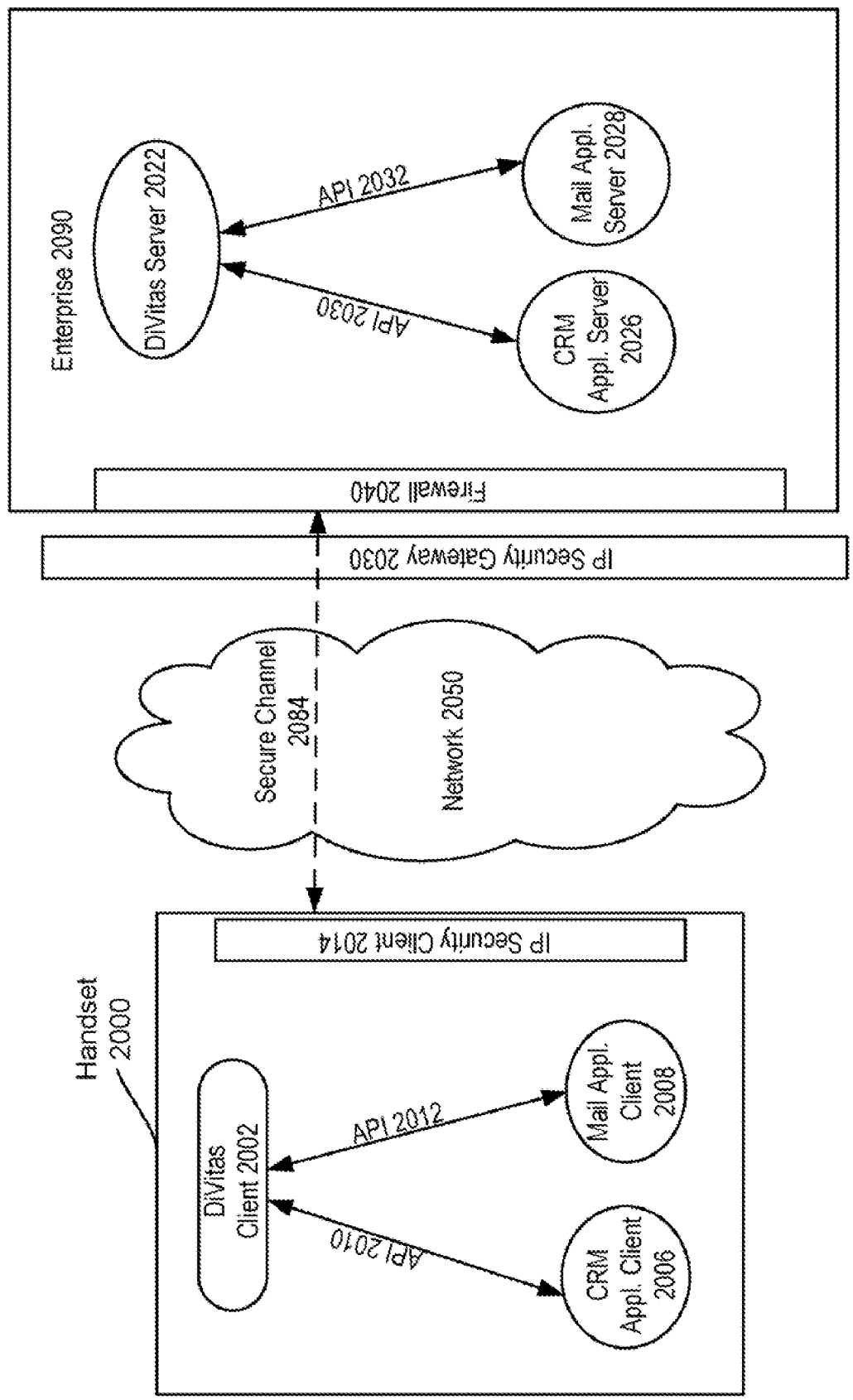
FIG. 20 is a prior art example of an architectural arrangement in which each application on a handset is connected individually to a corresponding application server within an enterprise.

FIG. 20 is a prior art example of an architectural arrangement in which each application on a handset is connected individually to a corresponding application server within an enterprise. A handset 2000 may include a plurality of application clients including, but are not limited to, a DiVitas client 2002, a CRM (customer relationship management) application client 2006, and a mail application client 2008. The application clients may be independent of one another or may interact with one another via application protocol interfaces (APIs). In an example, application clients 2006 and 2008 may be interacting with DiVitas client 2002 via an API 2010 and an API 2012, respectively.

The application clients in handset 2000 may interact with application servers within an enterprise 2090. Enterprise 2090 may include a plurality of application servers including, but are not limited to, a DiVitas server 2022, a CRM application server 2026, and a mail application server 2028. The application servers may be independent of one another or may interact with one another via APIs. In an example, application servers 2026 and 2028 may be interacting with DiVitas server 2022 via an API 2030 and an API 2032, respectively. Note that the purpose of the APIs is to enable the application to interact with one another. However, since each application is independent of one another, the interaction via the APIs is optional.

Consider the situation wherein, for example, a stockbroker on handset 2000 may be communicating with his client via DiVitas client 2002. While conversing with his client, the stockbroker may want to have his client's portfolio readily available. In this example, the stockbroker may have to establish two different sessions. The stockbroker may establish a first session to enable him to converse with his client via DiVitas client 2002. To bring up the portfolio, the stockbroker may establish a second session by employing CRM application client 2006 to interact with CRM application server 2026, which is located behind a firewall 2040 within an enterprise 2090.

In a typical secure sockets layer (SSL) virtual private network (VPN) environment, for each channel that may have to be established, a network administrator may have to establish different configuration. In order to establish two different sessions, two separate secure channels may have to be established. In an example, a new mail application client has been added to a handset. In order to communicate with the mail application server, which is located within the firewall of an enterprise, the network administrator may have to create a new secure channel. Thus, in a typical SSL VPN environment, a user may have to establish multiple sessions, which may require multiple sign-on and may cause the enterprise to be more susceptible to security risk. The SSL VPN environment is not only inconvenient for the user but this type of environment may also require more human resources to manage the security of the enterprise's network environment.

To minimize the number of secure channels that may be created, an Internet Protocol (IP) Security Gateway may be employed instead of an SSL. In an IP Security VPN environment, one or more application clients on a handset may interact with application servers via one secure channel by traversing through an IP Security Client 2014 and an IP Security Gateway 2030. To establish the secure channel, the user may first have to provide authentication data (e.g., user name, password, etc.). Once the secure channel has been established, the user may also be burdened with the responsibility of authenticating each time a different application client is utilized. In other words, each application client may be individually configured to communicate with its corresponding application serve via a different IP address.

In an example, CRM application client 2006 wants to interact with application server 2026. If a secure channel 2084 has not been established, then the user may have to first provide authentication data. Once secure channel 2084 has been established, the user may then have to provide additional authentication data in order to enable CRM application client 2006 to interact with CRM application server 2026.

In addition, a new secure channel and re-authentication may have to occur each time a session is dropped. In an example, if a user is mobile while in a session, the user may encounter a risk of being accidentally dropped from a session if the connection is lost. For example, a user, connected via a Wi-Fi network, may traverse outside of the Wi-Fi network. The session may be dropped and the user may have to establish another session, such as a cellular connection, for example. As a result, the user may become burdened with the inconvenience of establishing a new session and also may become frustrated with the limited mobility.

Figure 21:
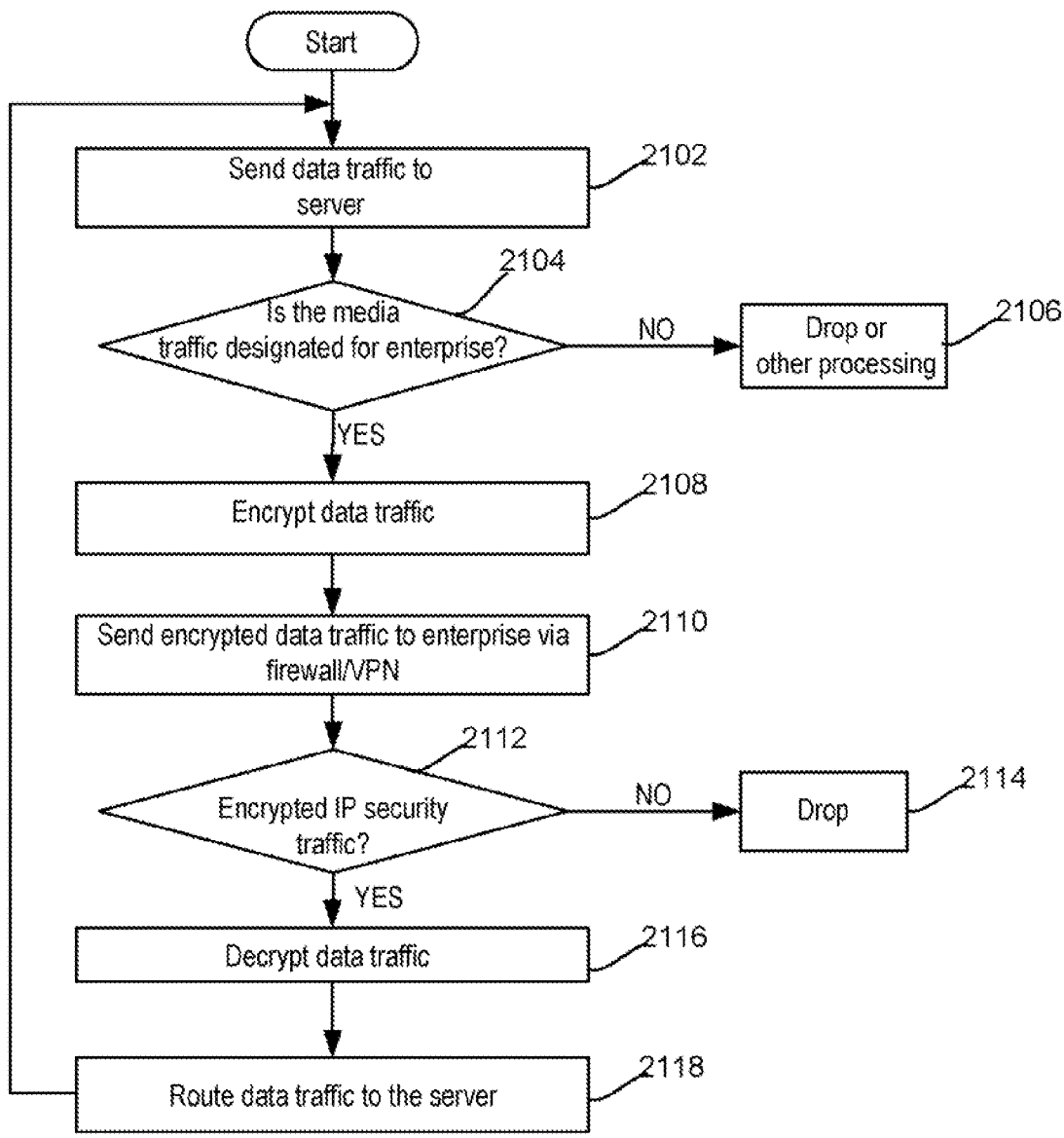
FIG. 21 is a prior art flow chart illustrating the method for enabling an application client to communicate with an application server in an IP Security VPN environment.

To show how an application client may interact with an application server, prior art FIG. 21 is provided. FIG. 21 is a prior art flow chart illustrating the method for enabling an application client to communicate with an application server in an IP Security VPN environment. FIG. 21 is discussed in relation to FIG. 20.

Consider the situation wherein, for example, a user of handset 2000 wants to employ mail application client 2008 to send an email.

At a first step 2102, email data traffic is sent to the application server. In an example, mail application client 2008 may send email data packets to mail application server 2028 within enterprise 2090.

At a next step 2104, the email data traffic is received by the IP Security Client 2014, which may perform a check to determine how to route the traffic. In other words, IP Security Client 2014 may analyze each packet to determine if the packet is intended for enterprise 2090. IP Security Client 2014 may identify the recipient of the packet by analyzing the IP address and the port number that is located within the packet.

If the recipient of the email data traffic is not one of a plurality of application servers within enterprise 2090, then at a next step 2106, IP Security Client 2014 may either drop the traffic or may direct the email traffic to a server, which is not located inside enterprise 2090. How an email traffic that is not intended for an application server within enterprise 2090 is handled may depend upon how IP Security Client 2014 may have been configured to handle the non-enterprise data traffic.

If IP Security Client 2014 determines that the data traffic is intended for an application server that is located within enterprise 2090, then at a next step 2108, IP Security Client 2014 may encrypt each data packet before forwarding the data packet. The process of encryption each data packet may require handset 2000 to have sufficient CPU processing power. Further, the requirement that each data packet be encrypted in an IP Security VPN environment may cause latency issue in a voice communication situation, such as a Voice over IP (VoIP) telecommunication session. In other words, voice quality during the voice communication session may be severely degraded resulting in a bad voice communication experience (e.g., echo in the background, inaudible conversation, etc.).

At a next step 2110, IP Security Client 2014 may then send the encrypted traffic to the intended application server along secure channel 2084. As mentioned above, a secure channel has to be created each time a new application is being employed. In an example, IP Security Client 2014 may send the encrypted traffic through a network 2050 and a firewall 2040 to IP Security Gateway 2030 of enterprise 2090.

At a next step 2112, IP Security Gateway 2030 may perform a check to determine how to route the traffic. Similar to IP Security Client 2014, IP Security Gateway 2030 may analyze each packet to determine if the packet is intended for enterprise 2090.

If by chance the data packet is not an encrypted IP security packet has been received, at a next step 2114, IP Security Gateway 2030 may drop the packet.

If the data packet is an encrypted IP security data packet, then at a next step 2116, IP Security Gateway 2030 may decrypt the traffic.

Once the packet has been decrypted, IP Security Gateway 2030 may then analyze the packet to identify the IP address and port number of the receiving application server. At a next step 2118, IP Security Gateway 2030 may forward the data packet to the appropriate application server (e.g., mail application server 2028).

The method described in steps 2102 through 2118 is a continual process and may be performed for each packet that is being sent by an application client.

There are several disadvantage to the prior art. In an example, a different configuration may have to be performed for each new application client that may be added to a user's handset. As new application client is added, the management of the various different application clients and their corresponding application servers may result in a more complex networking environment, which may become costly to maintain. Also, users become burden with the responsibility of performing multiple authentications, thus requiring the users to remember a plurality of authentication data. Further, the benefit from operating within an IP Security VPN environment is diminished by requiring data traffic to be encrypted resulting in an increase cost in hardware (e.g., handset has to have sufficient CPU processing power) and increased latency. In addition, the user may become frustrated with the limited mobility that may be provided each time a session is lost and the user has to re-establish the connection and re-authenticate.

In one aspect of the invention, the inventors herein realized that the prior art architectural arrangement of multiple authentications and/or multiple secure channels may be consolidated to create a single sign-on environment.

In other words, the inventors realized that by configuring each application to direct its data traffic through a single application (e.g., DiVitas client) and a single server (e.g., DiVitas server), data traffic from a plurality of applications may be sent via a single secure channel without requiring the user to perform multiple authentications. In addition, session loss may be substantially reduced without sacrificing mobility.

In accordance with the embodiments of the invention a mobility architectural arrangement is provided by implementing a DiVitas protocol proxy (DPP). In an embodiment, the DPP may include a client DPP and a server DPP.

In an embodiment of the invention, the handset may include a mobility client (e.g., DiVitas client), which may include a client DPP to manage the connectivity between the handset and the mobility server (e.g., DiVitas server). In an embodiment of the invention, the mobility server may include a server DPP to manage the connectivity between the mobility server and the handset. In an embodiment of the invention, the client and server DPP may include a plurality of sub-client/server DPPs, for managing different types of protocols (e.g., SIP, SMTP, etc.).

In an embodiment of the invention, a DPP enables the establishment of a single secure channel from which each application client may interact with its corresponding application server. Since each application is routing its data traffic through a common DPP, the DPP may now manage connectivity between the handset and the mobility server. Connectivity information may include establishing a secure channel between the handset and the mobility server via a control protocol, such as SIP (session initiation protocol). Connectivity information may be employed to determine when and how to connect the handset. In addition, connectivity information may also include when to perform a handoff from one network to another network (e.g., from a Wi-Fi network to a cellular network), thereby enabling a seamless transition between different networks.

The features and advantages of the present invention may be better understood with reference to the figures and discussions that follow.

Figure 22:
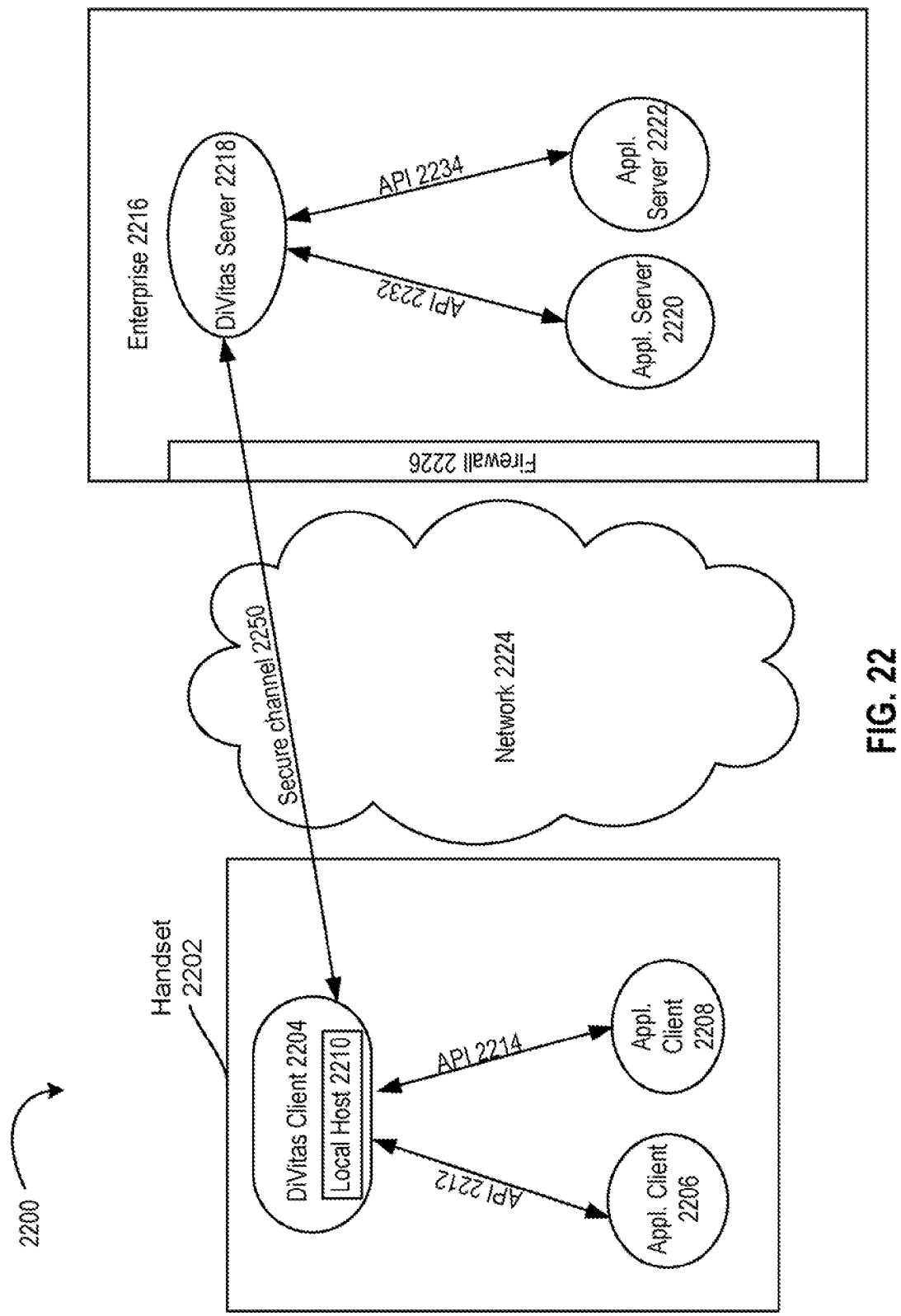
FIG. 22 shows, in an embodiment of the invention, a simple block diagram of a mobility architectural arrangement.

FIG. 22 shows, in an embodiment of the invention, a simple block diagram of a mobility architectural arrangement. In a mobility architectural arrangement 2200, a handset 2202 is interacting with a DiVitas server 2218 (e.g., mobility server) within an enterprise 2216. Handset 2202 may include a DiVitas client 2204 (e.g., mobility client) and a plurality of application clients (2206 and 2208). In an embodiment of the invention, DiVitas client 2204 may include a client DPP to manage the connectivity between the handset and the mobility server.

Unlike the prior art, application client 2206 and application client 2208 are not configured to directly interact with their corresponding application servers (2220 and 2222). Instead, the various different configurations for each of the application clients may be simplified, in an embodiment, to direct all data traffic to a single local IP host 2210 (e.g., IP address of 127.0.0.1) that is associated with DiVitas client 2204. In other words, data traffic from application clients 2206 and 2208 may now be configured to be routed to DiVitas client 2204 via APIs 2212 and 2214. From DiVitas client 2204, all data traffic may then be routed through DiVitas server 2218 within enterprise 2216 via a network 2224 (e.g., internet). In an embodiment of the invention, DiVitas server 2218 may include a server DPP to manage the connectivity between the handset and the mobility server. Once DiVitas server 2218 has received the data traffic. DiVitas server 2218 may then route the traffic appropriately to the corresponding application server (2220 and 2222) via an API (2232 and 2234).

Consider the situation wherein, for example, a user of handset 2202 wants to send an email by employing application client 2206. Since application client 2206 has been configured to send all data traffic to local host 2210, the data traffic from application client 2206 is sent via API 2212 to local IP host 2210, which is associated with DiVitas client 2204.

Upon receiving the traffic from application client 2206, DiVitas client 2204 may encapsulate the traffic inside a SIP Notify Message using a DiVitas Data Exchange (DDX). As discussed herein, DDX refers to a protocol for transporting data packets between a handset and a server. In encapsulating the data packet, the DDX add a new tag which add information about the application client that is sending the data traffic.

Unlike the prior art, not all data packets are encrypted. Instead, whether or not a data packet is encrypted may depend upon the preference as dictated by the application client. In an embodiment of the invention, the newly added DDX is encrypted. Once the data packet has been encapsulated inside the SIP Notify Message, the encapsulated data packet may now be forwarded along a secure channel 2250, which include traversing through network 2224 to be received by DiVitas server 2218. Note that if the enterprise is protected by one or more security modules (e.g., firewall 2226), then the data packet may also have to traverse through one or more security modules.

Once the data packet has been received by DiVitas server 2218, DiVitas server 2218 may employ the DDX tag to retrieve the location of the application server. In an example, the DDX tag may include an identification number (e.g., MAC address, port address), which may indicate which application server (e.g., application server 2220) within the enterprise is the intended recipient of the data packet.

In an embodiment, a mobility architectural arrangement may manage the connectivity between the handset and the mobility server. In an embodiment, the mobility architectural arrangement may employ a control protocol that is commonly utilized by a handset, such as SIP for example.

In a mobility architectural arrangement, the user may only have to perform the manual authentication once in order to establish the secure channel. In other words, once a secure channel has been established between the handset and the mobility server, another secure channel does not have to be established each time an application client (2206 and 2208) wants to interact with an application server (2220 and 2222).

In an embodiment, the mobility architectural arrangement may also include a database, which may include authentication data for each application client. Thus, each time a different application client is employed, in an embodiment, the mobility architectural arrangement may utilizes the authentication data that is specific to the application, which may be stored in the database, to automatically authenticate the user. From the perspective of the user, the mobility architectural arrangement is essentially a single sign-on environment.

Advantageously, the mobility architectural arrangement substantially streamlines the time and effort a network administrator may have to spend in configuring each application client. Instead of having to create a new secure channel each time a new application client is added to a handset, the network administrator may substantially eliminate this process by just configuring each of the application clients to interact with a local host. Further, with a single sign-on, the network administrator may be able to substantially reduce the time and cost associated with managing security.

Figure 23:
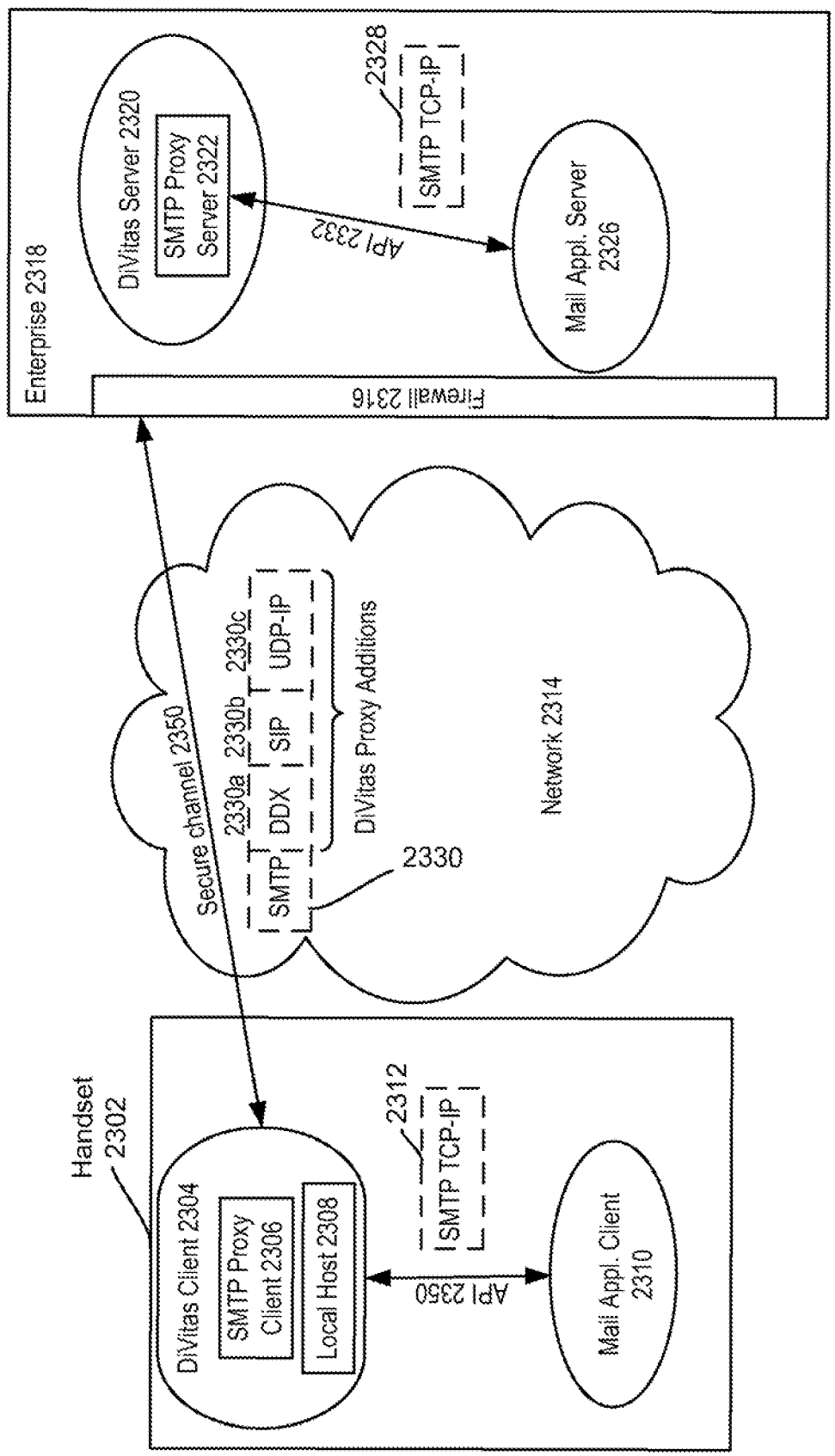
FIG. 23 shows, in an embodiment of the invention, a block diagram illustrating the mobility architectural arrangement as a rich client.

The mobility architectural arrangement may be implemented as a rich or thin client. FIG. 23 shows, in an embodiment of the invention, a block diagram illustrating the mobility architectural arrangement as a rich client. As discussed herein, a rich client refers to a mobility architectural arrangement in which the client DPP and server DPP not only manage the various different applications but may also provide support for at least one or more application client functionality (e.g., a voice application client, an instant messaging application client, email application client, etc.).

Figure 24:
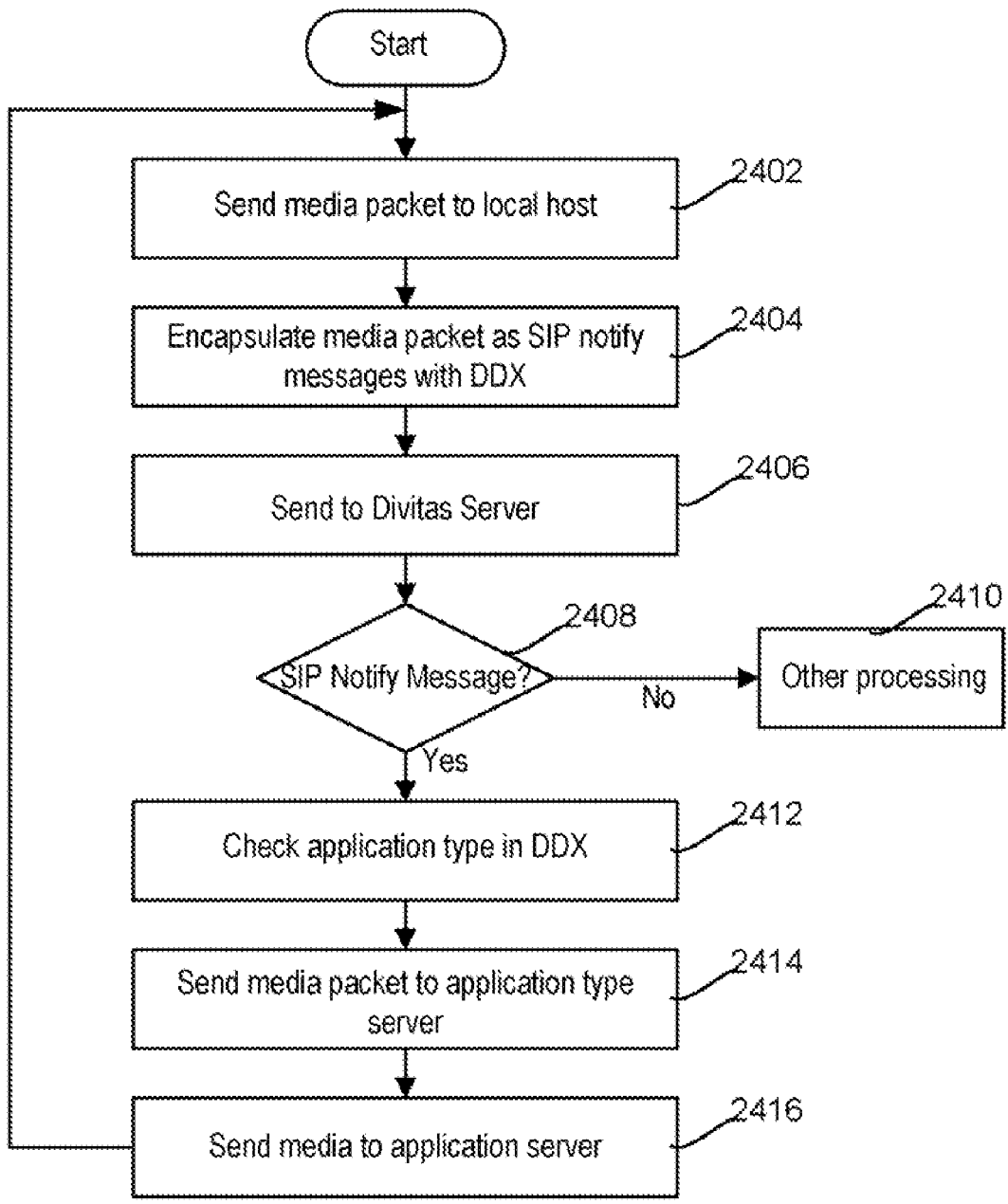
FIG. 24 shows, in an embodiment of the invention, a simple flow chart illustrating an example of a method for employing a mobility architectural arrangement.

Consider the situation wherein, for example, a user of a handset 2302 wants to employ a mail application client 2310 (e.g., Microsoft® Outlook, etc.) to retrieve an e-mail from a mail application server 2326 (e.g., Microsoft® Exchange Server, etc.) that is located within an enterprise 2318. FIG. 23 will be discussed in conjunction with FIG. 24. FIG. 24 shows, in an embodiment of the invention, a simple flow chart illustrating an example of a method for employing a mobility architectural arrangement.

At a first step 2402, application client may send data traffic to a local host of a DiVitas client. In a mobility architectural arrangement, application client 2310 has been configured to route its data traffic through a local host 2308, which is located within a DiVitas client 2304. In an example, application client 2310 may send an SMTP (simple mail transfer protocol) data packet 2312 over TCP-IP to DiVitas client 2304 via an API 2350. SMTP data packet 2312 may be received by an SMTP proxy client 2306 (e.g., sub-client DPP), which is located at DiVitas client 2304.

In an embodiment, a client DPP may include a plurality of sub-client DPPs. The type of proxy client that may be employed to handle the data traffic may depend upon the type of application client. In an embodiment of the invention, the data packet may include a port number, which is unique to an application client. In an example, SMTP data packet 2312 includes the following data—127.0.0.1/25. In this example, the number 127.0.0.1 is an IP address, which is specific to local host 2308 and the number 25 refers to a port number, which in this example is associated with SMTP proxy client 2306.

At a next step 2404, the data traffic may be encapsulated as a SIP Notify Message with a DDX tag. In other words, upon receiving data packet 2312, DiVitas client 2304 may reformat SMTP data packet 2312 into a SIP data packet 2330 (such as a SIP Notify Message) that is transferable over the handset's control protocol, such as SIP. In an embodiment of the invention, SIP data packet 2330 may include the original data packet (e.g., data packet 2312) with a DDX header 2330a and a SIP header 2330b. As aforementioned, the DDX header may include a unique identification number that is unique to an application server. In an embodiment of the invention, the unique identification number may be generated based on the port number that was included in the SMTP data packet. In an embodiment of the invention, an additional tag may be included in the formatted data packet to identify how the formatted data packet may be transported. In an example, transport protocol tag 2330c may be a UDP-IP transport tag.

In an embodiment of the invention, one or more parts of SIP data packet 2330 may be encrypted. In an embodiment, the DDX part is encrypted even if the rest of the data packet is not.

At a next step 2406, the DiVitas client may send the data packet to the DiVitas server. Once data packet 2312 has been reformatted into SIP data packet 2330 (e.g., encapsulated as a SIP Notify Message), SIP data packet 2330 may be sent via a secure channel 2350 through a network 2314 and/or a firewall 2316 to a DiVitas server 2320.

At a next step 2408, the DiVitas server may check to determine if the incoming data packet is a SIP Notify Message. If the incoming data packet is not a SIP Notify Message, then at a next step 2410, the data packet may be dropped.

However, if the incoming data packet is a SIP Notify Message, then at a next step 2412, the DiVitas server may identify the intended proxy server by checking the DDX tag. In an embodiment, the DiVitas server may have to decrypt the DDX packet in order to read the information stored in the DDX packet. In an example, based on the unique identification number in the DDX tag, DiVitas server 2320 knows to route data packet 2330 to SMTP proxy server 2322. In an embodiment of the invention, a server DPP may include a plurality of sub-server DPPs. In an embodiment of the invention, the type of proxy server that may handle the incoming traffic may depend upon the type of data traffic.

At a next step 2414, the data packet may be routed to the proxy server. Since SIP data packet 2330 is an SMTP data packet, formatted data packet is handled by SMTP proxy server 2322 (e.g., sub-server DPP), which is located inside DiVitas server 2320.

At a next step 2416, the data packet is routed to the intended application server. In an embodiment of the invention, SMTP proxy server 2322 may convert SIP data packet 2330 into a format that is acceptable by the receiving application server. In an example, SIP data packet 2330 may be converted from a SIP notify message into an SMTP data packet 2328. Also, the DDX part may be dropped. Further, the transport protocol may be changed from UDP-IP to TCP-IP, which may be better employed to deploy email data traffic to the respective application server (e.g., mail application server 2326) via API 2332.

The method steps described in FIG. 24 does not show the encryption and/or decryption of a data packet. In an embodiment, the data packet may be sent without being encrypted. The requirement for encryption may be optional and may depend upon the user's requirement. In an embodiment, part or the entire data packet may be encrypted. In an example, the DDX part may be encrypted but the rest of the data packet may remain unencrypted. The optional encryption enables less processing power to be utilized and a decrease in latency that is usually associated with encrypted data packets.

As can be seen from FIGS. 23 and 24, the rich mobility architectural arrangement may act as a mobility manager enabling application clients of a handset to interact with application servers within a single sign-on environment. Further, the rich mobility architectural arrangement may include functionality for converting data packets from a variety of applications into data packets that are capable of being transported by the control protocol and transport protocol that is specific to the secure channel that has been established.

Figure 25:
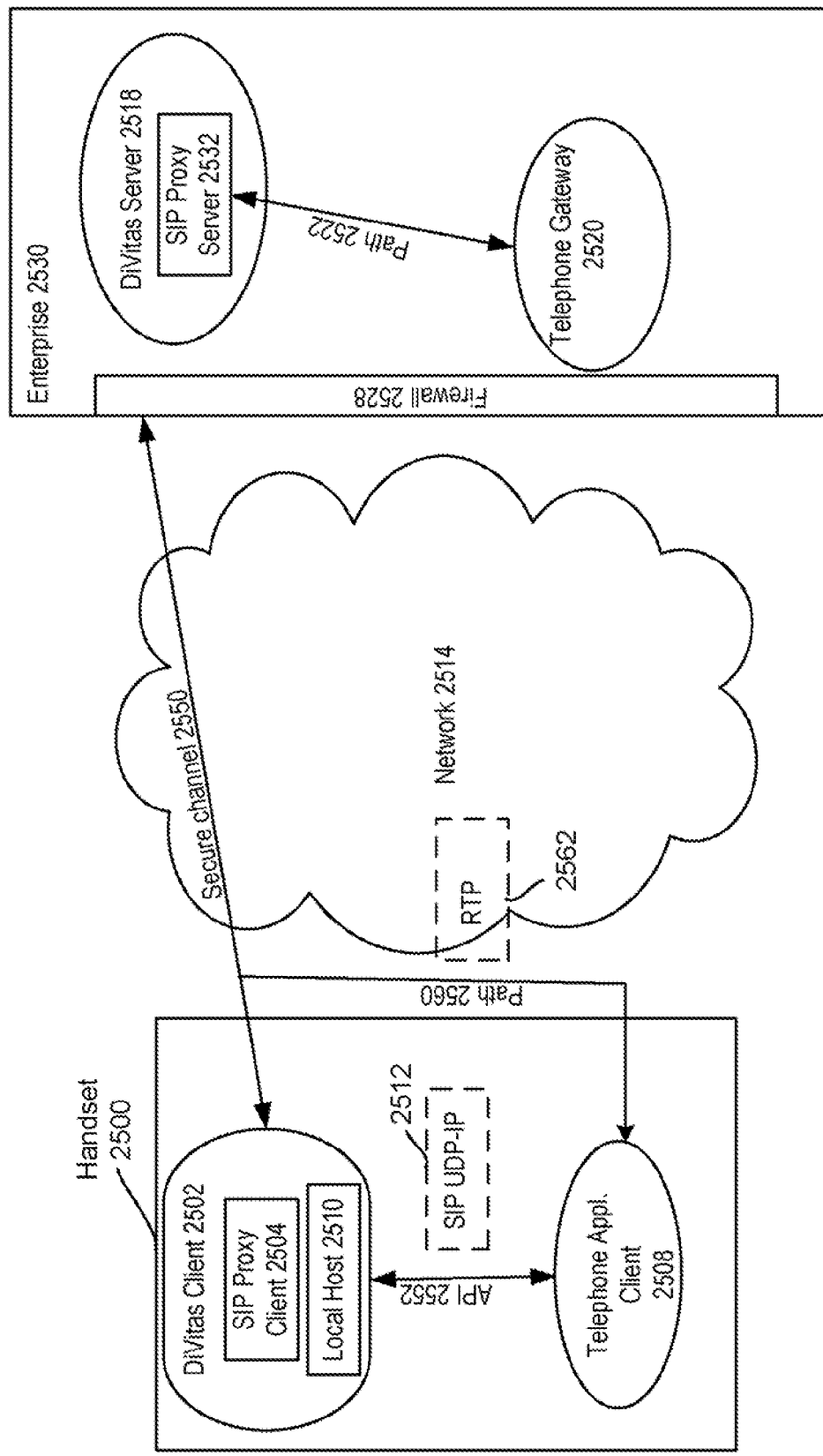
FIG. 25 shows, in an embodiment of the invention, a mobility architectural arrangement implemented as a thin client.

In an embodiment of the invention, the mobility architectural arrangement may be implemented as a thin client, as shown in FIG. 25. In a thin mobility architectural arrangement, the client DPP and the server DPP may be employed only as mobility managers (e.g., manage the connectivity for the applications) and may not provide support for at least one or more application functionalities.

Consider the situation wherein, for example, a user of a handset 2500 wants to call a friend. The user may employ a telephone application client 2508 (e.g., VoIP, etc.) to make his telephone call. Assume in this example that a secure channel 2550 has already been established between a DiVitas client 2502 and a DiVitas server 2518, which is located within enterprise 2530.

To establish the telecommunication session, telephone application client 2508 may send a data packet 2512 (e.g., SIP/UD-IP) to a local host 2510 within DiVitas client 2502 via an API 2552. As mentioned above, a plurality of proxy clients may reside within DiVitas client 2502 to support the various different application clients. In an example, a SIP proxy client 2504 may be located within DiVitas client 2502 to handle data packets from telephone application client 2508.

Upon receiving data packet 2512, SIP proxy client 2504 may analyze the data packet to determine how to route the packet. As aforementioned, the data packet that may be sent to a DiVitas client may include a port number (e.g., 5060, etc.) that may be unique to an application server. With this information, DiVitas client 2502 may route data packet 2512 through a network 2514 and a firewall 2528 to DiVitas server 2518. In an embodiment, a data packet does not have to be converted if the data packet is already in a format that is routable by a DiVitas client. In an example, data packet 2512 is in a SIP/UDP-IP format, which is the format that DiVitas client 2502 may employ to route its data traffic.

In an embodiment, a plurality of proxy server may reside within a DiVitas server. In an example, a SIP proxy server 2532 may reside within DiVitas server 2518 to manage the incoming data traffic from telephone application client 2508. Since data packet 2512 has been sent from telephone application client 2508, the data packet is handled by SIP proxy server 2532. Upon receiving data packet 2512, SIP proxy server 2532 may forward data packet 2512 along a path 2522 to a destination telecommunication device (e.g., telephone, etc.) via a telephone gateway 2520 (e.g., PSTN, GSM, CDMA, etc.). Once a telecommunication session has been established between handset 2500 and the destination telecommunication device, the other data packets 2562 (e.g., RTP data packets, etc.) that may be sent by telephone application client may be sent along a path 2560 through secure channel 2550 to DiVitas server 2518 without having to go through DiVitas client 2502.

In a thin mobility architectural arrangement, the purpose of establishing a telecommunication session with the aid of a DiVitas client is to enable the application client to take advantage of the mobility functionality of the DiVitas client. In other words, a control center has been established between the DiVitas client and the DiVitas server to monitor the connectivity of the application client. By establishing this relationship, the DiVitas client and the DiVitas server may be able to share its connectivity status and be able to seamlessly handle roaming when the situation arises.

In an example, the user in the above situation is currently connected through a Wi-Fi network. During the telephone conversation, the user may roam outside of the Wi-Fi network. In the prior art, the connection may be dropped and the user may have to redial. However, in a mobility architectural arrangement, the connectivity status of the user's handset has been monitored and the DiVitas client and DiVitas server may perform a seamless network switch (e.g., from Wi-Fi to a cellular network) without the user being aware of the change.

Advantageously, a thin mobility architectural arrangement may be implemented by an enterprise that may have already invested a large sum of money into a plurality of application and may only need a mobility manager. Thus, the enterprise may be able to take advantage of the mobility manager capability of the mobility architectural arrangement without having to restructure its telecommunication infrastructure.

As can be appreciated from embodiment of this present invention, the mobility architectural arrangement with DPP provides a mobility manager capable of streamlining the telecommunication infrastructure. In other words, the mobility architectural arrangement provides a single sign-on environment. In an example, instead of multiple secure channels into an enterprise, the same functionality may be achieved with a single secure channel. With a single sign-on environment, the cost and effort of managing the telecommunication infrastructure may be substantially reduced. Further, the mobility architectural arrangement enables connectivity to be monitored and seamlessly handled without negatively impacting the user's telecommunication experience.

F. Conclusion

While this invention has been described in terms of several preferred embodiments, there are alterations, permutations, and equivalents which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alternations, permutations, and equivalents as fall within the true spirit and scope of the present invention.

What is claimed is:

1. A mobility architectural arrangement for managing telecommunication mobility for a handset, comprising:
    a DiVitas protocol proxy (DPP), said DPP being configured to manage connectivity between a mobility client of said handset and a mobility server within an enterprise, wherein said DPP including
        a client DPP being configured to manage said connectivity for said mobility client of said handset, said client DPP receiving a plurality of client connectivity requests from a plurality of application clients, and
        a server DPP being configured to manage said connectivity for said mobility server, said server DPP receiving a plurality of server connectivity requests from a plurality of application servers
        wherein said client DPP and said server DPP are configured to interact with one another to establish a secure channel.

2. The mobility architectural arrangement of claim 1 wherein said client DPP is configured to include a plurality of sub-client DPPs, each of said plurality of sub-client DPPs being configured to handle a protocol of a plurality of protocols.

3. The mobility architectural arrangement of claim 1 wherein said server DPP is configured to include a plurality of sub-server DPPs, each of said plurality of sub-server DPPs being configured to handle a protocol of a plurality of protocols.

4. The mobility architectural arrangement of claim 1 wherein a first application client of said plurality of application clients send a set of data packets to said client DPP via an application protocol interface (API), said set of data packets is configured to include a local host address and a port number, said local host address being associated with said mobility client and said port number being associated with said first application client.

5. The mobility architectural arrangement of claim 4 wherein a DiVitas data exchange (DDX) tag is configured to be attached to said set of data packets, said DDX tag including a unique identification which is associated with said first application client.

6. The mobility architectural arrangement of claim 5 wherein said DDX tag is encrypted.

7. The mobility architectural arrangement of claim 6 wherein said client DPP format said set of data packets with said DDX tag into a format capable of being transmitted through said secure channel to said server DPP of said mobility server.

8. The mobility architectural arrangement of claim 7 wherein said server DPP is configured to decrypt said DDX tag and to employ said unique identification to send said set of data packets to said first application server.

9. The mobility architectural arrangement of claim 1 wherein said mobility client is configured to include a database, said database being employed to store authentication data for each of said plurality of application clients.

10. A method for managing telecommunication mobility for a handset, comprising:
    employing a Divitas protocol proxy (DPP) to manage connectivity between a mobility client of said handset and a mobility server within an enterprise, said DPP including
        a client DPP being configured to manage connectivity for said handset, said client DPP receiving a plurality of client connectivity requests from a plurality of application clients, and
        a server DPP being configured to manage connectivity for said mobility server, said server DPP receiving a plurality of server connectivity requests from a plurality of application servers; and
    employing said client DPP and said server DPP to establish a secure channel between said handset and said mobility server to enable said plurality of application clients to interact with said plurality of application servers.

11. The method of claim 10 further including
    sending a set of data packets from a first application client of said plurality of application clients to said client DPP of said mobility client via an application protocol interface (API);
    attaching a DiVitas data exchange (DDX) tag to said set of data packets, said DDX tag being configured to include data about said first application client,
    sending said set of data packets with said DDX tag through said secure channel to said server DPP of said mobility server;
    analyzing said DDX tag to identify a first application server of said plurality of application servers, said first application server being associated with said first application client; and
    sending said set of data packets to said first application server.

12. The method of claim 10 wherein said client DPP is configured to include a plurality of sub-client DPPs, each of said plurality of sub-client DPPs, being configured to handle a protocol of a plurality of protocols.

13. The method of claim 10 wherein said server DPP is configured to include a plurality of sub-client DPPs, each of said plurality of sub-server DPPs being configured to handle a protocol of a plurality of protocols.

14. The method of claim 11 wherein said set of data packets is configured to include a local host address and a port number, said local host address being associated with said mobility client and said port number being associated with said first application client.

15. The method of claim 11 wherein said client DPP format said set of data packet enabling said set of data packet to be sent through said secure channel, said secure channel being established via a control protocol.

16. The method of claim 15 wherein said control protocol is a session initiation protocol (SIP).

17. The method of claim 11 wherein said DDX tag is configured to include a unique identification.

18. The method of claim 17 wherein said DDX tag is encrypted by said client DPP.

19. The method of claim 18 wherein said server DPP is configured to decrypt said DDX tag.

20. The method of claim 10 wherein said mobility client is configured to include a database, said database being employed to store authentication data for each of said plurality of application clients.

21. An article of manufacture comprising a program storage medium having computer readable code embodied therein, said computer readable code being configured to manage telecommunication mobility for a handset within a mobility architectural arrangement, comprising
 code for establishing a secure channel between a mobility client of said handset and a mobility server that is located within an enterprise by employing a Divitas protocol proxy (DPP), said DPP including
  a client DPP configured to manage connectivity for said handset, said client DPP receiving a plurality of client connectivity requests from a plurality of application clients, and
  a server DPP configured to manage connectivity for said mobility server, said server DPP receiving a plurality of server connectivity requests from a plurality of application servers; and
 code for employing said client DPP and said server DPP to establish a secure channel between said handset and said mobility server to enable said plurality of application clients to interact with said plurality of application servers.

22. The article of manufacture of claim 21 further including
 code for sending a set of data packets from a first application client of said plurality of application clients to said client DPP of said mobility client via an application protocol interface (API);
 code for attaching a DiVitas data exchange (DDX) tag to said set of data packets, said DDX tag being configured to include data about said first application client,
 code for sending said set of data packets with said DDX tag through said secure channel to said server DPP of said mobility server;
 code for analyzing said DDX tag to identify a first application sever of said plurality of application servers, said first application server being associated with said first application client; and
 code for sending said set of data packets to said first application server.

23. The article of manufacturing of claim 21 wherein said client DPP is configured to include a plurality of sub-client DPPs, each of said plurality of sub-client DPPs, being configured to handle a protocol of a plurality of protocols.

24. The article of manufacturing of claim 21 wherein said server DPP is configured to include a plurality of sub-client DPPs, each of said plurality of sub-server DPPs being configured to handle a protocol of a plurality of protocols.

25. The article of manufacturing of claim 22 wherein said set of data packets is configured to include a local host address and a port number, said local host address being associated with said mobility client and said port number being associated with said first application client.

26. The article of manufacturing of claim 22 wherein said client DPP format said set of data packets enabling said set of data packets to be sent through said secure channel, said secure channel being established via a control protocol.

27. The article of manufacturing of claim 22 wherein said DDX tag is configured to include a unique identification and said DDX tag is encrypted by said client DPP.

28. The article of manufacturing of claim 27 wherein said server DPP is configured to decrypt said DDX tag.

29. The article of manufacturing of claim 21 wherein said mobility architectural arrangement is configured to include a database, said database being employed to store authentication data for each of said plurality of application clients.

\* \* \* \* \*